US012465806B2

(12) United States Patent
Flick et al.

(10) Patent No.: US 12,465,806 B2
(45) Date of Patent: Nov. 11, 2025

(54) ADJUSTABLE WEIGHT KETTLEBELL

(71) Applicant: JOHNSON HEALTH TECH RETAIL, INC., Cottage Grove, WI (US)

(72) Inventors: Edward L. Flick, Brush Prairie, WA (US); Bryce C. Baker, Vancouver, WA (US); PJ M. Bush, Vancouver, WA (US)

(73) Assignee: JOHNSON HEALTH TECH RETAIL, INC., Cottage Grove, WI (US)

( * ) Notice: Subject to any disclaimer, the term of this patent is extended or adjusted under 35 U.S.C. 154(b) by 684 days.

(21) Appl. No.: 17/850,074

(22) Filed: Jun. 27, 2022

(65) Prior Publication Data

US 2023/0030139 A1    Feb. 2, 2023

Related U.S. Application Data

(63) Continuation of application No. 16/967,104, filed as application No. PCT/US2019/016546 on Feb. 4, 2019, now Pat. No. 11,491,361.

(Continued)

(51) Int. Cl.
*A63B 21/075*    (2006.01)
*A63B 21/072*    (2006.01)

(52) U.S. Cl.
CPC .......... *A63B 21/075* (2013.01); *A63B 21/072* (2013.01)

(58) Field of Classification Search
CPC .......... A63B 21/06; A63B 21/072–075; A63B 71/0054; A63B 71/0036
See application file for complete search history.

(56) References Cited

U.S. PATENT DOCUMENTS

| 7,261,678 | B2 | 8/2007 | Crawford |
| 7,491,157 | B1 | 2/2009 | Lin |

(Continued)

FOREIGN PATENT DOCUMENTS

| CN | 206304284 U | 7/2017 |
| CN | 206549051 U | 10/2017 |

(Continued)

OTHER PUBLICATIONS

"Office Action and Translation for TW Appl. No. 108104167, mailed on Nov. 9, 2022".

(Continued)

*Primary Examiner* — Loan B Jimenez
*Assistant Examiner* — Kathleen M Fisk
(74) *Attorney, Agent, or Firm* — Dorsey & Whitney LLP

(57) ABSTRACT

An adjustable weight kettlebell includes a body defining an internal cavity configured to receive one or more of a plurality of weights, and a weight selector assembly configured to selectively couple one or more of the plurality of weights to the body. The weight selector assembly may include an actuator to enable a user to select one of a plurality of available weight settings. The weight selector assembly may be locked for adjustment when the kettlebell is removed from a support surface such as a base, thereby inhibiting inadvertent detachment of the weights from the kettlebell during exercise. The weight selector assembly may automatically shift to the closest weight settings upon release of the actuator and may automatically unlock upon placement of the kettlebell on the support surface such as the base, the bottom weight if not coupled to the kettlebell, or any other suitable support surface.

13 Claims, 37 Drawing Sheets

Related U.S. Application Data

(60) Provisional application No. 62/625,812, filed on Feb. 2, 2018.

(56) References Cited

U.S. PATENT DOCUMENTS

| | | | |
|---|---|---|---|
| 7,976,443 | B2 | 7/2011 | Krull |
| 9,802,073 | B2 | 10/2017 | Pawlas et al. |
| 9,914,007 | B2 | 3/2018 | Pawlas et al. |
| 10,099,083 | B1 | 10/2018 | Owusu |
| 10,195,477 | B2 | 2/2019 | Marjama et al. |
| 10,420,978 | B2 | 9/2019 | Wang |
| 10,463,906 | B2 | 11/2019 | Owusu |
| 10,695,614 | B2 | 6/2020 | Owusu |
| 10,786,700 | B2 | 9/2020 | Owusu |
| 11,130,014 | B2 * | 9/2021 | Sisler ............. A63B 21/0724 |
| 11,491,361 | B2 | 11/2022 | Flick et al. |
| 2003/0096683 | A1 | 5/2003 | Fenelon et al. |
| 2009/0305852 | A1 | 12/2009 | Höglund |
| 2010/0120588 | A1 | 5/2010 | Krull |
| 2010/0190619 | A1 | 7/2010 | Chen |
| 2011/0263393 | A1 | 10/2011 | Ross et al. |
| 2012/0053024 | A1 | 3/2012 | Mendoza |
| 2012/0115689 | A1 | 5/2012 | Dalebout et al. |
| 2017/0001061 | A1 | 1/2017 | Marjama et al. |
| 2020/0306578 | A1 | 10/2020 | Pohl et al. |
| 2020/0360757 | A1 | 11/2020 | Flick et al. |

FOREIGN PATENT DOCUMENTS

| | | | |
|---|---|---|---|
| CN | 107773908 | A | 3/2018 |
| CN | 107773909 | A * | 3/2018 |
| DE | 202014102673 | U1 | 7/2014 |
| SU | 1567220 | A1 | 5/1990 |
| TW | M534015 | U | 12/2016 |
| TW | I598131 | B | 9/2017 |
| WO | 2008057368 | A2 | 5/2008 |

OTHER PUBLICATIONS

"PCT International Search Report and Written Opinion, PCT Application No. PCT/US2019/016546 dated Apr. 12, 2019, 14 pages".
English translation of Office Action for CN Application No. 201980021691.4, mailed Apr. 21, 2021.
English translation of Second Office Action for CN Application No. 201980021691.4, mailed Dec. 19, 2021.
Office Action for CA Appl. No. 3,090,147 mailed on Aug. 26, 2021.
PCT International Search Report and Written Opinion, PCT Application No. PCT/US2019/016252 mailed on Aug. 8, 2019, 11 pages.
"Extended European Search Report for EP23192587.6, mailed on Dec. 18, 2023".

* cited by examiner

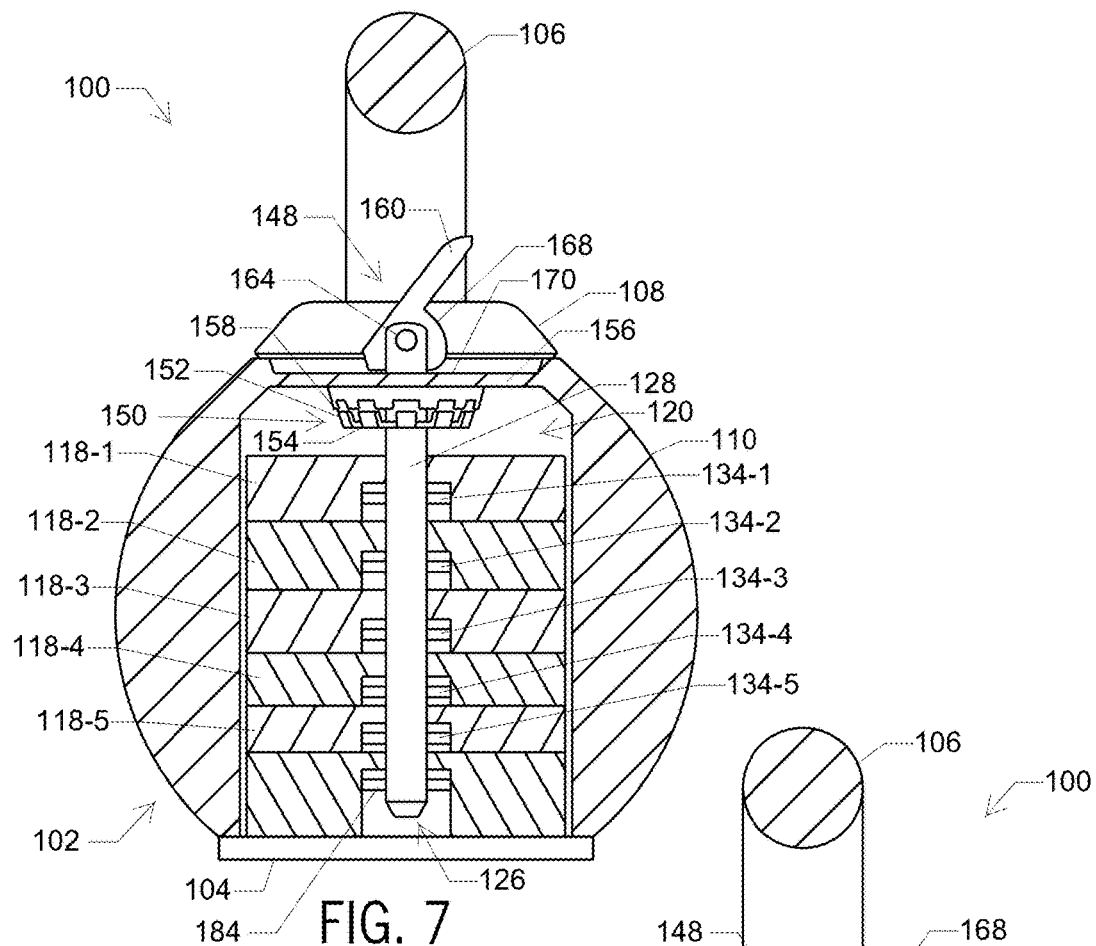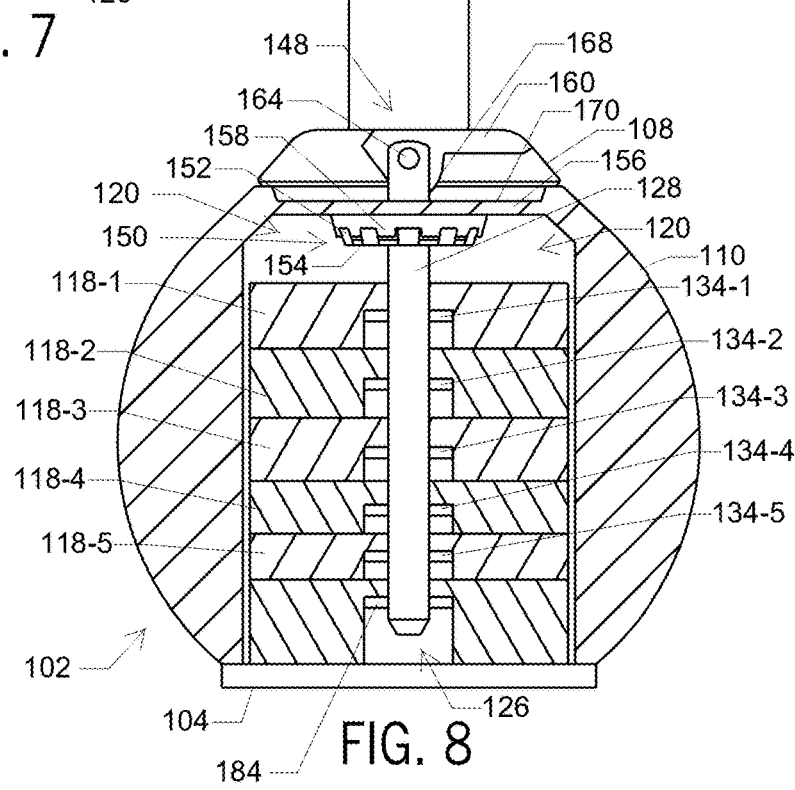

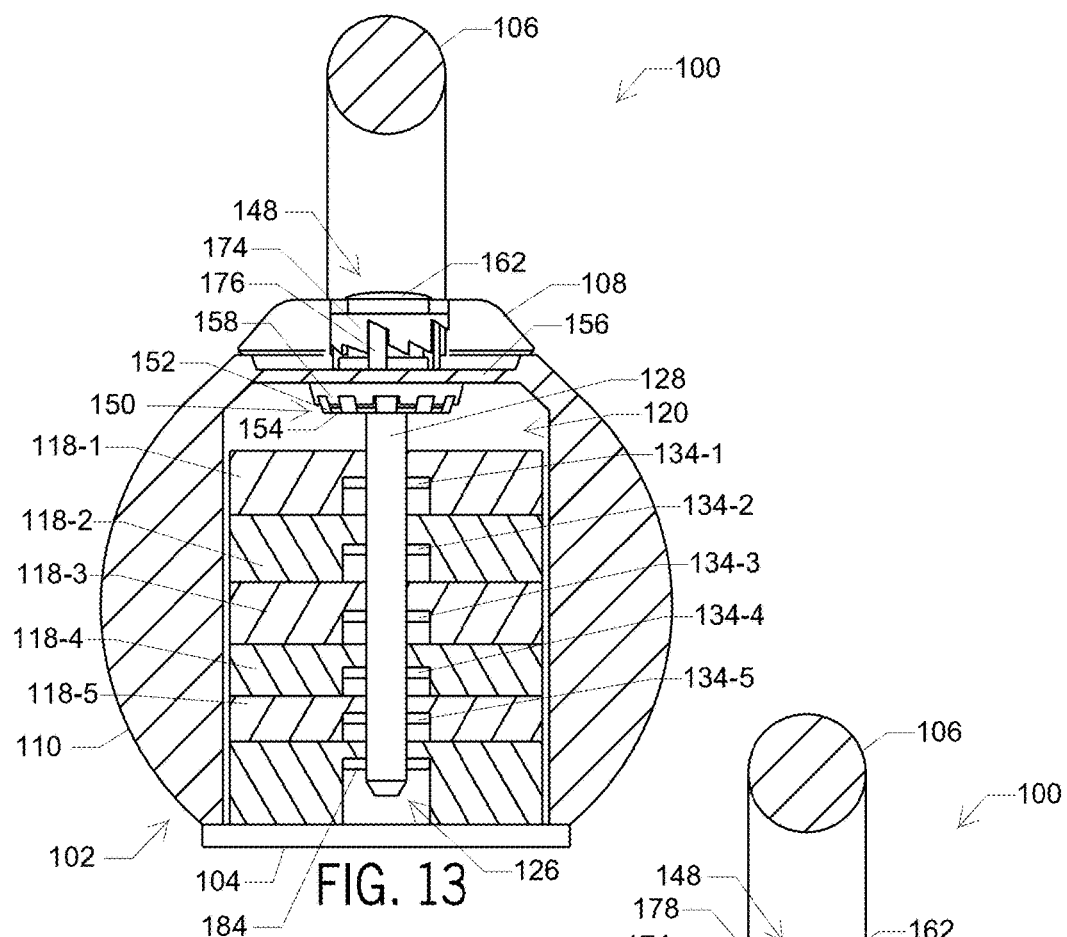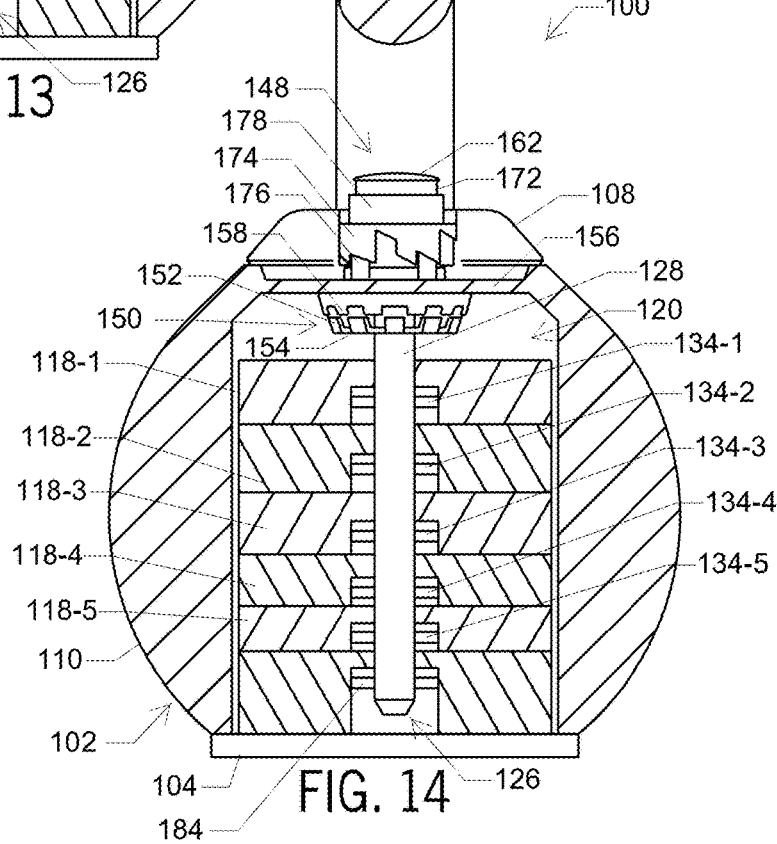

ADJUSTABLE WEIGHT KETTLEBELL

CROSS-REFERENCE TO RELATED APPLICATIONS

This application is a continuation of U.S. patent application Ser. No. 16/967,104, filed Feb. 4, 2019, which is the national stage application of International Patent Application No. PCT/US2019/016546 filed on Aug. 8, 2018 and entitled "ADJUSTABLE WEIGHT KETTLEBELL" which claims priority to Provisional Patent Application No. 62/625,812 filed on Feb. 2, 2018 and entitled "ADJUSTABLE WEIGHT KETTLEBELL", the entire contents of which are hereby incorporated by reference herein in their entireties.

FIELD

The present disclosure relates generally to exercise equipment, and more particularly to an adjustable weight kettlebell.

BACKGROUND

Kettlebells are used to perform various types of exercises, such as deadlift, hang clean, lunges, push press, rows, snatch, and squat, among others. Due to the number of exercises that may be performed with kettlebells, users often need many kettlebells with different weights to perform an exercise routine. However, obtaining an arrangement of kettlebells can be costly, and storing the arrangement of kettlebells can require a vast amount of space.

In response to at least these issues, adjustable kettlebells have been designed that allow a user to selectively adjust the weight of a kettlebell prior to exercising. For example, Taiwan patent publication number TW M534015 U discloses an adjustable weight kettlebell. Different arrangements of weights typically are attached to the kettlebell depending on the desired total weight of the kettlebell. However, in some circumstances, the weights may become detached from the kettlebell during exercise and cause injury to the user.

Hence, a substantial need exists for an improved adjustable weight kettlebell.

SUMMARY

In various embodiments, an adjustable weight kettlebell is disclosed. The adjustable weight kettlebell may include a body or shell defining an internal cavity, a plurality of weights configured to be positioned in the internal cavity, and a weight selector configured to selectively couple one or more weights of the plurality of weights to the body.

In various embodiments, a kettlebell system is disclosed. The kettlebell system may include an adjustable weight kettlebell and a base configured to support the kettlebell. The kettlebell may include a lock mechanism, which is configured to prevent rotation of the weight selector when the kettlebell is off the base. The kettlebell may be configured to automatically unlock the weight selector for adjustment upon placement of the kettlebell on the base. The kettlebell may automatically lock for adjustment upon removal of the kettlebell from the base. The automatic locking and unlocking may be achieved using one or more movable components, such as one or more plungers, operatively arranged to transmit an actuation force from the base to the kettlebell.

In various embodiments, a method of adjusting the weight of a kettlebell is disclosed. The method may include rotating a rod, coupling one or more weights to a body of the kettlebell via rotation of the rod, and automatically locking and unlocking a lock mechanism responsive to removal of the kettlebell from the base and placement of the kettlebell on the base, respectively.

This summary of the disclosure is given to aid understanding. Each of the various aspects and features of the disclosure may advantageously be used separately in some instances, or in combination with other aspects and features of the disclosure in other instances. Accordingly, while the disclosure is presented in terms of examples, individual aspects of any example can be claimed separately or in combination with aspects and features of that example or any other example.

This summary is neither intended nor should it be construed as being representative of the full extent and scope of the present disclosure. The present disclosure is set forth in various levels of detail in this application and no limitation as to the scope of the claimed subject matter is intended by either the inclusion or non-inclusion of elements, components, or the like in this summary.

BRIEF DESCRIPTION OF THE DRAWINGS

The accompanying drawings, which are incorporated in and constitute a part of the specification, illustrate examples of the disclosure and, together with the general description given above and the detailed description given below, serve to explain the principles of these examples.

FIG. 7 is a partial cross-sectional view of the kettlebell and base of FIG. 1 with a weight selector assembly in an unlocked configuration in accordance with various embodiments of the present disclosure.

FIG. 8 is a partial cross-sectional view of the kettlebell and base of FIG. 1 with a weight selector assembly in a locked configuration in accordance with various embodiments of the present disclosure.

FIG. 13 is a partial cross-sectional view of the kettlebell and base of FIG. 11 with a weight selector assembly in a locked configuration in accordance with various embodiments of the present disclosure.

FIG. 14 is a partial cross-sectional view of the kettlebell and base of FIG. 11 with a weight selector assembly in an unlocked configuration in accordance with various embodiments of the present disclosure.

The drawings are not necessarily to scale. In certain instances, details unnecessary for understanding the disclosure or rendering other details difficult to perceive may have been omitted. In the appended drawings, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label. The claimed subject matter is not necessarily limited to the particular examples or arrangements illustrated herein.

DETAILED DESCRIPTION

Various embodiments of the present disclosure are directed to an adjustable weight kettlebell. The kettlebell may include one or more safety features to ensure the one or more weights of the kettlebell do not become detached from the kettlebell during exercise. In various embodiments, the kettlebell may include a selector rod that selectively couples individual weights to the kettlebell depending on the rotational position of the rod relative to the weights. To ensure the individual weights are properly coupled to the kettlebell, the rod may selectively engage a base upon which the kettlebell is supported. When a desired amount of the weight is properly coupled to the kettlebell, the kettlebell may be removed from the base, and the rod may be locked in its rotational position to ensure the rod does not rotate relative to the weights during exercise.

Figure 1:
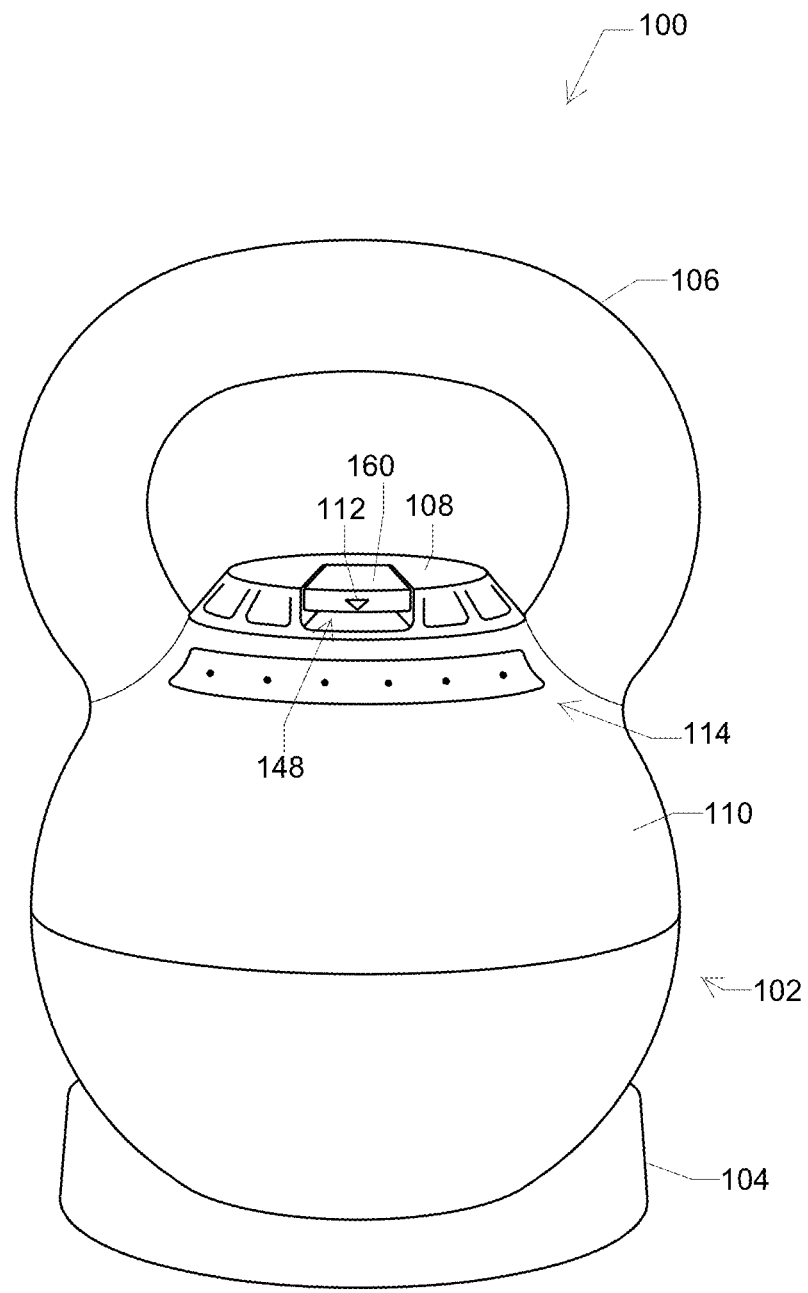
FIG. 1 is a perspective view of an adjustable weight kettlebell and a base in accordance with various embodiments of the present disclosure.
Figure 11:
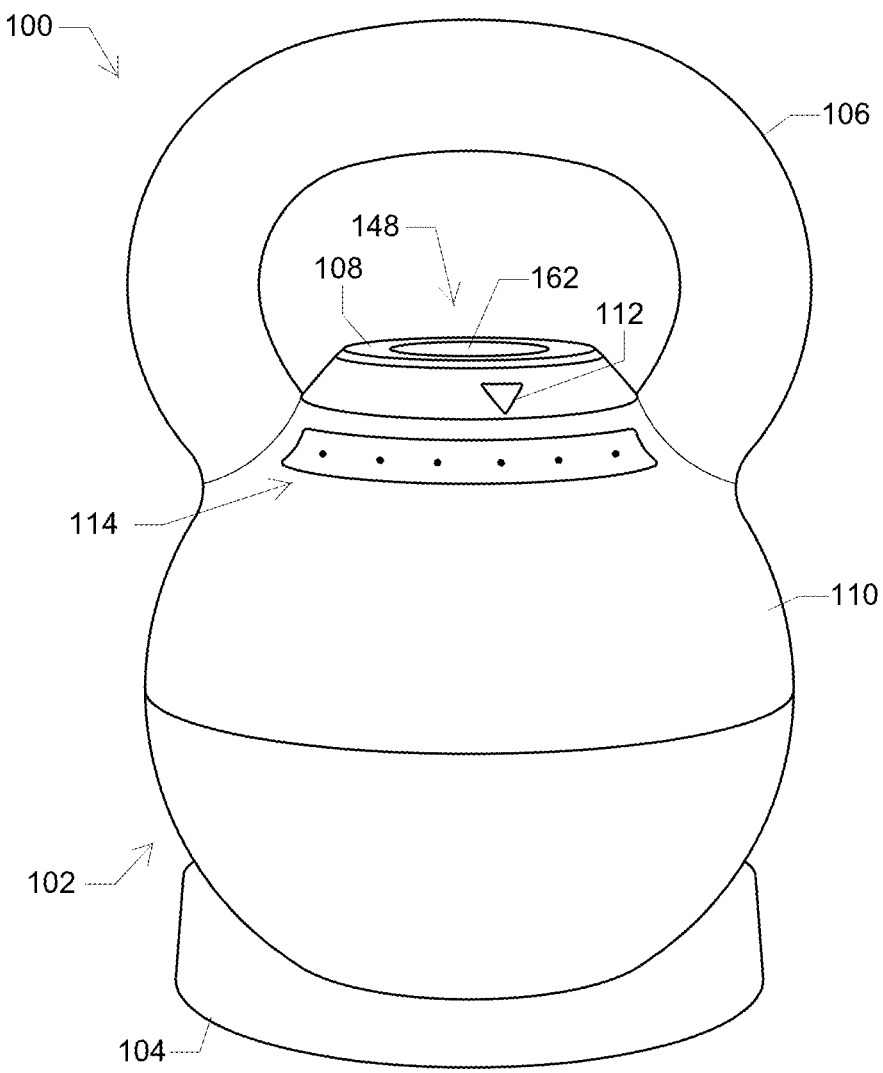
FIG. 11 is a perspective view of an adjustable weight kettlebell and a base in accordance with various embodiments of the present disclosure.

FIGS. 1 and 11 are perspective views of a kettlebell system 100 including an adjustable weight kettlebell 102 and a base 104 in accordance with various embodiments of the present disclosure. The base 104 may be positioned on, and in various embodiments secured to, a support structure, such as a floor, a stand, or other structure. When not in use, the kettlebell 102 may be positioned on the base 104. As illustrated in FIGS. 1 and 11, the kettlebell 102 may be supported by the base 104 such that the kettlebell 102 is oriented in an upright position with a grip or handle 106 of the kettlebell 102 directed upward to facilitate grasping by a user.

With continued reference to FIGS. 1 and 11, the kettlebell 102 may include a cap 108 configured to be manipulated by a user to set the amount of weight of the kettlebell 102. For example, the cap 108 may be rotatably coupled to a body 110 of the kettlebell 102. As illustrated in FIGS. 1 and 11, the cap 108 may be located on top of the body 110. By rotating the cap 108 relative to the body 110, the user may adjust the amount of weight attached to the body 110 of the kettlebell 102. The kettlebell 102 may include an indicator, such as arrow 112 provided on the cap 108 and markings 114, such as weight amounts (see FIG. 2), provided on the body 110, to facilitate the user in selecting a desired amount of weight. By virtue of the cap 102 being movably coupled to the body 110, the user may adjust the weight of the kettlebell 102 by aligning the arrow 112 with a marking 114 indicating the desired amount of weight, after which the user may lift the kettlebell 102 from the base 104 and begin exercising. The kettlebell 102 may be configured such that, when the arrow 112 is not aligned with any of the individual markings 114, the kettlebell 102 is not removable or separable from the base 104, e.g., due to a safety feature of the kettlebell system 100, as discussed below in more detail.

Figure 2:
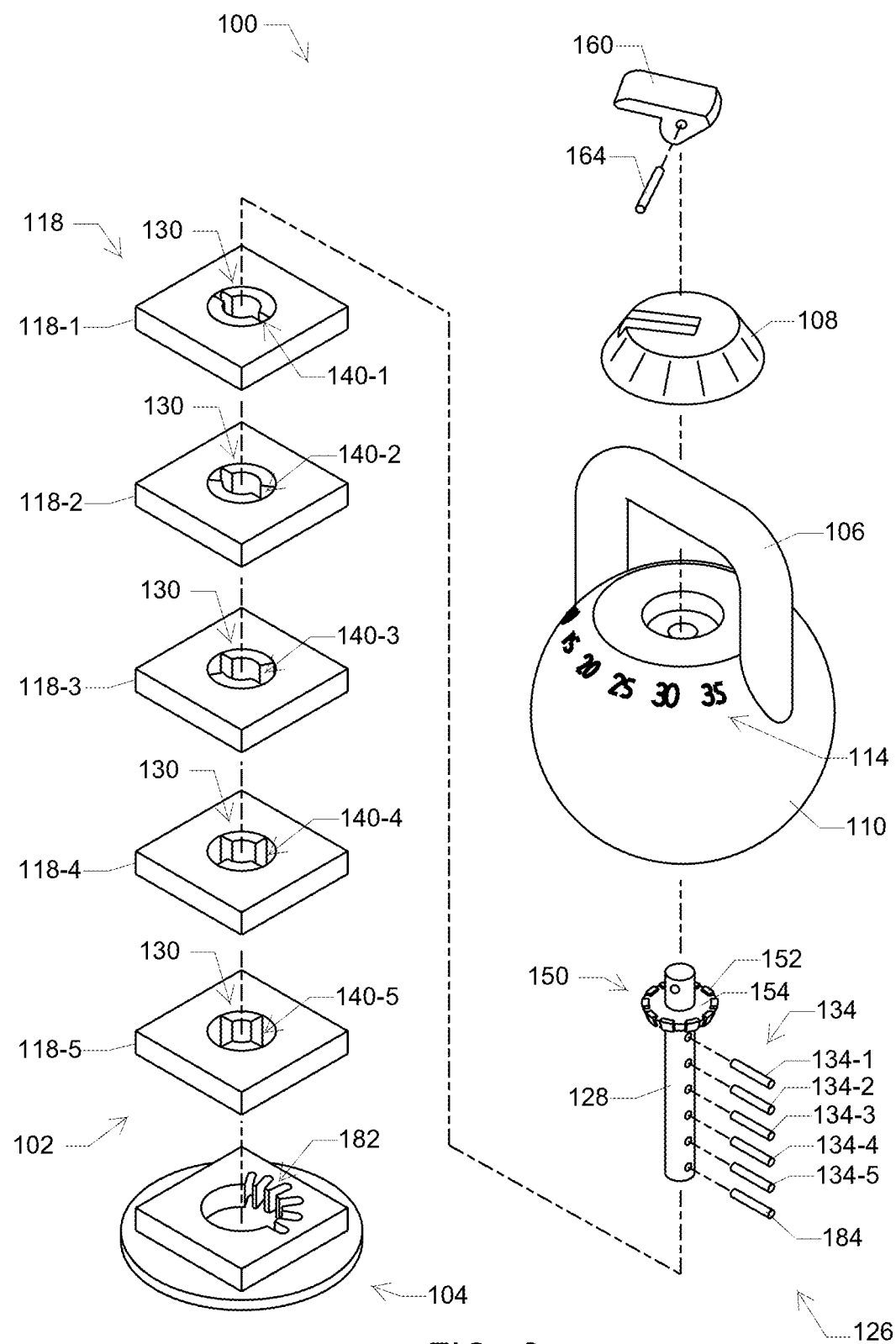
FIG. 2 is an exploded view of the kettlebell and base of FIG. 1 in accordance with various embodiments of the present disclosure.
Figure 3:
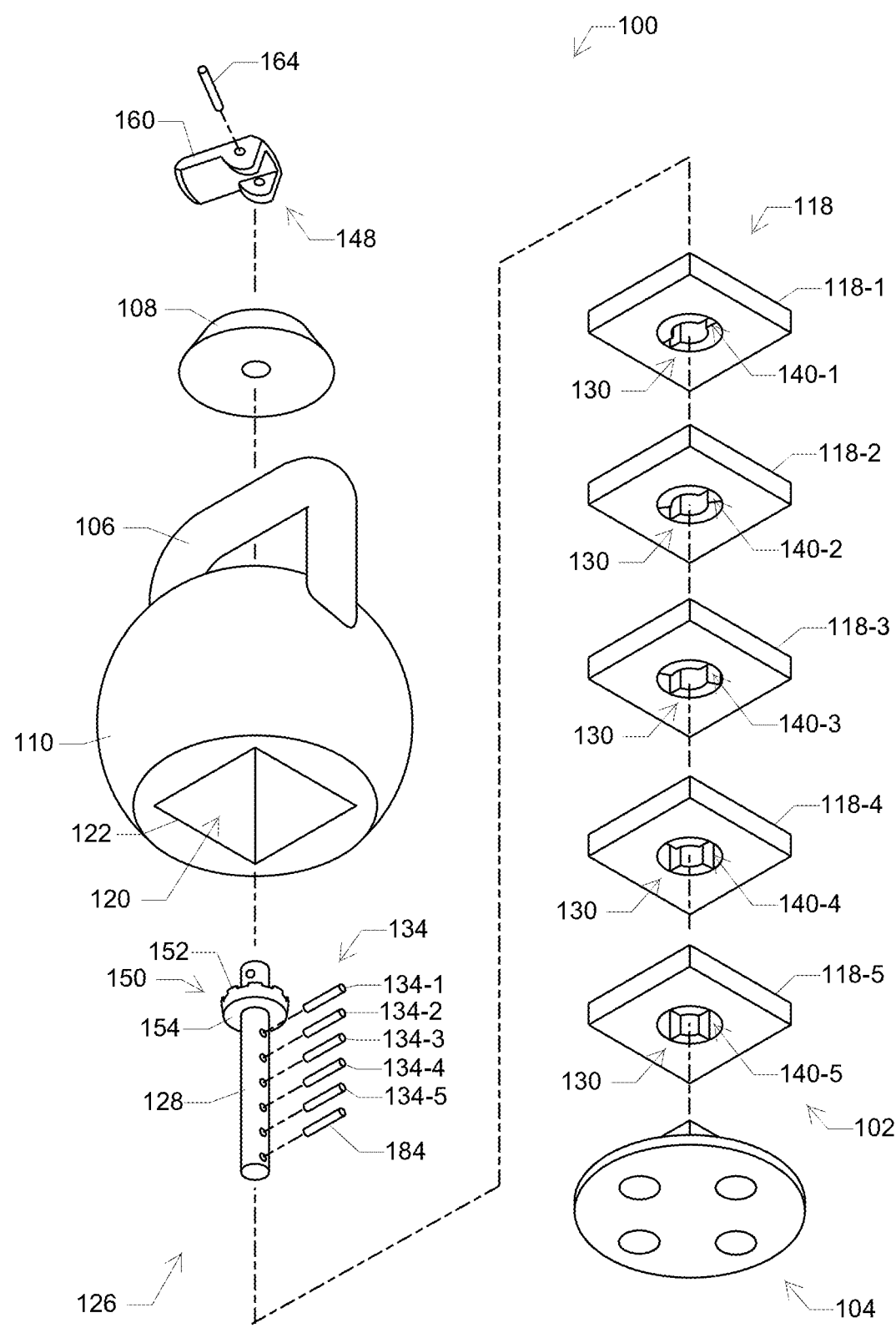
FIG. 3 is another exploded view of the kettlebell and base of FIG. 1 in accordance with various embodiments of the present disclosure.

FIGS. 2 and 3 are exploded views of the kettlebell system 100 in accordance with various embodiments of the present disclosure. The kettlebell system 100 may include one or more removable weights. In the example illustrated in FIGS. 2 and 3, the kettlebell 102 is configured to removably couple to or receive any number of a plurality of weights 118. In the illustrated example, the kettlebell 102 is configured to receive a first weight 118-1, a second weight 118-2, a third weight 118-3, a fourth weight 118-4, and a fifth weight 118-5. However, the kettlebell 102 may be configured to receive fewer or greater number of weights to provide a weight adjustable kettlebell with different characteristics, such as to vary the total weight and increments between weight settings of the kettlebell.

Referring to FIG. 3, the body 110 of the kettlebell 102 may define an internal cavity 120 configured to house or receive the weights 118, such that the weights 118 coupled to the body 110 are positioned in the cavity 120 during exercise. When received in the cavity 120, the weights 118 may be non-rotatable relative to the body 110. For example, as illustrated in FIG. 2, the weights 118 may have a non-circular shape (e.g., triangular, rectangular, pentagonal, or other suitable regular or irregular shape) that may correspond to the shape of the cavity 120 such that the walls 122 of the body 110 defining the cavity 120 inhibit the weights 118 from rotating relative to the body 110. In various embodiments, the weights 118 may have a generally circular shape, but the weights 118 may be keyed to the body 110 during insertion of the weights 118 into the cavity 120. For example, the weights 118 and the body 110 may include corresponding keying structures (such as one or more corresponding grooves and ribs) that inhibit rotation of the weights 118 relative to the body 110 when the weights 118 are positioned in the cavity 120.

Referring to FIGS. 2 and 3, the kettlebell 102 may include a weight selector assembly 126 configured to selectively couple one or more of the weights 118 to the body 110. The weight selector assembly 126 may include a selector rod 128 coupled to the body 110. For example, the rod 128 may be rotatably coupled to the body 110 such that the rod 128 is rotatable relative to the body 110. In various embodiments, the rod 128 is non-rotatably coupled to the cap 108 such that rotation of the cap 108 causes rotation of the rod 128.

The rod 128 may be operable to selectively couple weights 118 to the body 110 of the kettlebell 102. For example, the rod 128 may be rotatable relative to weights 118 positioned in the cavity 120 to couple one or more of the weights 118 to the body 110. The rod 128 may be positioned at least partially in the internal cavity 120 of the body 110 and to extend through apertures 130 formed in the weights 118. Engagement members, such as pins 134, may be coupled to the rod 128 for connecting the weights 118 to the rod 128. The pins 134 may be spaced apart from one another along a length of the rod 128 and may be oriented cross-wise or transverse (e.g., perpendicular) to the rod 128. A separate pin 134-1, 134-2, 134-3, 134-4, 134-5 may be provided for each weight 118-1, 118-2, 118-3, 118-4, 118-5, respectively. A first pin 134-1 may be configured to selectively engage the first weight 118-1, a second pin 134-2 may be configured to selectively engage the second weight 118-2, a third pin 134-3 may be configured to selectively engage the third weight 118-3, a fourth pin 134-4 may be configured to selectively engage the fourth weight 118-4, and a fifth pin 134-5 may be configured to selectively engage the fifth weight 118-5 depending on the rotational position of the pins 134 relative to the weights 118.

The weights 118 may be configured to selectively allow passage of the pins 134 through the weights 118 depending on the rotational position of the pins 134 relative to the weights 118. As illustrated in FIGS. 2, 3, and 6A-6E, each weight 118 may include a passageway 140 configured to allow passage of one or more of the pins 134. For example, the first weight 118-1 may include a first passageway 140-1, the second weight 118-2 may include a second passageway 140-2, the third weight 118-3 may include a third passageway 140-3, the fourth weight 118-4 may include a fourth passageway 140-4, and the fifth weight 118-4 may include a fifth passageway 140-5.

The passageways 140 may provide selective passage of one or more of the pins 134 during removal of the kettlebell 102 from the base 104 depending on the rotational position of the rod 128 relative to the weights 118. For example, in one rotational position of the rod 128, the passageways 140 may allow passage of the pins 134 through the weights 118, thereby not coupling any of the weights 118 to the body 110 of the kettlebell 102. In another rotational position of the rod 128, the first pin 134-1 may engage the first weight 118-1, but the passageways 140-2, 140-3, 140-4, 140-5 of the remaining weights 118-2, 118-3, 118-4, 118-5 may allow passage of the remaining pins 134-2, 134-3, 134-4, 134-5, thereby coupling only the first weight 118-1 to the body 110 of the kettlebell 102. In another rotational position of the rod 128, the first pin 134-1 may engage the first weight 118-1 and the second pin 134-2 may engage the second weight 118-2, but the passageways 140-3, 140-4, 140-5 of the remaining weights 118-3, 118-4, 118-5 may allow passage of the remaining pins 134-3, 134-4, 134-5, thereby coupling only the first weight 118-1 and the second weight 118-2 to the body 110 of the kettlebell 102. In another rotational position of the rod 128, the first pin 134-1 may engage the first weight 118-1, the second pin 134-2 may engage the second weight 118-2, and the third pin 134-3 may engage the third weight 118-3 but the passageways 140-4, 140-5 of the remaining weights 118-4, 118-5 may allow passage of the remaining pins 134-4, 134-5, thereby coupling only the first weight 118-1, the second weight 118-2, and the third weight 118-3 to the body 110 of the kettlebell 102. In another rotational position of the rod 128, the first pin 134-1 may engage the first weight 118-1, the second pin 134-2 may engage the second weight 118-2, the third pin 134-3 may engage the third weight 118-3, and the fourth pin 134-4 may engage the fourth weight 118-4, but the fifth passageway 140-5 of the fifth weight 118-5 may allow passage of the fifth pin 134-5, thereby coupling only the first weight 118-1, the second weight 118-2, the third weight 118-3, and the fourth weight 118-4 to the body 110 of the kettlebell 102. In another rotational position of the rod 128, the first pin 134-1 may engage the first weight 118-1, the second pin 134-2 may engage the second weight 118-2, the third pin 134-3 may engage the third weight 118-3, the fourth pin 134-4 may engage the fourth weight 118-4, and the fifth pin 134-5 may engage the fifth weight 118-5, thereby coupling the weights 118-1, 118-2, 118-3, 118-4, 118-5 to the body 110 of the kettlebell 102.

Referring to FIGS. 2, 3, and 6A-6E, the passageways 140 may be differently sized to provide selective passage of one or more of the pins 134 during removal of the kettlebell 102 from the base 104 depending on the rotational position of the rod 128 relative to the weights 118. For example, the first passageway 140-1 may be the narrowest passageway and may be sized to allow passage of the pins 134 in one rotational position of the rod 128 relative to the weights 118. The second passageway 140-2 may be wider than the first passageway 140-1 but narrower than the other passageways 140-3, 140-4, 140-5, and may be sized to allow passage of the second pin 134-2, the third pin 134-3, the fourth pin 134-4, and the fifth pin 134-5 in two rotational positions of the rod 128 relative to the weights 118. The third passageway 140-3 may be wider than the first passageway 140-1 and the second passageway 140-2, but narrower than the other passageways 140-4, 140-5, and may be sized to allow passage of the third pin 134-3, the fourth pin 134-4, and the fifth pin 134-5 in three rotational positions of the rod 128 relative to the weights 118. The fourth passageway 140-4 may be wider than the first passageway 140-1, the second passageway 140-2, and the third passageway 140-3, but narrower than the fifth passageway 140-5, and may be sized to allow passage of the fourth pin 134-4 and the fifth pin 134-5 in four rotational positions of the rod 128 relative to the weights 118. The fifth passageway 140-5 may be the widest passageway and may be sized to allow passage of the fifth pin 134-5 in five rotational positions of the rod 128 relative to the weights 118. Accordingly, based at least in part on the geometry of the passageways 140, no weights 118 may be coupled to the body 110 of the kettlebell 102 in a first rotational position of the rod 128; the first weight 118-1 may be coupled to the body 110 in a second rotational position of the rod 128; the first weight 118-1 and the second weight 118-2 may be coupled to the body 110 in a third rotational position of the rod 128; the first weight 118-1, the second weight 118-2, and the third weight 118-3 may be coupled to the body 110 in a fourth rotational position of the rod 128; the first weight 118-1, the second weight 118-2, the third weight 118-3, and the fourth weight 118-4 may be coupled to the body 110 in a fifth rotational position of the rod 128; and the first weight 118-1, the second weight 118-2, the third weight 118-3, the fourth weight 118-4, and the fifth weight 118-5 may be coupled to the body 110 in a sixth rotational position of the rod 128.

Figure 4:
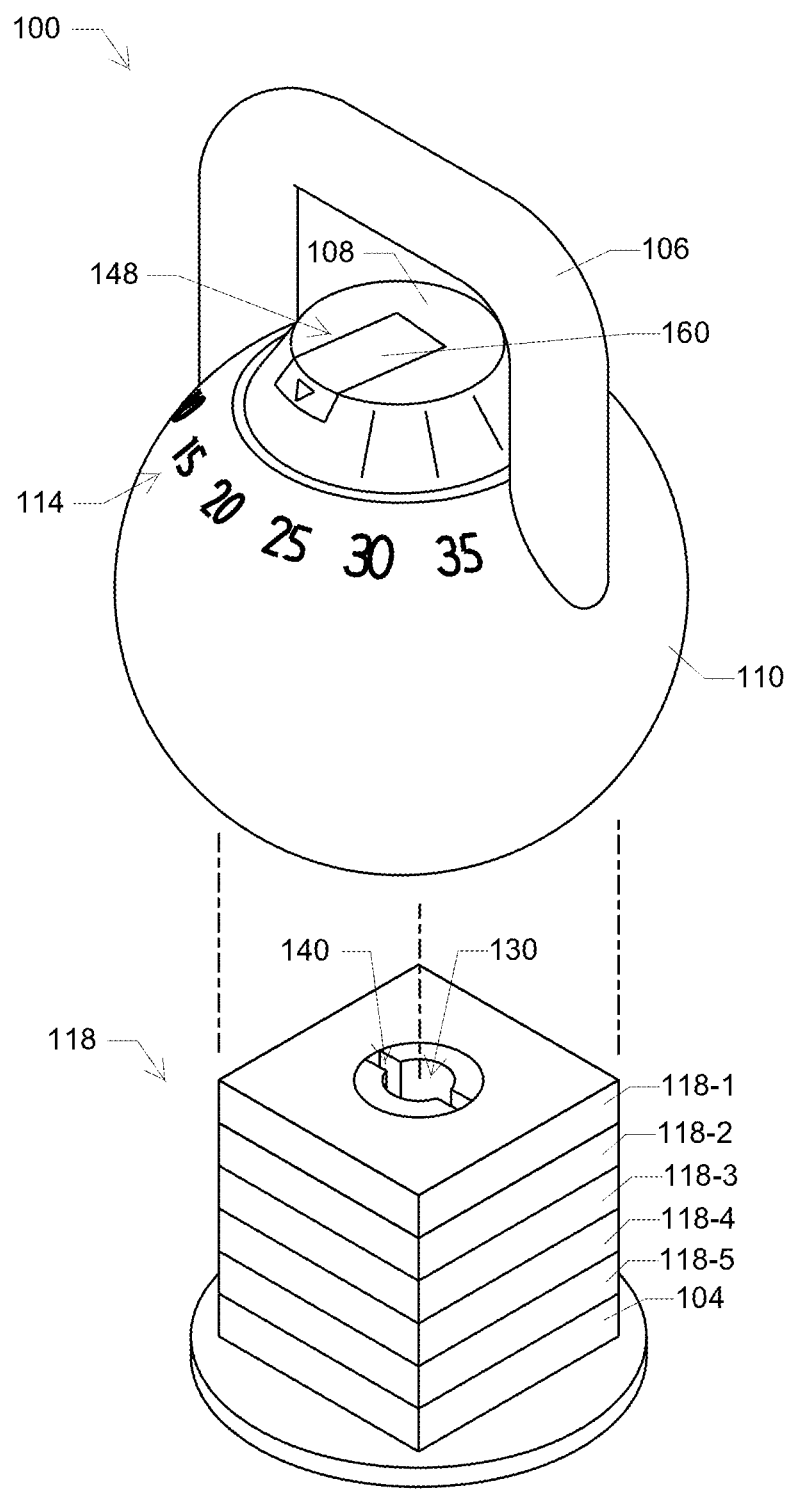
FIG. 4 is a perspective view of a body of the kettlebell of FIG. 1 exploded from a weight stack of the kettlebell and the base in accordance with various embodiments of the present disclosure.

FIG. 4 is a perspective view of the body 110 of the kettlebell 102 exploded from a stack of the weights 118 supported by the base 104 in accordance with various embodiments of the present disclosure. As illustrated in FIGS. 2-4, the apertures 130 may be centrally located in weights 118 and may be arranged along a longitudinal centerline of the kettlebell system 100. Similarly, the rod 128 may be arranged along a longitudinal centerline of the kettlebell 102, such that the rod 128 may extend through the apertures 130 when the body 110 of the kettlebell 102 is placed over the stack of weights 118 (see FIG. 3). The passageways 140 may extend radially outward from the apertures 130 in the respective weights 118 to permit passage of the pins 134 protruding laterally from the rod 128.

Figure 5:
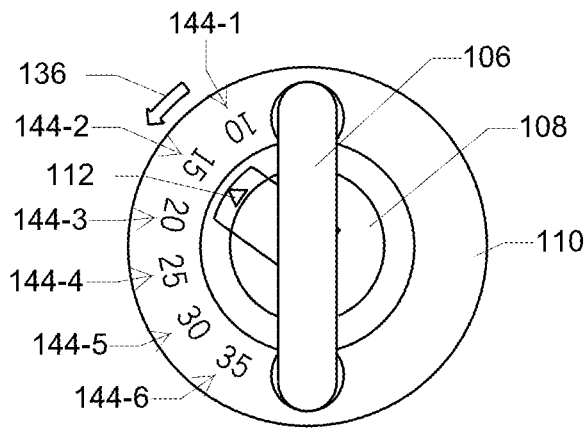
FIG. 5 is a top plan view of the kettlebell of FIG. 1 in accordance with various embodiments of the present disclosure.

FIG. 5 is a top plan view of the kettlebell 102 in accordance with various embodiments of the present disclosure. As the cap 108 is rotated relative to the body 110, different arrangements of the weights 118 (see FIG. 4) may be coupled to the body 110 via the rod 128. For example, in FIG. 5, the kettlebell 102 provides six different weight settings: a first weight setting 144-1 (e.g., 10 pounds), a second weight setting 144-2 (e.g., 15 pounds), a third weight setting 144-3 (e.g., 20 pounds), a fourth weight setting 144-4 (e.g., 25 pounds), a fifth weight setting 144-5 (e.g., 30 pounds), and a sixth weight setting 144-6 (e.g., 35 pounds). The first weight setting 144-1 may correspond to the weight of the kettlebell 102 with none of the weights 118 coupled to the body 110. The second weight setting 144-2 may correspond to the weight of the kettlebell 102 with one of the weights (e.g., the first weight 118-1) coupled to the body 110. The third weight setting 144-3 may correspond to the weight of the kettlebell 102 with two of the weights (e.g., the first weight 118-1 and the second weight 118-2) coupled to the body 110. The fourth weight setting 144-4 may correspond to the weight of the kettlebell 102 with three of the weights (e.g., the first weight 118-1, the second weight 118-2, and the third weight 118-3) coupled to the body 110. The fifth weight setting 144-5 may correspond to the weight of the kettlebell 102 with four of the weights (e.g., the first weight 118-1, the second weight 118-2, the third weight 118-3, and the fourth weight 118-4) coupled to the body 110. The sixth weight setting 144-6 may correspond to the weight of the kettlebell 102 with five of the weights (e.g., the first weight 118-1, the second weight 118-2, the third weight 118-3, the fourth weight 118-4, and the fifth weight 118-5) coupled to the body 110. The kettlebell 102 may include a different number of weight settings and increments depending on, for example, the number of weights 118 provided with the kettlebell 102 and/or the amount of each weight 118.

To couple the weights 118 to the body 110, the cap 108 may be rotated relative to the body 110 to select a desired amount of weight of the kettlebell 102. The rod 128 (see FIGS. 2 and 3) may rotate with the cap 108, thereby causing the pins 134 to rotate relative to the weights 118 and selectively engage one or more of the weights 118 depending on the rotational position of the pins 134 relative to the weights 118. The indicator (e.g., arrow 112) may identify the amount of the weight based on the rotational position of the cap 108 relative to the body 110.

Figures 6A, 6B, 6C:
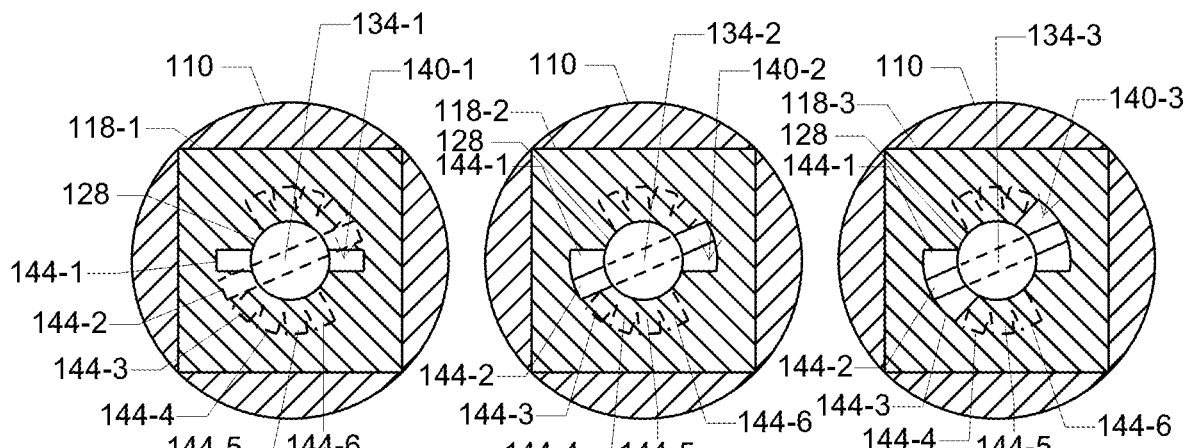
FIG. 6A is a cross-sectional view of the kettlebell of FIG. 1 taken through a first weight of the kettlebell in accordance with various embodiments of the present disclosure.
FIG. 6B is a cross-sectional view of the kettlebell of FIG. 1 taken through a second weight of the kettlebell in accordance with various embodiments of the present disclosure.
FIG. 6C is a cross-sectional view of the kettlebell of FIG. 1 taken through a third weight of the kettlebell in accordance with various embodiments of the present disclosure.

In FIG. 5, the cap 108 has been rotated relative to the body 110 (see rotation arrow 136) to select the second weight setting 144-2 (e.g., 15 pounds) for the kettlebell 102. FIGS. 6A-6E are cross-sectional views of the kettlebell 102 taken through weights 118-1-118-5, respectively, for the second weight setting 144-2 selected in FIG. 5. As illustrated in FIG. 6A, in the second weight setting 144-2, the first cross pin 134-1 is misaligned with the first passageway 140-1 in the first weight 118-1 such that the first cross pin 134-1 is positioned at least partially beneath the first weight 118-1 to couple the first weight 118-1 to the body 110 of the kettlebell 102. The position of the first pin 134-1 in the first weight setting 144-1 (aligned with the first passageway 140-1), the third weight setting 144-3 (misaligned with the first passageway 140-1), the fourth weight setting 144-4 (misaligned with the first passageway 140-1), the fifth weight setting 144-5 (misaligned with the first passageway 140-1), and the sixth weight setting 144-6 (misaligned with the first passageway 140-1) relative to the first weight 118-1 also are illustrated in FIG. 6A for reference purposes. The weights 118 may define recesses or seats for the cross pins 134 to be seated when misaligned with the passageways 140 to facilitate retention of the cross pins 134 in a given weight setting.

As illustrated in FIG. 6B, in the second weight setting 144-2, the second cross pin 134-2 is aligned with the second passageway 140-2 in the second weight 118-2 such that the second cross pin 134-2 passes through the second passageway 140-2 without coupling the second weight 118-2 to the body 110 of the kettlebell 102. The position of the second pin 134-2 in the first weight setting 144-1 (aligned with the second passageway 140-2), the third weight setting 144-3 (misaligned with the second passageway 140-2), the fourth weight setting 144-4 (misaligned with the second passageway 140-2), the fifth weight setting 144-5 (misaligned with the second passageway 140-2), and the sixth weight setting 144-6 (misaligned with the second passageway 140-2) relative to the second weight 118-2 also are illustrated in FIG. 6B for reference purposes.

As illustrated in FIG. 6C, in the second weight setting 144-2, the third cross pin 134-3 is aligned with the third passageway 140-3 in the third weight 118-3 such that the third cross pin 134-3 passes through the third passageway 140-3 without coupling the third weight 118-3 to the body 110 of the kettlebell 102, and also passes through the second passageway 140-2 of the second weight 118-2 (see FIG. 6B). The position of the third pin 134-3 in the first weight setting 144-1 (aligned with the third passageway 140-3), the third weight setting 144-3 (aligned with the third passageway 140-3), the fourth weight setting 144-4 (misaligned with the third passageway 140-3), the fifth weight setting 144-5 (misaligned with the third passageway 140-3), and the sixth weight setting 144-6 (misaligned with the third passageway 140-3) relative to the third weight 118-3 also are illustrated in FIG. 6C for reference purposes.

Figures 6D, 6E:
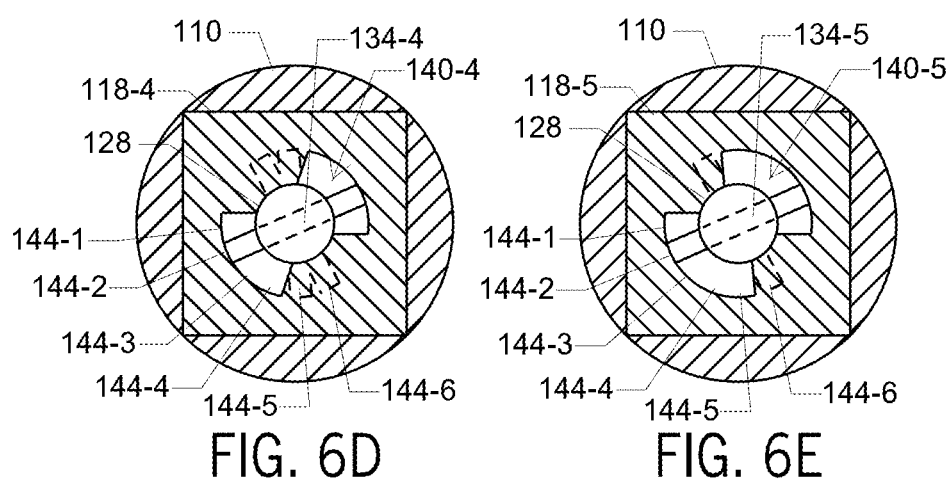
FIG. 6D is a cross-sectional view of the kettlebell of FIG. 1 taken through a fourth weight of the kettlebell in accordance with various embodiments of the present disclosure.
FIG. 6E is a cross-sectional view of the kettlebell of FIG. 1 taken through a fifth weight of the kettlebell in accordance with various embodiments of the present disclosure.

As illustrated in FIG. 6D, in the second weight setting 144-2, the fourth cross pin 134-4 is aligned with the fourth passageway 140-4 in the fourth weight 118-4 such that the fourth cross pin 134-4 passes through the fourth passageway 140-4 without coupling the fourth weight 118-4 to the body 110 of the kettlebell 102, and also passes through the second passageway 140-2 of the second weight 118-2 (see FIG. 6B) and the third passageway 140-3 of the third weight 118-3 (see FIG. 6C). The position of the fourth pin 134-4 in the first weight setting 144-1 (aligned with the fourth passageway 140-4), the third weight setting 144-3 (aligned with the fourth passageway 140-4), the fourth weight setting 144-4 (aligned with the fourth passageway 140-4), the fifth weight setting 144-5 (misaligned with the fourth passageway 140-4), and the sixth weight setting 144-6 (misaligned with the fourth passageway 140-4) relative to the fourth weight 118-4 also are illustrated in FIG. 6D for reference purposes.

As illustrated in FIG. 6E, in the second weight setting 144-2, the fifth cross pin 134-5 is aligned with the fifth passageway 140-5 in the fifth weight 118-5 such that the fifth cross pin 134-5 passes through the fifth passageway 140-5 without coupling the fifth weight 118-5 to the body 110 of the kettlebell 102, and also passes through the second passageway 140-2 of the second weight 118-2 (see FIG. 6B), the third passageway 140-3 of the third weight 118-3 (see FIG. 6C), and the fourth passageway 140-4 of the fourth weight 118-4 (see FIG. 6D). The position of the fifth pin 134-5 in the first weight setting 144-1 (aligned with the fifth passageway 140-5), the third weight setting 144-3 (aligned with the fifth passageway 140-5), the fourth weight setting 144-4 (aligned with the fifth passageway 140-5), the fifth weight setting 144-5 (aligned with the fifth passageway 140-5), and the sixth weight setting 144-6 (misaligned with the fifth passageway 140-5) relative to the fifth weight 118-5 also are illustrated in FIG. 6E for reference purposes.

FIGS. 7 and 14 are partial cross-sectional views of the kettlebell system 100 with the weight selector assembly 126 in an unlocked configuration in accordance with various embodiments of the present disclosure. In the unlocked configuration, the weight selector assembly 126 can be manipulated by the user to adjust the amount of weight of the kettlebell 102, such as by selectively coupling one or more of the weights 118 to the body 110 of the kettlebell 102. As illustrated in FIGS. 7 and 14, in the unlocked configuration, the selector rod 128 is displaced downwardly along its longitudinal axis such that the cross pins 134 are spaced apart from an underside of the respective weights 118.

FIGS. 8 and 13 are partial cross-sectional views of the kettlebell system 100 with the weight selector assembly 126 in a locked configuration in accordance with various embodiments of the present disclosure. In the locked configuration, the weight selector assembly 126 inhibits adjustment of the amount of weight of the kettlebell 102. As illustrated in FIGS. 8 and 13, in the locked configuration, the selector rod 128 is displaced upwardly along its longitudinal axis relative to the unlocked configured illustrated in FIGS. 7 and 14 such that the cross pins 134 engage an underside of the weights 118 to secure one or more of the weights 118 to the body 110 of the kettlebell 102 depending on the rotational position of the pins 134 relative to the weights 118.

Referring to FIGS. 2 and 3, the weight selector assembly 126 may include an anti-rotation, engagement, or lock member 150 non-rotatably coupled to the selector rod 128. The lock member 150 may be configured to engage the body 110 of the kettlebell 102 when the weight selector assembly 126 is in the locked configuration (see FIGS. 8 and 13) to restrict rotation of the rod 128 relative to the body 110, such as during exercise. Referring to FIGS. 7, 8, 13, and 14, the lock member 150 may be positioned in the internal cavity 120 of the body 110 of the kettlebell 102, and may be positioned above the weights 118.

The lock member 150 may include one or more projections (e.g., teeth 152) that engage the body 110 to restrict rotation of the rod 128 when the weight selector assembly 126 is in the locked configuration (see FIGS. 8 and 13). The teeth 152 may project upwardly from a base (e.g., a substantially circular plate 154) of the lock member 150. Referring to FIGS. 2 and 3, the rod 128 may be coupled to an inner perimeter of the plate 154 and the teeth 152 may project upwardly from an outer perimeter of the plate 154. The lock member 150 and the rod 128 may be arranged coaxially about the longitudinal axis of the rod 128.

Referring to FIGS. 7, 8, 13, and 14, the body 110 of the kettlebell 102 may include a wall 156 oriented transverse (e.g., perpendicular) to the selector rod 128. The rod 128 may extend through an aperture formed centrally in the wall 156 such that the rod 128 is slidable along its longitudinal axis relative to the wall 156. Actuator 148 and the lock member 150 may be positioned on opposite sides of the wall 156. For example, as illustrated in FIGS. 7, 8, 13, and 14, the actuator 148 may be positioned along an upper side of the wall 156 such that the actuator 148 is located exterior of the internal cavity 120 and is accessible by a user, and the lock member 150 may be positioned along a lower side of the wall 156 such that the lock member 150 is located in the internal cavity 120 of the body 110 of the kettlebell 102 and concealed from view during use of the kettlebell 102.

With continued reference to FIGS. 7, 8, 13, and 14, the lock member 150 may selectively engage the wall 156 to restrict rotation of the rod 128. In various embodiments, the wall 156 may be castellated and may at least partially protrude into the internal cavity 120. The wall 156 may include downwardly-protruding teeth 158, and the teeth 152 of the lock member 150 may be configured to interdigitate or intermesh with the teeth 158 protruding from the wall 156 at rotational positions of the rod 128 corresponding to different weight selections. For example, when the user selects a weight setting (e.g., one of the weight settings 144-1, 144-2, 144-3, 144-4, 144-5, 144-6 illustrated in FIG. 5), the rod 128 may be rotationally positioned such that the teeth 152 of the lock member 150 are rotationally offset from the teeth 158 of the wall 156 to enable intermeshing of the lock member 150 with the castellated wall 156. In the locked configuration of the weight selector assembly 126 (see FIGS. 8 and 13), the teeth 152 of the lock member 150 may be intermeshed with the teeth 158 of the wall 156 to restrict rotation of the rod 128 relative to the body 110 and the weights 118. In the unlocked configuration of the weight selector assembly 126 (see FIGS. 7 and 14), the teeth 152 of the lock member 150 may be disengaged from the teeth 158 of the wall 156 to permit rotation of the rod 128 relative to the body 110 and the weights 118.

To transition the weight selector assembly 126 between the locked configuration and the unlocked configuration, the rod 128 may be movable in an axial direction relative to the body 110 to selectively engage or disengage the lock member 150 with or from, respectively, the body 110. To move the rod 128 in an axial direction, the actuator 148 may be coupled to the rod 128 and may be operable to move the rod 128 upwardly and downwardly in the axial direction of the rod 128.

The actuator 148 may be movable by a user between a first position in which the actuator 148 causes the lock member 150 to be engaged with the body 110 and a second position in which the actuator 148 causes the lock member 150 to be disengaged from the body 110. The actuator 148 may be configured to retain the rod 128, and thus the lock member 150, in the first position and the second position until the actuator 148 is acted upon by the user. In various embodiments, the actuator 148 may be a lever 160 (see FIGS. 7 and 8) rotatably coupled to an upper end portion of the rod 128, a depressible button 162 (see FIGS. 13 and 14) coupled to an upper end portion of the rod 128, or a different actuator capable of moving the rod 128 upwardly and downwardly along its longitudinal axis. Referring to FIGS. 7 and 8, the lever 160 may be pivoted about its connection point to the rod 128 (e.g., via pivot pin 164) to move the rod 128 in an axial direction. Referring to FIGS. 13 and 14, the button 162 may be moved in an axial direction along a longitudinal axis of the rod 128 to move the rod 128 in the axial direction.

Referring to FIGS. 7 and 8, the lever 160 may be movable by a user between a first position in which the lock member 150 is engaged with the body 110 of the kettlebell 102 and a second position in which the lock member 150 is disengaged from the body 110. Referring to FIG. 8, when in the first position, an upper surface of the lever 160 may be substantially coplanar or flush with an upper surface of the cap 108. In the first position of the lever 160, the rod 128 may be positioned in an upward position in which the lock member 150 is engaged with the wall 156, thereby restricting rotation of the rod 128 relative to the body 110 of the kettlebell 102. The lever 160 may be shaped to retain the rod 128 in the upward position. Referring to FIG. 7, when in the second position, the lever 160 may extend upwardly at a transverse angle relative to an upper surface of the cap 108. In the second position of the lever 160, the rod 128 may be positioned in a downward position in which the lock member 150 is disengaged from the wall 156, thereby permitting rotation of the rod 128 relative to the body 110 of the kettlebell 102. By extending upward from the cap 108 in the second position, the lever 160 may function as an indicator to the user that the weight of the kettlebell 102 may be adjusted.

The lever 160 may include a cam surface 168 that bears against an upper side 170 of the wall 156 to adjust the vertical distance between the pivot pin 164 and the wall 156, thereby moving the selector rod 128 in a vertical direction along its longitudinal axis. When the lever 160 is moved from the first position (locked configuration, see FIG. 8) to the second position (unlocked configuration, see FIG. 7), the lever 160 may lower the rod 128 relative to the body 110. For example, the cam surface 168 may be shaped such that the distance between the portion of the cam surface 168 contacting the upper side 170 of the wall 156 in the first position of the lever 160 and the pivot pin 164 is greater than the distance between the portion of the cam surface 168 contacting the upper side 170 of the wall 156 in the second position of the lever 160 and the pivot pin 164, thereby lowering the vertical location of the pivot pin 164 (and thus the rod 128) when pivoting the lever 160 from the first position to the second position. Conversely, when the lever 160 is pivoted from the second position to the first position, the lever 160 raises the rod 128 relative to the body 110. In operation, the user may pivot the lever 160 from the first position to the second position to unlock the weight selector assembly 126, adjust the weight of the kettlebell 102 by rotating the cap 108 relative to the body 110 of the kettlebell 102, and then pivot the lever 160 from the second position to the first position to lock the weight selector assembly 126, thereby inhibiting the weights 118 from being inadvertently detached from the kettlebell 102 during exercise.

Referring to FIGS. 13 and 14, the button 162 may be movable by a user between a first position in which the lock member 150 is engaged with the body 110 of the kettlebell 102 and a second position in which the lock member 150 is disengaged from the body 110. Referring to FIG. 13, when in the first position, an upper surface of the button 162 may be substantially coplanar or flush with (or protrude slightly upwardly from) an upper surface of the cap 108. In the first position of the button 162, the rod 128 may be positioned in an upward position in which the lock member 150 is engaged with the wall 156, thereby restricting rotation of the rod 128 relative to the body 110 of the kettlebell 102. Referring to FIG. 14, when in the second position, the button 162 may be raised relative to an upper surface of the cap 108. In the second position of the button 162, the rod 128 may be positioned in a downward position in which the lock member 150 is disengaged from the wall 156, thereby permitting rotation of the rod 128 relative to the body 110 of the kettlebell 102. By extending upward from the cap 108 in the second position, the button 162 may function as an indicator to the user that the weight of the kettlebell 102 may be adjusted. In various embodiments, an outer surface 172 of the button 162 may be exposed in the second position of the button 162 and may include an indicator (such as a red warning indicator) to indicate to the user the weight of the kettlebell 102 is adjustable.

Figure 12A:
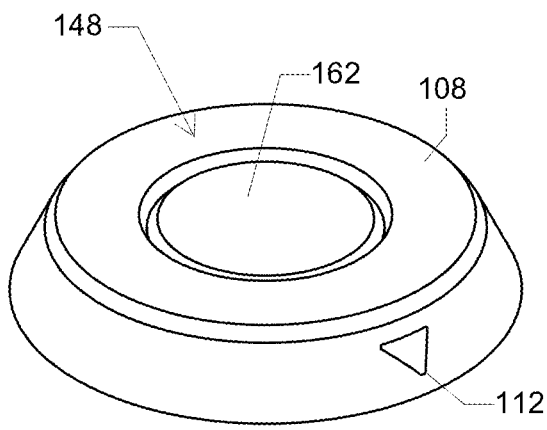
FIG. 12A is a perspective view of a cap of the kettlebell of FIG. 11 with the cap in a first weight selection position and an actuator in a depressed position in accordance with various embodiments of the present disclosure.
Figure 12B:
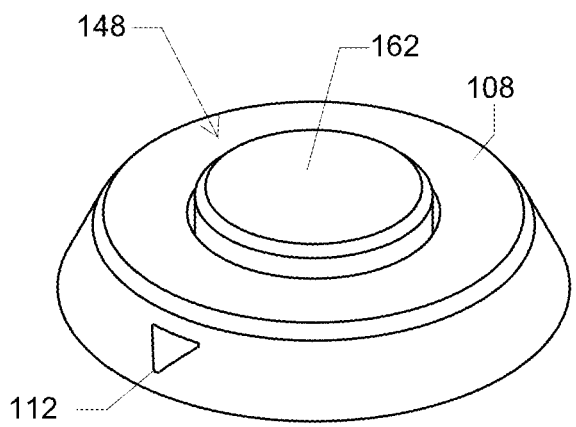
FIG. 12B is a perspective view of the cap of FIG. 12A with the actuator in a non-depressed position and the cap in a second weight selection position in accordance with various embodiments of the present disclosure.
Figure 12C:
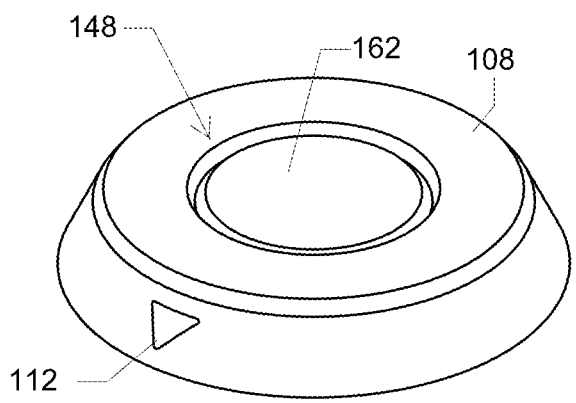
FIG. 12C is a perspective view of the cap of FIG. 12B with the actuator in a depressed position in accordance with various embodiments of the present disclosure.

The actuator may include a cam 174, a follower 176, and a push rod 178 connected to the button 162 and configured to push the follower 176, which components are operable to move the selector rod 128 in a vertical direction along its longitudinal axis. When the button 162 is moved from the first position (locked configuration, see FIG. 13) to the second position (unlocked configuration, see FIG. 14), the button 162 may lower the rod 128 relative to the body 110. For example, the cam 174 may be shaped such that the follower 176 is retained in a lowered position, thereby lowering the rod 128, when moving the button 162 from the first position to the second position. Conversely, when the button 162 is moved from the second position to the first position, the cam 174 may be shaped such that the follower 176 is retained in an upper position, thereby raising the rod 128 relative to the body 110. In operation, the user may push the button 162 in a downward direction (see FIG. 12A) to unlock the weight selector assembly 126 (for example, by freeing the button 162 to raise into the second position), adjust the weight of the kettlebell 102 by rotating the cap 108 (see FIG. 12B) relative to the body 110 of the kettlebell 102 to a different weight setting, and then push the button 162 in a downward direction from the second position to the first position (see FIG. 12C) to lock the weight selector assembly 126, thereby inhibiting the weights 118 from being inadvertently detached from the kettlebell 102 during exercise.

Referring to FIG. 4, the base 104 may be configured to support weights 118 not coupled to the body 110 of the kettlebell 102. For example, as illustrated in FIG. 4, the first weight 118-1, the second weight 118-2, the third weight 118-3, the fourth weight 118-4, and the fifth weight 118-5 are arranged in a vertical stack and are supported by the base 104. When the body 110 of the kettlebell 102 is placed over weights 118 supported by the base 104, the selector rod 128 may be rotated relative to the body 110 to selectively couple one or more of the weights 118 to the body 110. When one or more of the weights 118 are properly coupled to the body 110 (such as when the cap 108 is rotated into one of the weight settings 144-1, 144-2, 144-3, 144-4, 144-5, 144-6 as illustrated in FIG. 5), the body 110 of the kettlebell 102 and the coupled weights 118 may be removed from the base 104. However, when one or more of the weights 118 are not properly coupled to the body 110 (such as when the cap 108 is positioned between weight settings), the body 110 of the kettlebell 102 and the coupled weights 118 may be restricted from being removed from the base 104 until the weights are properly coupled to the body 110.

Figure 9:
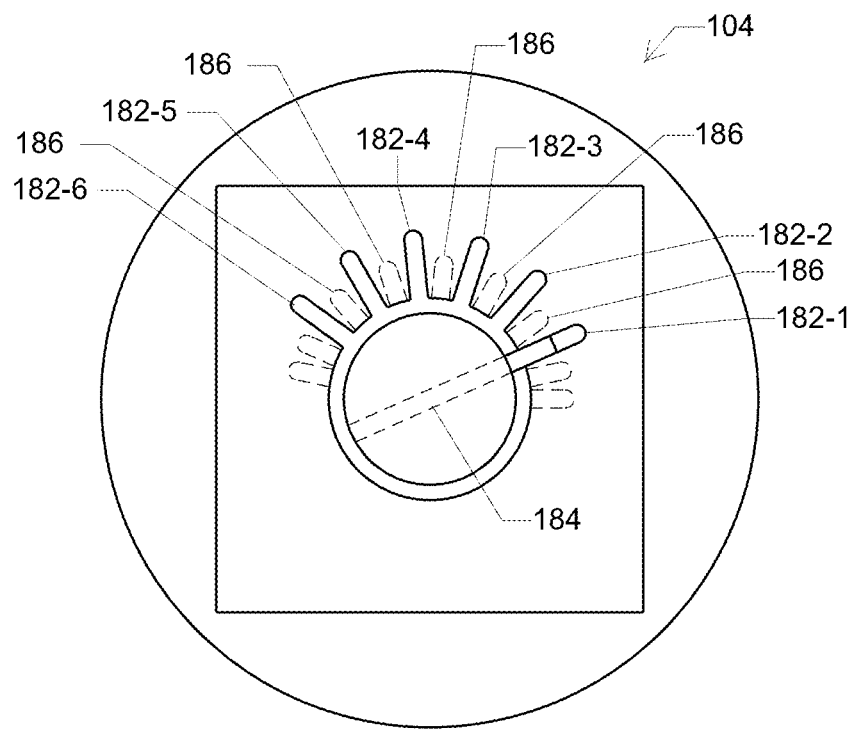
FIG. 9 is a schematic view of the base of FIG. 1 with a weight selector assembly in a proper weight-selection position in accordance with various embodiments of the present disclosure.
Figure 10:
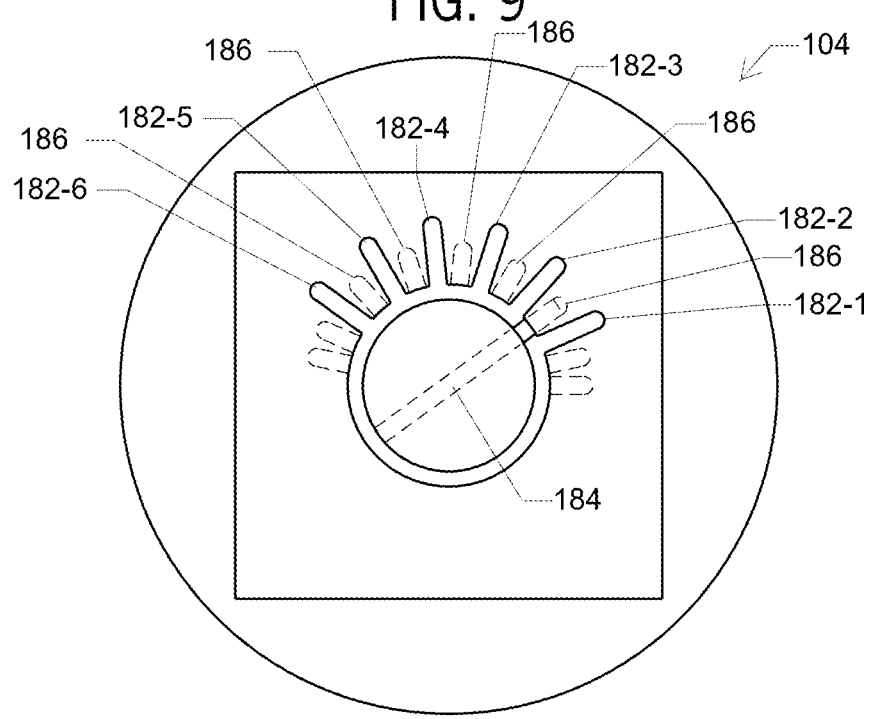
FIG. 10 is a schematic view of the base of FIG. 1 with a weight selector assembly in an improper weight-selection position in accordance with various embodiments of the present disclosure.

Referring to FIGS. 2 and 3, the selector rod 128 may be configured to selectively engage the base 104 to restrict removal of the kettlebell 102 from the base 104. For example, the rod 128 may be configured to engage the base 104 in rotational positions of the rod 128 in which one or more weights 118 are not properly coupled to the body 110. As illustrated in FIGS. 2 and 3, the base 104 may define slots 182 corresponding to rotational positions of the rod 128 in which weights 118 are fully coupled to the body 110. For example, the base 104 may include a slot 182 for each weight setting 144 of the kettlebell 102. As illustrated in FIGS. 9 and 10, the base 104 may include a first slot 182-1 corresponding to the first weight setting 144-1, a second slot 182-2 corresponding to the second weight setting 144-2, a third slot 182-3 corresponding to the third weight setting 144-3, a fourth slot 182-4 corresponding to the fourth weight setting 144-4, a fifth slot 182-5 corresponding to the fifth weight setting 144-5, and a sixth slot 182-6 corresponding to the sixth weight setting 144-6.

The selector rod 128 may include a transverse pin 184 configured to be aligned with the slots 182 at the corresponding rotational positions of the rod 128. When the pin 184 is aligned with one of the slots 182, the body 110 of the kettlebell 102 can be removed from the base 104. When the pin 184 is misaligned with the slots 182, the base 104 prevents the body 110 of the kettlebell 102 from being removed from the base 104 until the pin 184 is aligned with one of the slots 182. The base 104 may define an internal void connecting the slots 182 together to allow the pin 184 to be rotated relative to the base 104 and selectively align the pin 184 with respective slots 182 when a proper weight selection is made by the user. As previously discussed, the base 104 may be fixedly secured to a support structure, thereby preventing the user from lifting the base 104 from the support structure.

FIG. 9 is a schematic view of the base 104 with the weight selector assembly 126 in a proper weight-selection position in accordance with various embodiments of the present disclosure. As illustrated in FIG. 9, the pin 184 is aligned with one of the slots 182-1 corresponding to the first weight setting 144-1 (see FIG. 5). In this rotational position, the pin 184 can be removed from the base 104 via the first slot 182-1, thereby allowing the kettlebell 102 to be removed from the base 104. Similarly, the kettlebell 102 can be removed from the base 104 when the pin 184 is aligned with the second slot 182-2, the third slot 182-3, the fourth slot 182-4, the fifth slot 182-5, and the sixth slot 182-6. The base 104 may include more or less slots 182 based on the number of weight settings of the kettlebell 102.

FIG. 10 is a schematic view of the base 104 with the weight selector assembly 126 in an improper weight-selection position in accordance with various embodiments of the present disclosure. The base 104 may define recesses or seats 186 between adjacent slots 182, and the seats 186 may correspond to rotational positions of the selector rod 128 in which one or more weights 118 are improperly coupled to the body 110 of the kettlebell 102. The transverse pin 184 may be configured to be aligned with the seats 186 at the corresponding improper rotational positions of the rod 128 to restrict removal of the kettlebell 102 from the base 104 until the pin 184 is aligned with one of the slots 182. For example, as illustrated in FIG. 10, the transverse pin 184 is located in seat 186 located between the first slot 182-1 and the second slot 182-2. The position of the transverse pin 184 in FIG. 10 generally corresponds to the indicator 112 being improperly located between the first weight setting 144-1 and the second weight setting 144-2 (see FIG. 5). In this rotational position, the pin 184 cannot be removed from the base 104 via one of the slots 182, thereby preventing the kettlebell 102 from being removed from the base 104 until the pin 184 is aligned with one of the slots 182 by rotating the selector rod 128 relative to the base 104 into a proper weight setting 144.

Referring generally to FIGS. 1-14, a user may adjust the weight of a kettlebell 102 by rotating the selector rod 128 to couple one or more of the weights 118 to the body 110 of the kettlebell 102. After a desired number of weights 118 are coupled to the body 110 of the kettlebell 102, the lock member 150 may be engaged with the body 110 of the kettlebell 102 to restrict rotation of the selector rod 128 relative to the weights 118, thereby ensuring the weights are not inadvertently detached from the body 110 of the kettlebell 102 during exercise. The lock member 150 may be formed as a toothed plate that is non-rotatably coupled to the selector rod 128, and the toothed plate 150 may be intermeshed with the castellated wall 156 of the body 110 of the kettlebell 102 to restrict rotation of the selector rod 128 relative to the weights 118 during exercise. If a proper weight selection has not been made, then the kettlebell 102 may be restrained to the base 104 for safety purposes. Once a proper weight selection has been made, the kettlebell 102 may be removed from the base 104.

Figure 15:
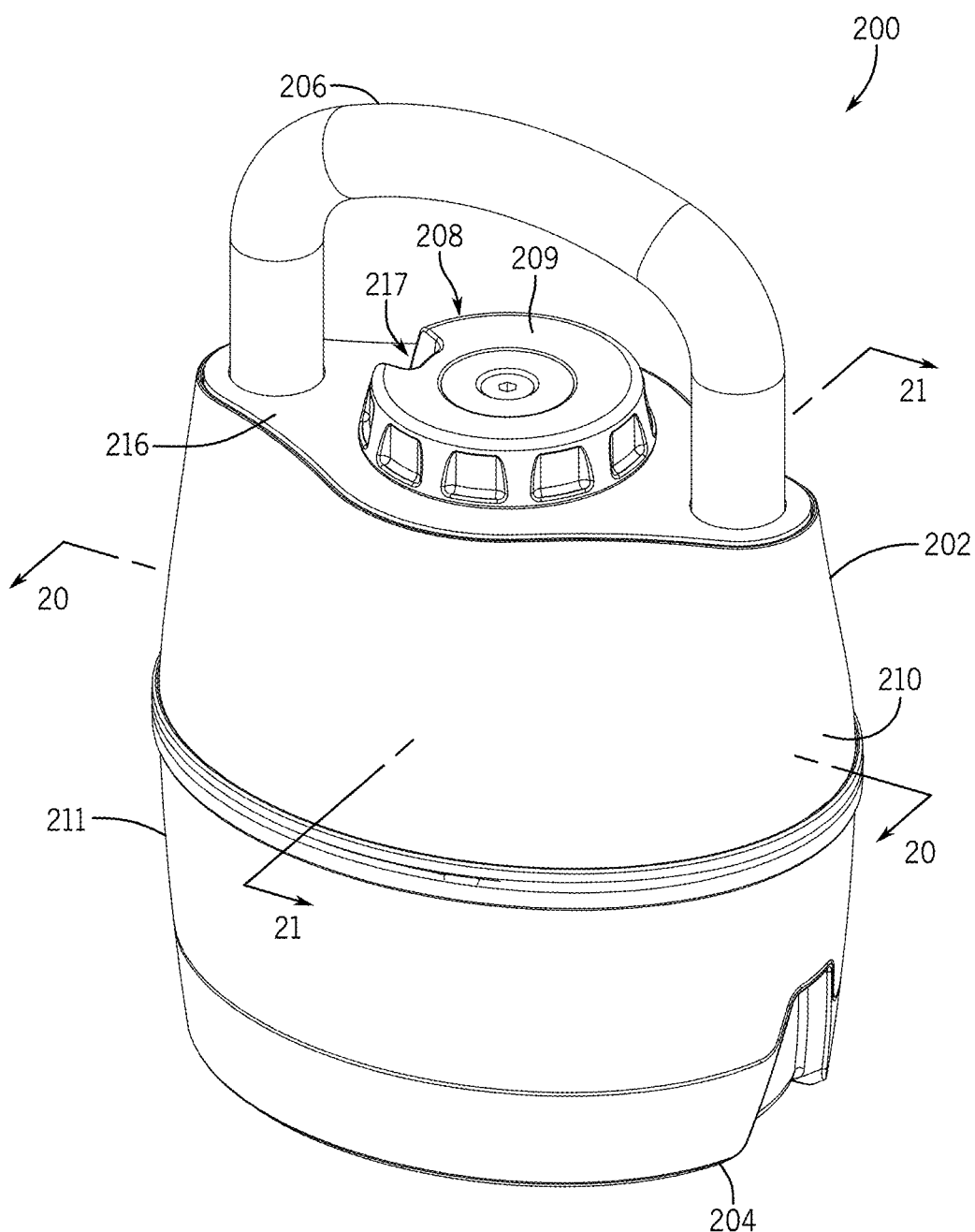
FIG. 15 is an isometric view of a kettlebell system in accordance with further embodiments of the present disclosure.

FIGS. 15-30 show a kettlebell system 200 and components thereof in accordance with further examples of the present disclosure. The kettlebell system 200 includes an adjustable weight kettlebell 202. The adjustable weight kettlebell 202 is configured to selectively removably couple to one or more of a plurality of weights 218. The adjustable weight kettlebell 202 may be configured to automatically unlock for weight adjustment by placing the kettlebell 202 on a support surface (e.g., a base 204). In some embodiments, the kettlebell system 200 may further include a base 204. The base 204 is positionable on, and in various embodiments secured to, a support structure, such as a floor, a stand, or other structure providing a support surface. In some embodiments, the base 204 may include traction features 205 on the bottom side of the base 204 for increasing the friction between the bottom side of the base 204 and the support surface and thus reducing the risk of slip of the base 204, and the kettlebell 202 when resting on the base, relative to the support surface. When not being used to perform an exercise, the kettlebell 202 may be positioned on the base 204, as shown in FIG. 15. In such instances, the kettlebell 202 may be supported by the base 204 such that the kettlebell 202 is oriented in an upright position with the grip or handle 206 of the kettlebell 202 directed generally upward to facilitate grasping by a user. In some embodiments, the kettlebell system 200 is configured such that placing the kettlebell 202 on the base 204 automatically unlocks the kettlebell 202 for weight adjustment.

Figure 16:
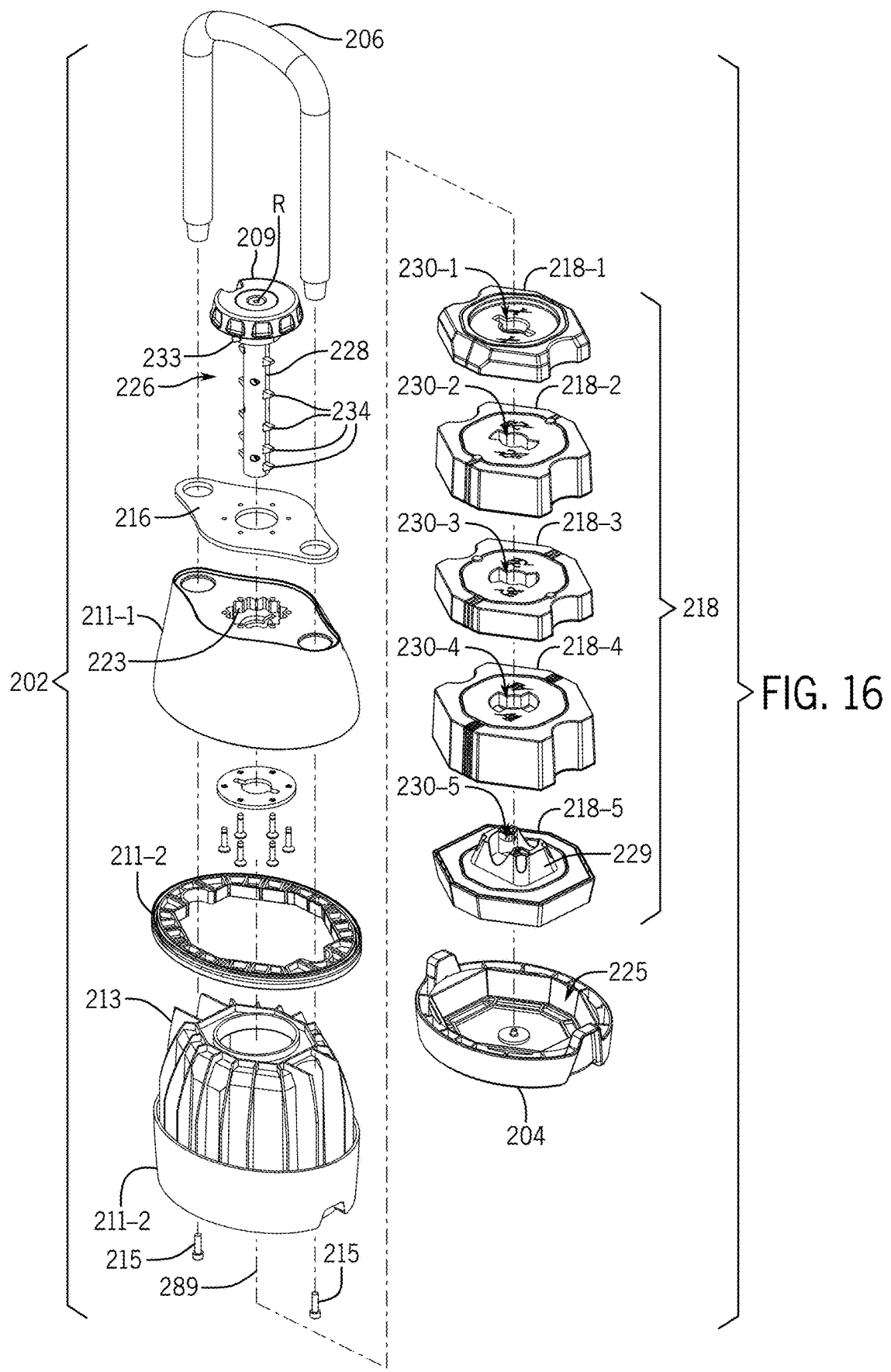
FIG. 16 is an exploded view of the kettlebell system of FIG. 15.

The kettlebell body 210 may include a housing 211 and a handle 206 coupled to the housing. The housing 211 may be implemented as a single housing, or as shown in FIG. 16 the housing 211 may be implemented using a plurality of housing portions operatively joined together. For example, the housing 211 may include a first or top housing portion 211-1 and a second or bottom housing portion 211-2 joined to the top housing portion 211-1.

The kettlebell body 210 may be configured for functional and/or aesthetic purposes. For example, the outer contours of the housing 211 may be configured to provide both aesthetically pleasing appearance and enhance ergonomics. In some examples, the housing 211 may include a third housing portion 211-3. In the example in FIG. 16, the third housing portion 211-3 may be positioned between the top and bottom housing portions 211-1 and 211-2, respectively, and may thus also be referred to as middle housing portion 211-3. In some embodiments, the middle housing portion 211-3 may be configured to function as a bumper. For example, the middle housing portion 211-3 may protrude radially outward of the contours of the top and bottom housing portions 211-1 and 211-2, respectively. Additionally and optionally, the middle housing portion 211-3 may be formed of or coated with a material, which is softer than the other two housing portions. The top and bottom housing portions 211-1 and 211-2, respectively, may be made of a relatively rigid material such as metal, a rigid and relatively high-strength plastic, or a composite material, while the middle housing portion 211-3 may be made of or include a resiliently deformable material such as rubber or other type of elastomer material. In some embodiments, one of the top and bottom housing portions 211-1 and 211-2, respectively, may extend into the other, which may enhance the strength and rigidity of the coupling between the top and bottom housing portions 211-1 and 211-2, respectively. In the example in FIG. 16, the bottom housing portion 211-2 extends into the top housing portion 211-1. In other embodiments, the arrangement may be reversed. The bottom housing portion 211-2 may include an upper part 213 that extends into substantially the full height of the top housing portion 211-1.

The handle 206 may be implemented as a generally tubular member curved into an ergonomically suitable shape. In some examples, e.g., as shown in FIGS. 16 and 20A, the handle 206 may extend into the housing, for example through the top housing portion 211-1 and be coupled to the bottom housing portion 211-2 (e.g., using the fasteners 215). Such an arrangement may provide a more rigid and secure connection between the handle 206 and kettlebell body 210, which may reduce the risk of separation of the handle and thus injury during use of the kettlebell 202, particularly when the kettlebell 202 is loaded with weights. In some embodiments, the handle 206 may implemented as a generally hallow tubular member. In some embodiments, the handle 206 may include one or more inserts 219 in at least a portion of the interior of the handle 206, such as the portion extending into the housing, e.g., for increasing the stiffness of that portion of the handle 206.

Figure 17:
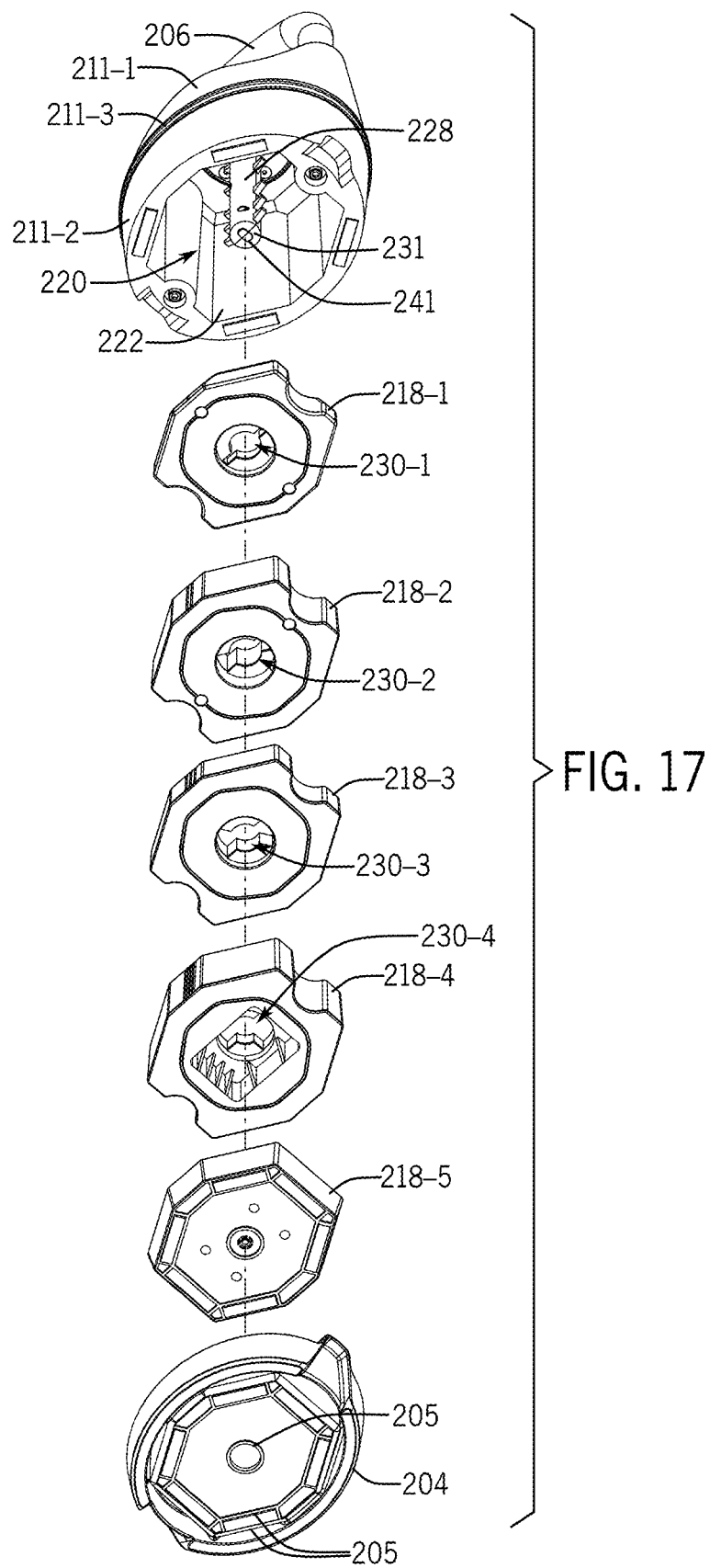
FIG. 17 is another partially exploded view of the kettlebell system of FIG. 15.
Figure 18:
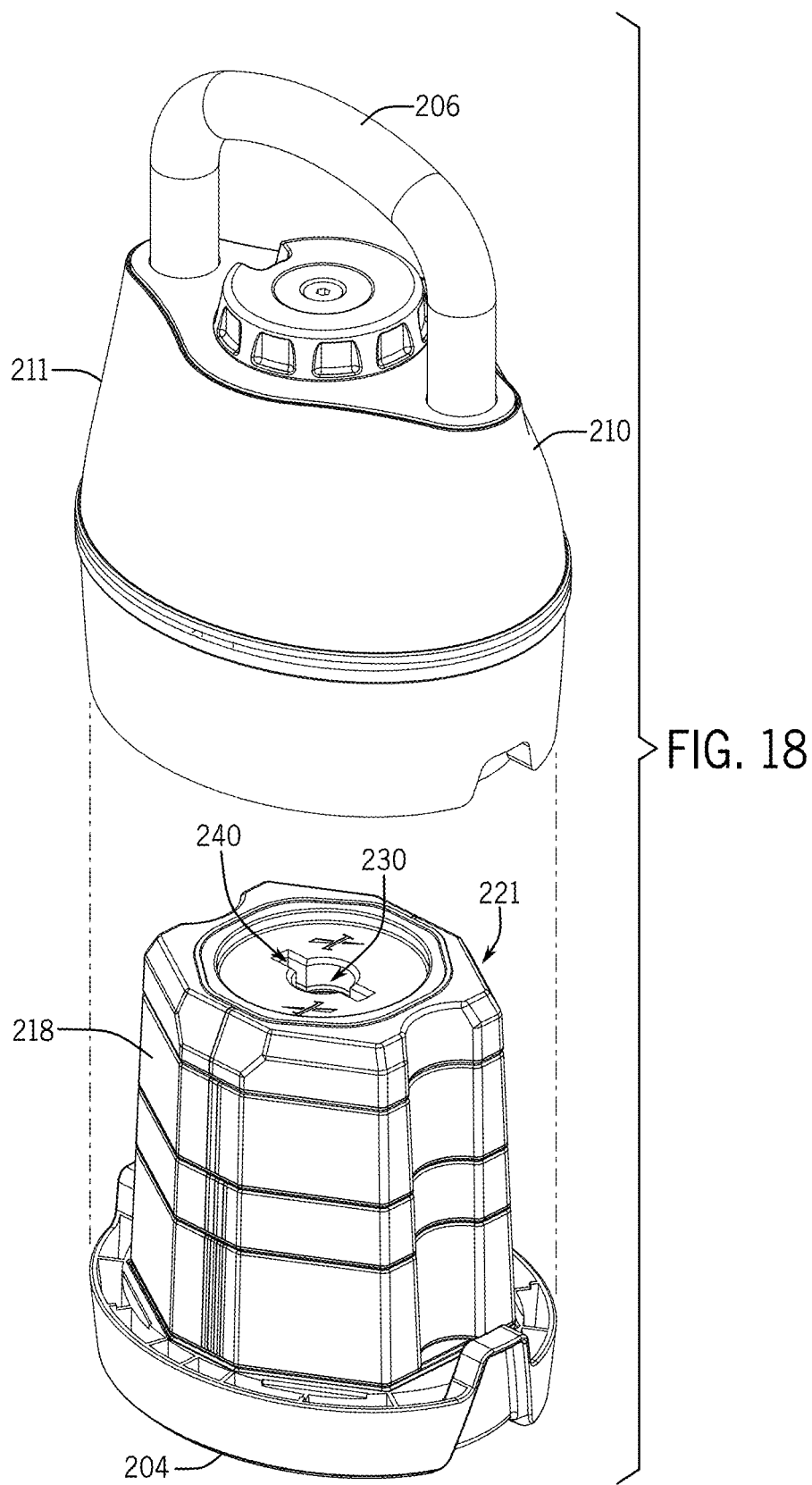
FIG. 18 is an isometric view of the kettlebell system of FIG. 15 showing the kettlebell body removed from the base that supports the stack of weights.
Figure 19:
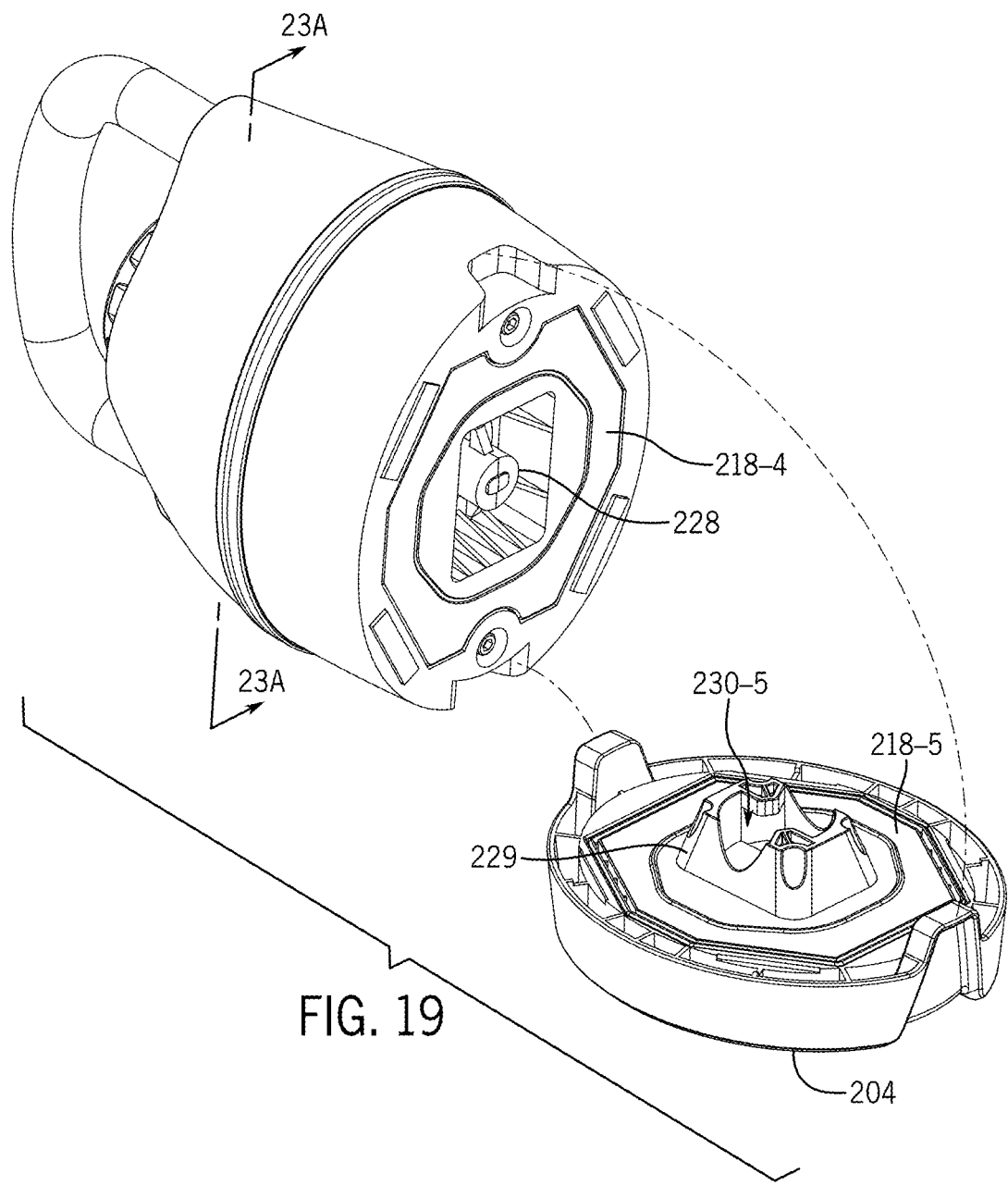
FIG. 19 is another view of the kettlebell system of FIG. 15 with the kettlebell body and some of the weights removed from the base, which in this figure is shown supporting only the bottom weights.

The kettlebell system 200 may include one or more removable weights 218 configured to be removably coupled to the kettlebell body 210 (see e.g., FIGS. 16-19). The kettlebell 202 may be configured to removably receive and couple to any number of a plurality of weights 218, some or all of which may have a different mass and thus result in a different weight being added to the kettlebell 202 for adjusting the total weight of the kettlebell 202. In the illustrated example, the kettlebell 202 is configured to couple to five individual weights including a first weight 218-1, a second weight 218-2, a third weight 218-3, a fourth weight 218-4, and a fifth weight 218-5. In other embodiments, the kettlebell system 200 may include a different number of weights to provide an adjustable weight kettlebell with different characteristics, such as a different maximum total weight and/or different increments of weight adjustments of the kettlebell. When one or more of the weights 218 are not coupled to the kettlebell body 210, they may be supported by the base 204 in a stack 221, e.g., as shown in FIG. 18. In some embodiments, the weights 218 may be supported on top of the base 204. In some embodiments, as shown in FIGS. 16 and 19, the base 204 may include a base cavity 225 configured to receive at least one of the weights 218, such as the bottom weight 218-5) in the cavity 220.

As shown e.g., in FIG. 17, the kettlebell 202 includes a kettlebell body 210 defining a kettlebell cavity 220. The cavity 220 is configured to receive one or more of the plurality of weights 218 at least partially within the cavity 220. In some embodiments, fewer than all of the weights may be received fully within the cavity. In the illustrated example, four of the five weights may be received substantially fully within the cavity 210. The fifth or bottom weight 218-5 may be coupled to the kettlebell body 210 with only a portion of the bottom weight 218-5 being received in the cavity 220 when coupled to the body 210. In some examples, at least one of the weights, such as the bottom weight 218-5, may be coupled to the body without it being received in the cavity 220. In yet other embodiments, the kettlebell system may be configured such that all of the removable weights are substantially fully within the cavity 220 when coupled to the kettlebell body 210. Thus, the phrase in the cavity as used herein can imply either fully within or at least partially in the cavity.

In some embodiments, when coupled to the kettlebell body 210, the one or more weights 218 are non-rotatable relative to the body 210. In some such embodiments, the cavity 220 may be configured to non-rotatably receive one or more of the plurality of weights. For example, as shown in FIGS. 16-19, the weights 218 may have a non-circular shape, in this case generally octagonal but in other examples the shape may be triangular, rectangular, pentagonal, or other suitable regular or irregular shape. The shape of the individual weights 218 may correspond to the shape of the cavity 220 such that interior walls 222 of the body 210 defining the cavity 220 inhibit the weights 218 from rotating relative to the body 210. In some embodiments, the weights 218 may have a generally circular shape, but the weights 218 may be keyed to the body 210 during insertion of the weights 218 into the cavity 220. For example, the weights 218 and the body 210 may include corresponding keying structures (such as one or more corresponding grooves and ribs) that inhibit rotation of the weights 218 relative to the body 210 when the weights 218 are positioned in the cavity 220.

Figure 20:
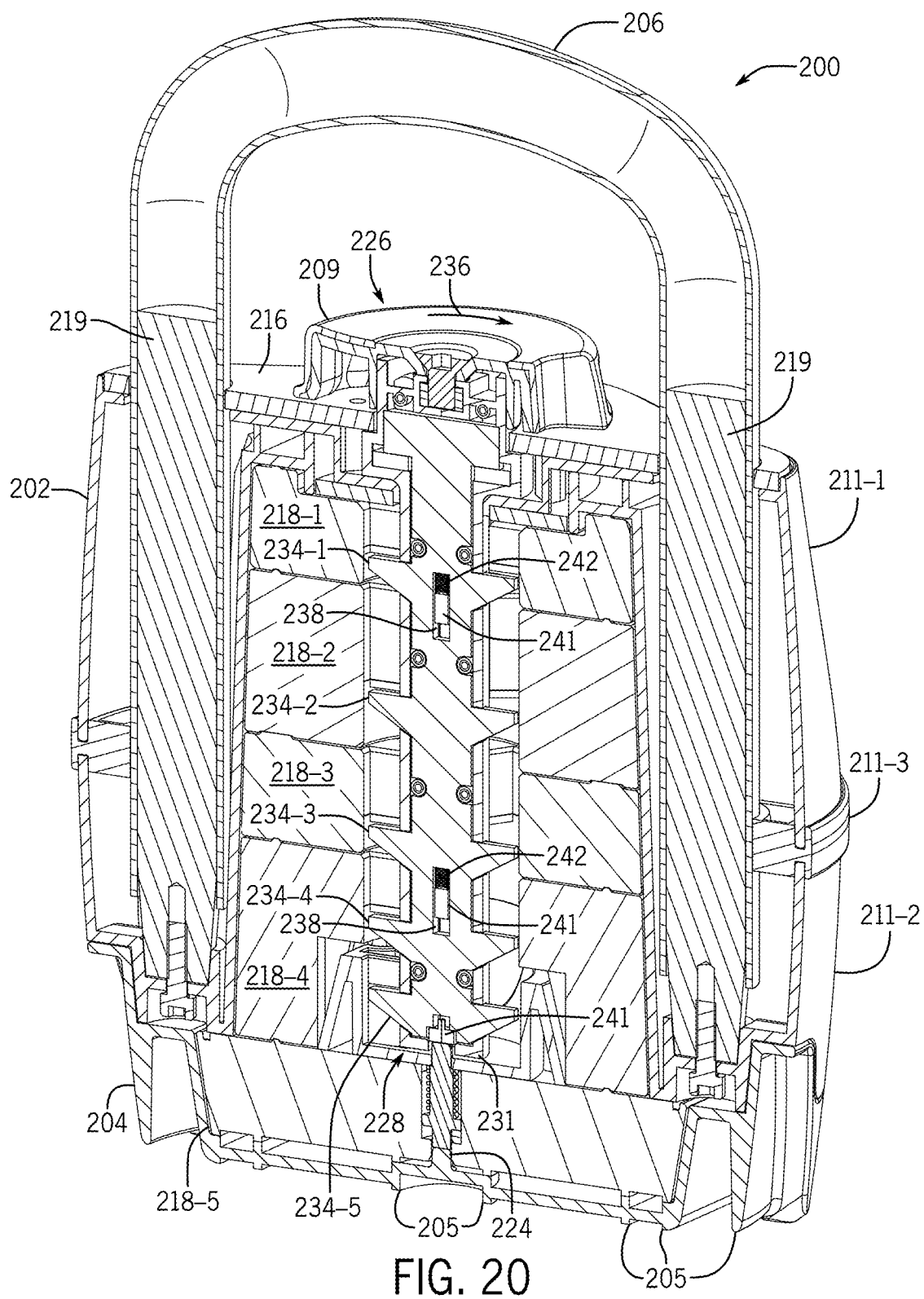
FIG. 20 is a cross-sectional view of the kettlebell system of FIG. 15 taken at line 20-20 in FIG. 15.

As shown for example in FIGS. 17 and 20, the kettlebell 202 may include a weight selector assembly 226 configured to selectively couple one or more of the weights 218 to the body 210. The weight selector assembly 226 includes a selector rod 228 coupled to the body 210 and operable to selectively couple one or more of the weights 218 to the body 210. The rod 228 may be rotatably coupled to the body 210, such that rotation of the rod 228 relative to the body 210 allows the user to selectively couple one, a select number, or all of the plurality of weights 218 to the body 210. The rod 228 extends into the cavity 220, through at least a portion of the cavity 220. For example, the rod 228 may extend through the portion of the cavity such that the rod extends through each of the apertures 230 of the plurality of weights 218 to allow each of the plurality of weights 218 to be coupled to the rod 228. In the illustrated example, the rod 228 extends through the cavity 220 without protruding beyond the bottom most surface of the kettlebell body 210, such as to prevent contact of the rod 228 with a support surface on which the kettlebell 202 may be placed. In some embodiments, such as in the illustrated example in FIG. 17, the rod 228 is substantially centered within the cavity 220, meaning that the distance of the rod 228 to any two diametrically opposed locations of the wall defining the cavity 220 is substantially the same. The rod 228 is rotatable relative to the plurality of weights 218 such that rotation of the rod 228 relative to the weights enables selective coupling of one or more of the weights 218 to the kettlebell body 210.

Engagement members, such as pins 234, may extend from the rod 228 for coupling the weights 218 to the rod 228. The pins 234 may arranged at spaced apart locations along the length of the length of the rod 228. The pins 234 may be configured to engage with an underside of a portion of a respective weight to retain the respective weight in the cavity 220. The pins 234 may be oriented cross-wise or transverse (e.g., perpendicular) to the rod 228. In some embodiments, the individual pins 234 may be implemented as two diametrically opposed extensions from a central portion of the rod 228. The weight selector assembly 226 may include a separate pin 234-1, 234-2, 234-3, 234-4, 234-5 for engaging with each of the weights 218-1, 218-2, 218-3, 218-4, 218-5, respectively. The first pin 234-1 may be positioned with respect to the rod 228 (e.g., at a particular location along the length of the rod 228) to engage the first weight 218-1 and selectively couple the first weight 218-1 depending on the rotational position of the pin 234-1 relative to the weight 218-1. Similarly, the second, third, fourth and fifth pins 234-2, 234-3, 234-4, and 234-5, respectively, may be positioned with respect to the rod 228 to engage the second, third, fourth, and fifth weights 218-2, 218-3, 218-4, and 218-5, respectively, selectively coupling one or more of these weights to the body 210 depending on the rotational position of the pins 234 relative to the weights 218.

The selector rod 228 may be coupled to an actuator 208, at least a portion of which is provided on the exterior of the kettlebell body 210 such that at least that portion of the actuator 208 is accessible to the user. In use, manipulation (e.g., rotation) of the actuator by the user effects a rotation of the rod 228 relative to the body 210. Thus, when the body 210 is placed over the stack 221 of weights, the rotation of the rod 228 relative to the body 210 is also a rotation relative to the weights 218, which enables a selection of the number of weights to be coupled to the body 210. For example, the actuator 208 may be implemented as a knob 209 having a rotation axis R. The rod 228 may be fixed to the knob 209 with its longitudinal axis aligned with the rotation axis R of the knob 209, such that rotation of the knob 209 about axis R (e.g., in the direction indicated by arrow 236) causes a corresponding rotation of the rod 228 about the axis R. The manipulation of the actuator 208, and correspondingly the rotation of the rod 228, causes a different subset of pins to operatively engage their respective weights and thus enables a different combination of weights 218 to be coupled to the kettlebell body 210, thus effecting an adjustment of the amount of weight kettlebell body 210.

The actuator 208 (e.g., knob 209) may be located on a top side, or at a different suitable location, of the kettlebell body. In the illustrated example, the knob 209 is rotatably coupled to a cover plate 216, which may be a separate component coupled to the housing 211 or integrally formed with the housing 211. In this example, to facilitate assembly of certain ones of the internal moving components of the kettlebell, the cover plate 216 is separate but coupled to the upper housing portion 211-1 and when coupled thereto conceals the locking mechanism (e.g., cam 223 and follower 233) of the kettlebell 202. In other embodiments, the assembly of components may be effected from the inside of the cavity 220 and the cover plate 216 may thus be integrally formed with the housing 211.

The weight selector assembly 226 may be operatively associated with a weight selection indicator. For example, markings may be provided on the kettlebell body 210, such as on the cover plate 216 below the knob 209. The knob 209 may include a cutout or recess 217 defined radially inward from the perimeter of the knob 209. Aligning the recess 217 with one of the plurality of markings may provide an indication of the selected weight. In the present example of a kettlebell that can receive up to five weights, there may be six discrete markings that include a first marking indicating the weight of the empty kettlebell body 210, a second marking indicating the weight of kettlebell body 210 plus the first plate 218-1, a third marking indicating the weight of the kettlebell body 210 and the top two weights (i.e. the first and second weights 218-1 and 218-2, respectively), and so on until a sixth marking, which indicates the total aggregate weight of the kettlebell body 210 plus all five weights. As will be appreciated, in other embodiments, the increments of adjustment available for the kettlebell system 200, and thus the number of markings, may be different. For example, the kettlebell may be designed to receive only a single weight, only two weights or any number of weights fewer than five. In other examples, the kettlebell system may be operable for use with a number of weights greater than five. Also, the weight selection indicator may be implemented using a different combination of features, such as instead of using a recess and providing the markings below the knob 209, the knob 209 may be provided with a radially-aligned outward-pointing arrow, and the markings may be positioned outside of and around the primer of the knob 209, such that when the knob 209 is rotated to any one of the different rotational positions, a different selected weight may be indicated by the alignment of the arrow with one of the plurality of markings. In yet other examples, the actuator may be in the form of a lever configured to rotate about the axis R, such that aligning the longitudinal direction of the lever with a particular rotational position and associated marking may indicate the selected weight for the kettlebell 202. The actuator and weight selection indicator may be implemented in accordance with other suitable examples, including the examples described with reference to the embodiments of kettlebell 102.

As shown for example in FIGS. 16 and 17, each of the plurality of weights 218 defines a respective aperture 230. In this example, the first weight 218-1 defines a first aperture 230-1, the second weight 218-2 defines a second aperture 230-2, the third weight 218-3 defines a third aperture 230-3, the fourth weight 218-4 defines a fourth aperture 230-4, and the fifth weight 218-5 defines a fifth aperture 230-5. The configuration of one aperture may differ from the configurations of the other apertures to enable selective coupling of the weights 218 to the kettlebell 202. The aperture 230 of each weight 218 is configured to engage with the weight selector assembly 226 of the kettlebell 202 to selectively couple one or more of the weights 218 to the kettlebell body 210. The aperture 230 of at least some of the weights may be through apertures. For example, the apertures 230 of the upper weights (e.g., weights 218-1 through 218-4) may be through apertures meaning that they extend through the height of the respective weight, such that the selector rod 228 can pass through for coupling to the bottom weight. The aperture of the bottom weight may be but need not be a through aperture. As shown in FIG. 19, the aperture 230-5 of the bottom weight 218-5 is formed in and extends only through an upper portion 229 of the bottom weight 218-5. In other examples, a different suitable arrangement or combination of apertures 230 may be used.

The weights 218 may be configured to selectively allow passage of the pins 234 through the weights 218, or at least a portion thereof, depending on the rotational position of the rod 228, and correspondingly of the pins 234, relative to the weights 218. As illustrated, for example, in FIGS. 16, 17, and 27-32, the aperture 230 of each weight 218 may include a passageway 240 configured to selectively allow passage of one or more of the pins 234 depending upon the rotational position of the rod 228 and pin(s) 234. In the present example, the first weight 218-1 includes a first passageway 240-1, the second weight 218-2 includes a second passageway 240-2, the third weight 218-3 includes a third passageway 240-3, the fourth weight 218-4 includes a fourth passageway 240-4, and the fifth weight 218-4 includes a fifth passageway 240-5. In this example, the apertures 230 are centrally located in the weights 218 such that when the weights 218 are stacked on the base 204 (as showing in FIG. 18) the apertures 230 are arranged along the centerline 289 of the kettlebell 202. Similarly, the rod 228 is arranged to extend into the cavity 220 along the centerline 289, such that the rod 228 may extend through the apertures 230 when the kettlebell body 210 is placed over the stack 221 of weights 218. The pins 234 and the passageways 240 extend radially outward in relation to the centerline 289 of the kettlebell 202. The base 204 may include alignment features, which may cooperate with locating features on the kettlebell body to align the kettlebell when placing the kettlebell on the base.

Figure 32A:
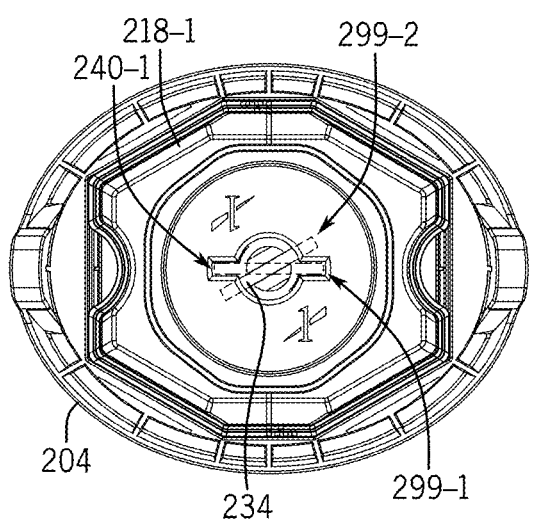
FIGS. 32A-32E are top views of one or more of the plurality of weights of FIG. 16 supported in a stacked configuration on the base of the kettlebell system of FIG. 16.
Figure 32B:
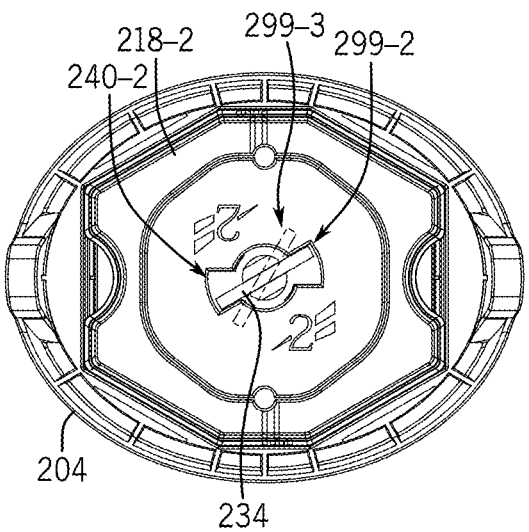

The selector assembly 226 may be configured to provide the rod 228 (e.g., via rotation of the knob 209), and thus the pins 234, into any one of a plurality of predetermined rotational positions (e.g., positions 299-1 through 299-6 shown in FIGS. 32A-32E). Each of the rotational positions 299-1 through 299-6 is associated with a respective one of the plurality of discrete weight settings of the kettlebell. The passageways 240 may provide selective passage of one or more of the pins 234 during removal of the kettlebell 202 from the base 204 depending on the rotational position of the rod 228 and pins 234 relative to the weights 218. For example, as shown in FIG. 32A, in one rotational position 299-1, the passageways 240 may allow passage of the pins 234 through all of the weights 218, thereby not coupling any of the weights 218 to the kettlebell body 210. In another rotational position 299-2, the first pin 234-1 may engage the first weight 218-1, but the passageways 240-2 through 240-5 of the remaining weights may allow passage of the remaining pins 234-2 through 234-5, thereby coupling only the first weight 218-1 to the kettlebell body 210. In another rotational position 299-3, the first pin 234-1 may engage the first weight 218-1 and the second pin 234-2 may engage the second weight 218-2, but the passageways 240-3, 240-4, and 240-5 of the remaining weights may allow passage of the remaining pins 234-3, 234-4, 234-5, thereby coupling only the first and second weights 218-1 and 218-2, respectively, to the kettlebell body 110. In yet another rotational position 299-4, the first, second and third pins 234-1, 234-2, and 234-3, respectively, may engage a respective one of the first, second, and third weights 218-1, 218-2, and 218-3, respectively, but the passageways 240-4 and 240-5 of the remaining weights 218-4 and 218-5 may allow passage of the remaining pins 234-4 and 234-5, thereby coupling only the first three weights to the kettlebell body 210 and so on until a final rotational position 299-6 in which all of the pins 234-1 through 234-5 engage a respective one of the weights 218-1 through 218-5, thereby coupling all of the weights 218-1 through 218-5 to the kettlebell body 210.

With continued reference to FIGS. 16, 17, and 27-32, the passageways 240 may be differently sized to allow, depending on the rotational position of the rod 228 and pins 234 relative to the weights 218, different groupings of the pins 234 to pass through the passageways during removal of the kettlebell 202 from the base 204. For example, the first passageway 240-1 may be the narrowest passageway and may be sized to allow passage of the pins 234 in only one of the plurality of rotational positions (e.g., 299-2). Thus, when the rod 228 is in a first rotational position 299-1 corresponding to the minimum (also referred to as the empty or unloaded) kettlebell weight setting, the pins 234 align with the passageway 240-1 thus being permitted passage through the passageway 240-1 and none of the weights are coupled to the kettlebell body 210. When the rod 228 is in a rotational position corresponding to the first loaded weight setting or any of the other loaded weight settings (e.g., 299-2-299-6), the pins 234 do not align with the passageway 240-1 thus being prevented passage through the passageway 240-1 coupling at least the first weight 218-1 to the kettlebell body 210.

The second passageway 240-2 may be wider than the first passageway 240-1 but narrower than the other passageways 240-3, 240-4, and 240-5. The second passageway may have a portion that aligns with the first passageway 240-1 when the weights are stacked on the base 204, thereby providing a rotational position in which passage of the pins 234 is permitted through both the first and second weights 218-1 and 218-2, respectively. The second passageway 240-1 may be sized to allow passage of the second, third, fourth, and fifth pins 234-2 through 234-5, respectively, in two rotational positions of the rod 228 (e.g., 299-1 and 299-2). That is, when the rod 228 is in the first rotational position corresponding to the empty kettlebell weight setting and when the rod 228 is in the second rotation position corresponding to the first loaded weight setting, the pins 234 are aligned with the passageway 240-2 thus being permitted passage through the passageway 240-2, causing the second weight 218-2 to be decoupled from the kettlebell body 210. When the rod 228 is in a rotational position other than the first and second rotational positions (e.g., a third rotational position 299-3), the pins 234-2 do not align with the passageway 240-2 thus being prevented passage through the passageway 240-2, which causes the pins 234-2 to engage the second weight 218-2 coupling both the first and the second weights to the kettlebell body 210.

Figure 32C:
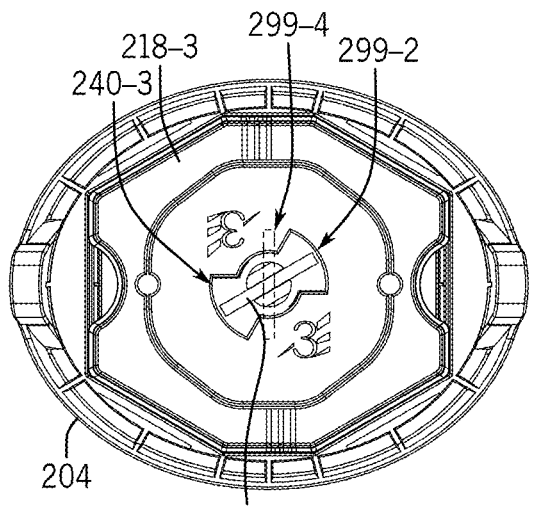
Figure 32D:
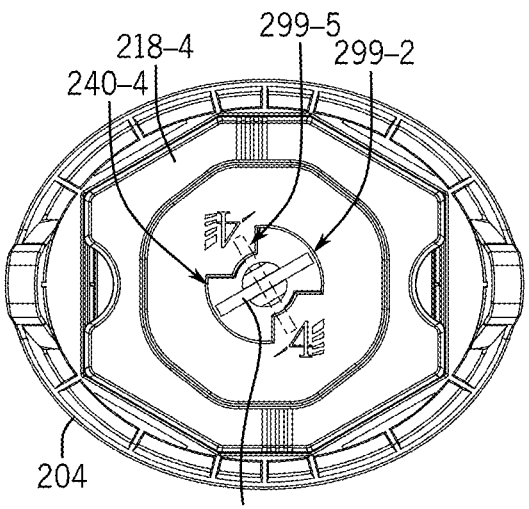
Figure 32E:
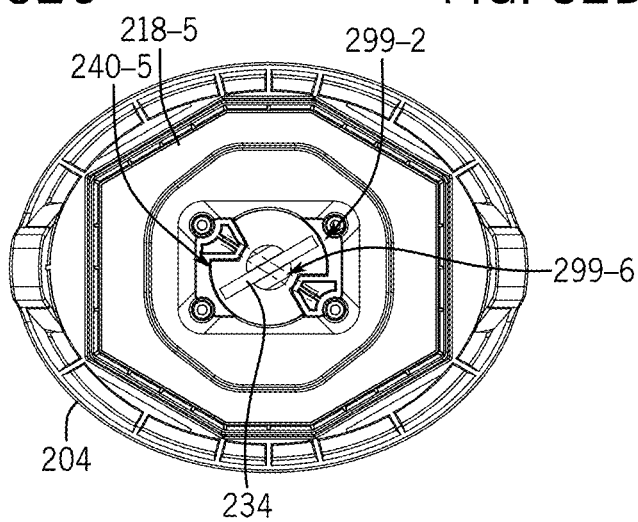
Figure 33:
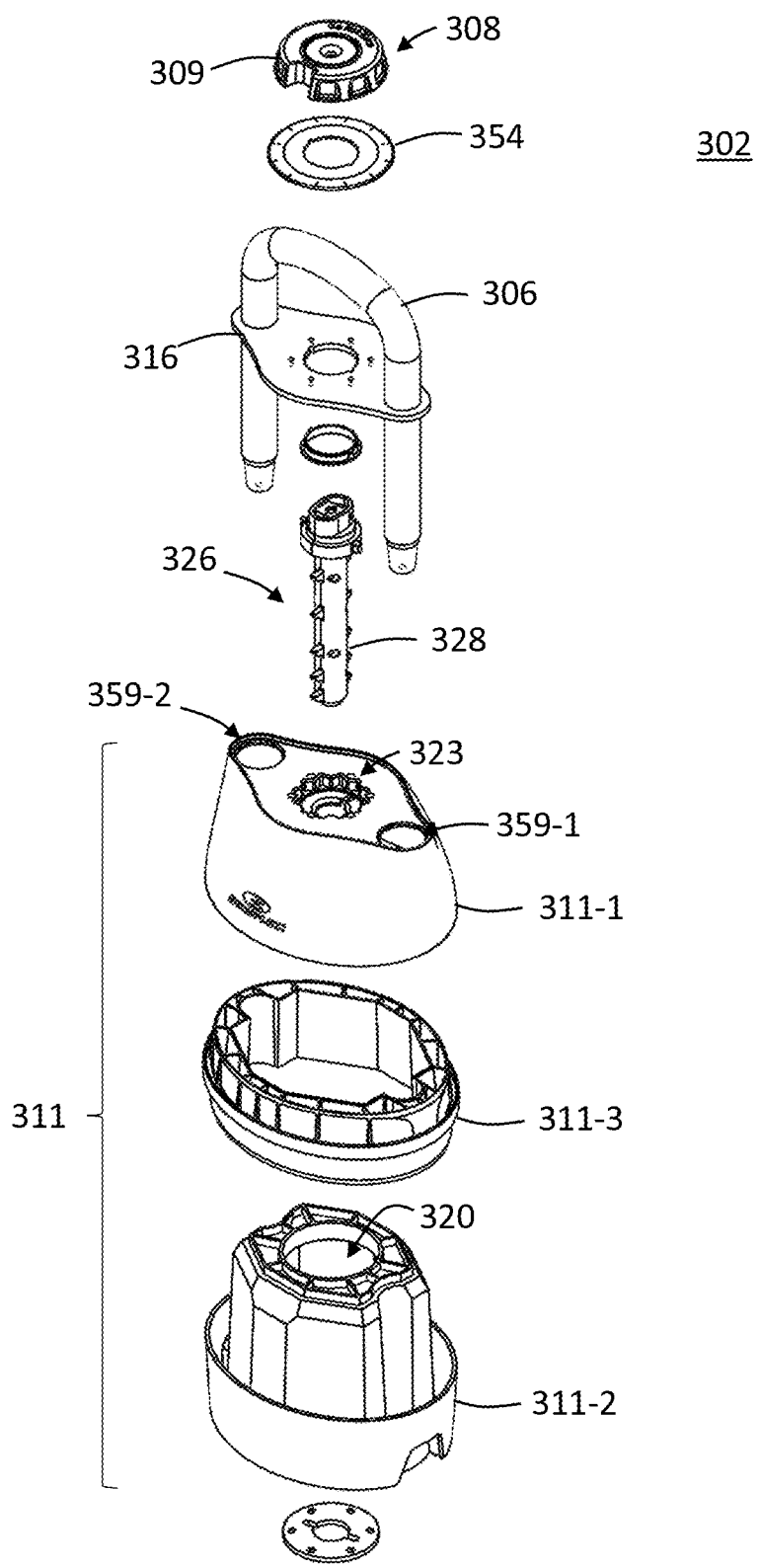
FIG. 33 is an exploded view of an adjustable weight kettlebell according to further examples herein.

Similarly, the third passageway 240-3 may be wider than the first and second passageways 240-1 and 240-2, but narrower than the passageways of the weights below the third weight to allow passage of the pins 234 through the third passageway when the rod 228 is in any of the first through third rotational positions. When the rod 228 is in any position other than the first through third rotational positions (e.g., in a fourth rotational position 299-4, as shown in FIG. 32C), the pins 234 are not aligned with the passageway 240-3 thus being prevented passage through the passageway 240-3 and thereby engage the third weight 218-3 coupling the weight 218-3 to the kettlebell body 210. In a similar manner, the fourth passageway 240-4 is wider than the first through third passageways 240-1 through 240-3, but narrower than the fifth passageway 240-5 to provide one rotational position (e.g., 299-5) in which the fourth weight 218-4 is coupled to the body 210 without coupling the fifth weight 218-5 to the body 210. The last passageway, in this case the fifth passageway 240-5, is the widest of the passageways 240. In this example, the fifth passageway 240-5 is sized to allow passage of the fifth pins 234-5 in and out of the passageway 240-5 when the rod 218 is in all but one rotational position, namely the sixth rotational position 299-6, which is associated with the maximum weight setting of the kettlebell 202. Thus, when the rod 228 is in any one but the sixth rotational position 299-6, the pins 234-5 pass through the passageway 240-5 and the fifth weight 218-5 is not coupled to the body, but instead may remain supported on the base 204, as shown in FIG. 19. When the rod 228 is in the sixth rotational position, the pins 234-5 are prevented from passing through the fifth passageway 240-5 and instead engage the fifth weight 218-5 coupling the weight 218-5 to the kettlebell body 210. Accordingly, based on the rotational position of the rod 228 and its corresponding alignment or misalignment with one or more of the passageways 240-1 through 240-5, no weights 218, or one or more of weights 218 may be selectively coupled to the body 210 of the kettlebell 102.

Locking and Unlocking of the Weight Selector Assembly

Figure 21:
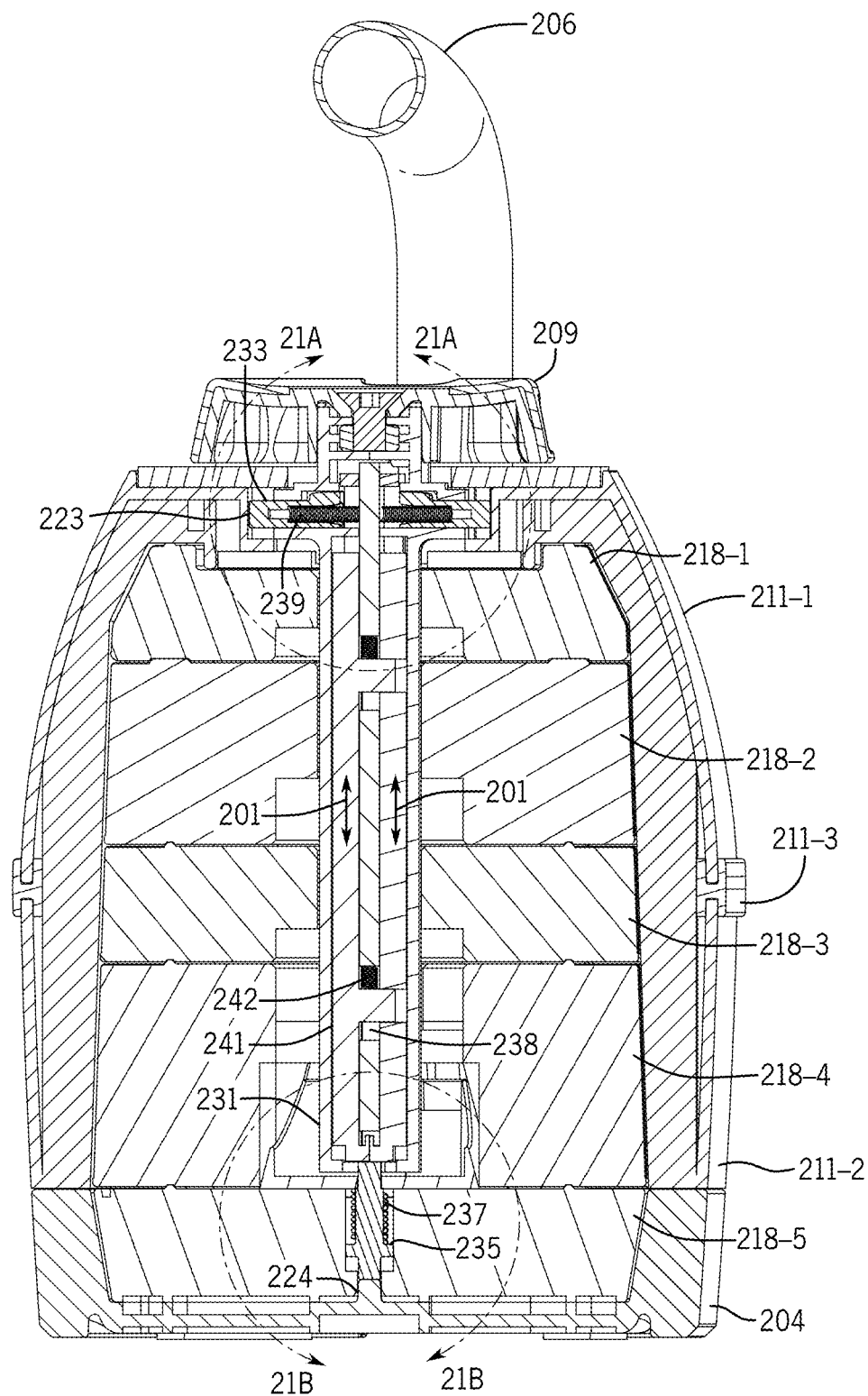
FIG. 21 is a cross-sectional view of the kettlebell system of FIG. 15 taken at line 21-21 in FIG. 15.
Figure 21A:
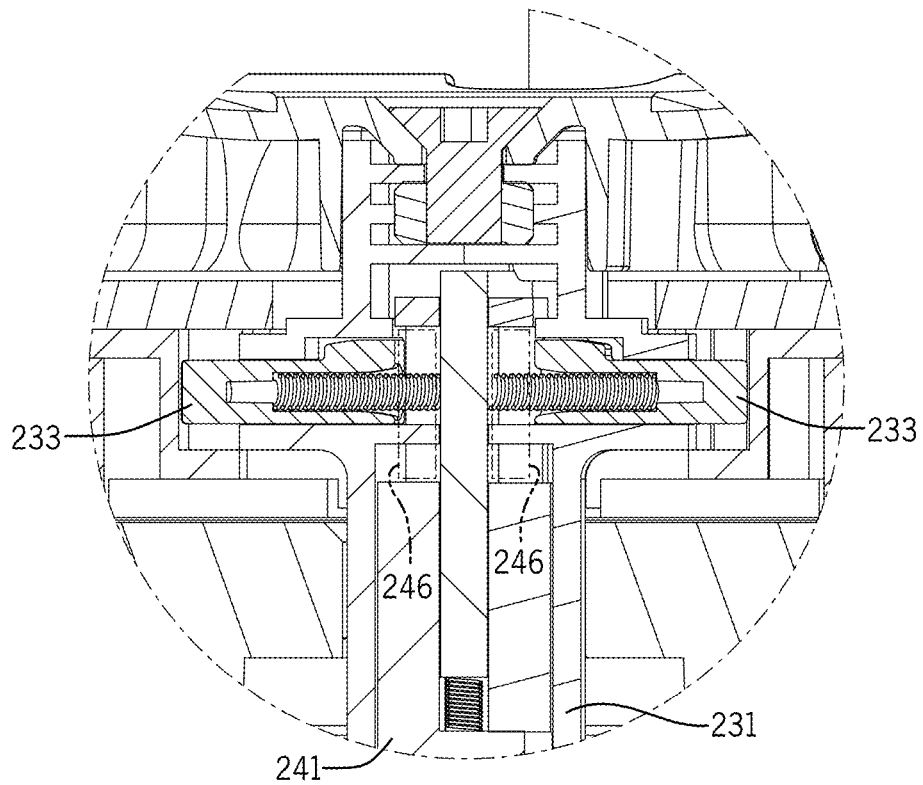
FIGS. 21A and 21B are enlarged views of the portions of the kettlebell system indicated by lines 21A-21A and 21B-21B, respectively, in FIG. 21.
Figure 21B:
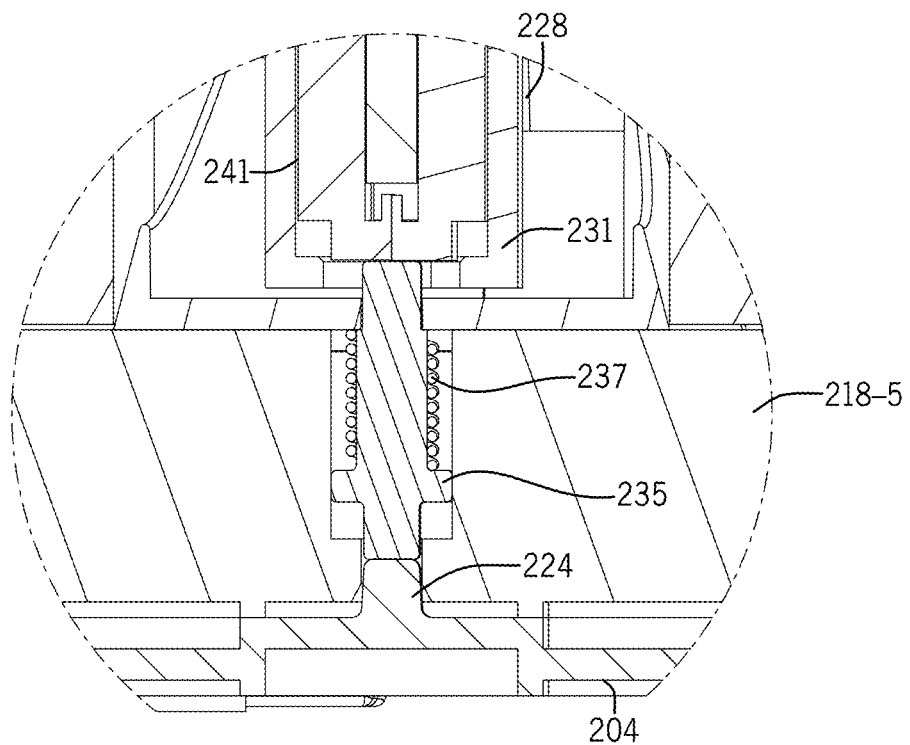
Figure 22:
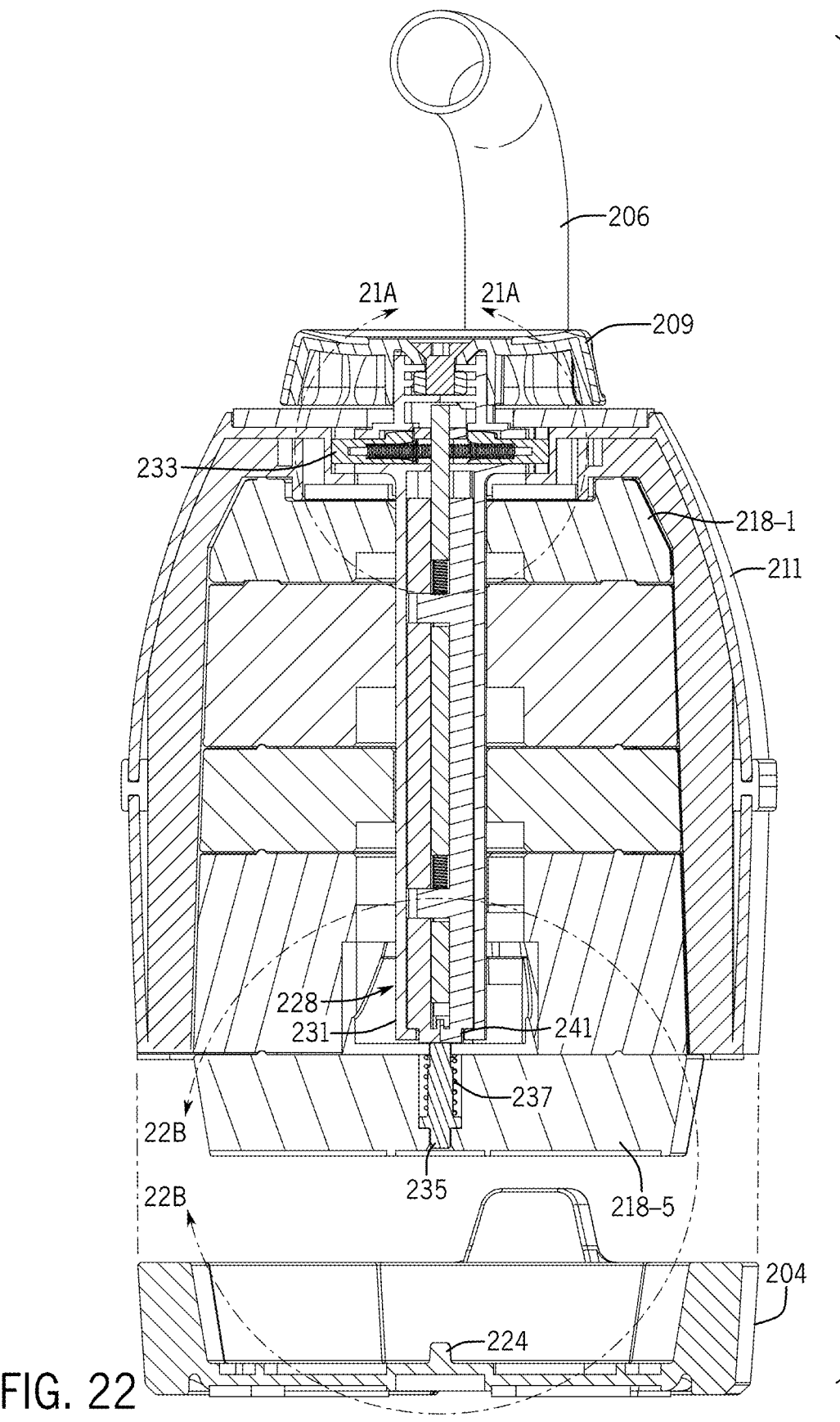
FIG. 22 is a cross-sectional view of the kettlebell system similar to the view shown in FIG. 21 but with the kettlebell and weights lifted from the base.
Figure 22A:
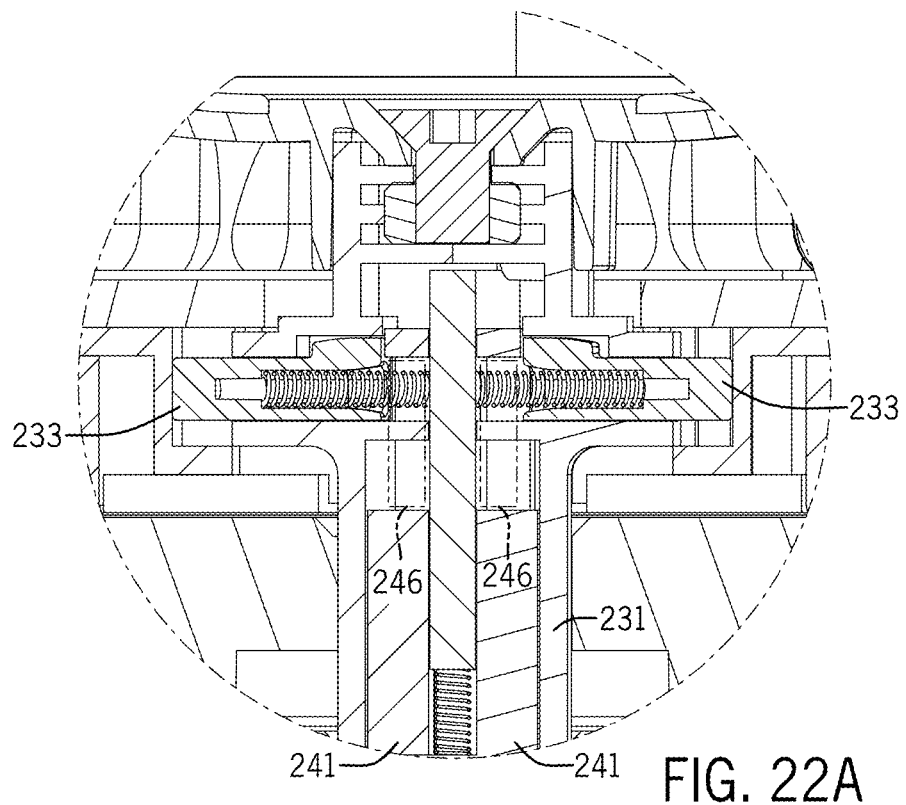
FIGS. 22A and 22B are enlarged views of the portions of the kettlebell system indicated by lines 22A-22A and 22B-22B, respectively, in FIG. 22.
Figure 22B:
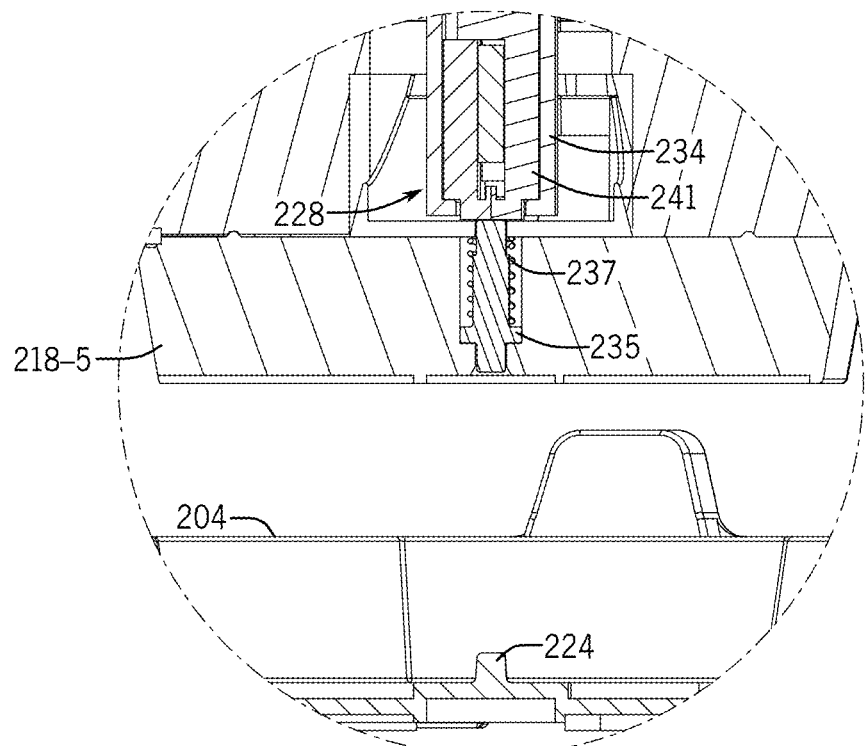

To avoid accidental separation of the weights 218 from the kettlebell body 210, the weight selector assembly 226 may be operatively associated with a locking mechanism. The locking mechanism may be configured to inhibit adjustments via the weight selector assembly 226, for example by restricting or preventing rotation of the selector rod 228 whenever the kettlebell 202, and correspondingly the weight selector assembly 226, is in a locked configuration. Rotation of the selector rod 228 and thus an adjustment to the weight of the adjustable weight kettlebell 202 may be permitted only when the kettlebell 202 is in the unlocked configuration. FIGS. 20 and 21 illustrate cross-sectional views of the kettlebell 202 in the unlocked configuration, while FIG. 22 illustrates cross-sectional views of the kettlebell 202 in the locked configuration. In some embodiments, the kettlebell system 200 is configured such that placement of the kettlebell 202 on a support surface, such as the base 204, automatically provides the kettlebell 202 in the unlocked configuration or unlocks it for adjustment. Conversely, the kettlebell 202 and the weight selector assembly 226 are automatically provided into the locked configuration by the removal of the kettlebell 202 from the support surface (e.g., base 204), thus locking the kettlebell 202 for adjustments. This automatic locking and unlocking by the removal and placement of the kettlebell on the support surface (e.g., base 204) without requiring the user to actuate any additional components can be advantageous as it may increase the efficiency of the user's exercise routine (e.g., by removing the additional steps of locking and locking between weights adjustments). The automatic locking of the kettlebell upon removal from the support surface (e.g., base 204) may reduce the risk of injury, as the user need not remember to lock the kettlebell before continuing exercise.

Figure 23A:
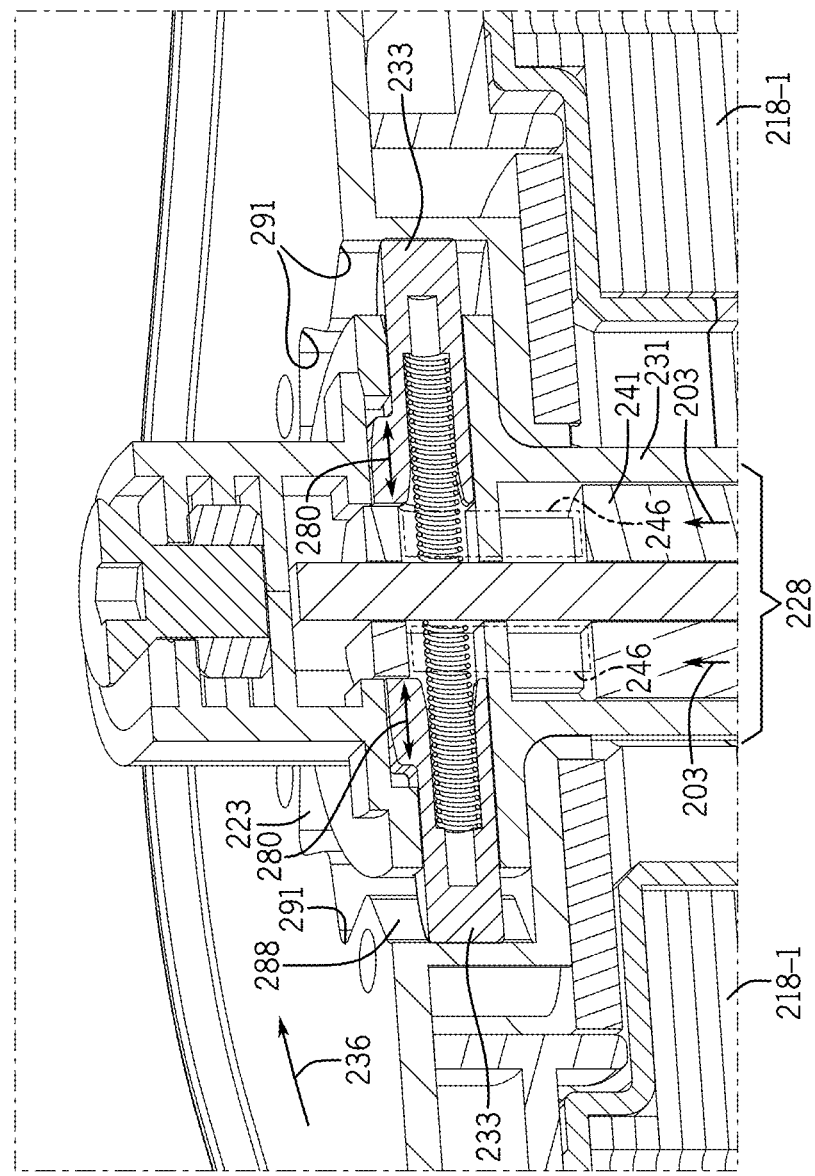
FIGS. 23A-23B are enlarged isometric views of a portion of the weight selector assembly illustrating components of the locking mechanism and operation thereof.
Figure 23B:
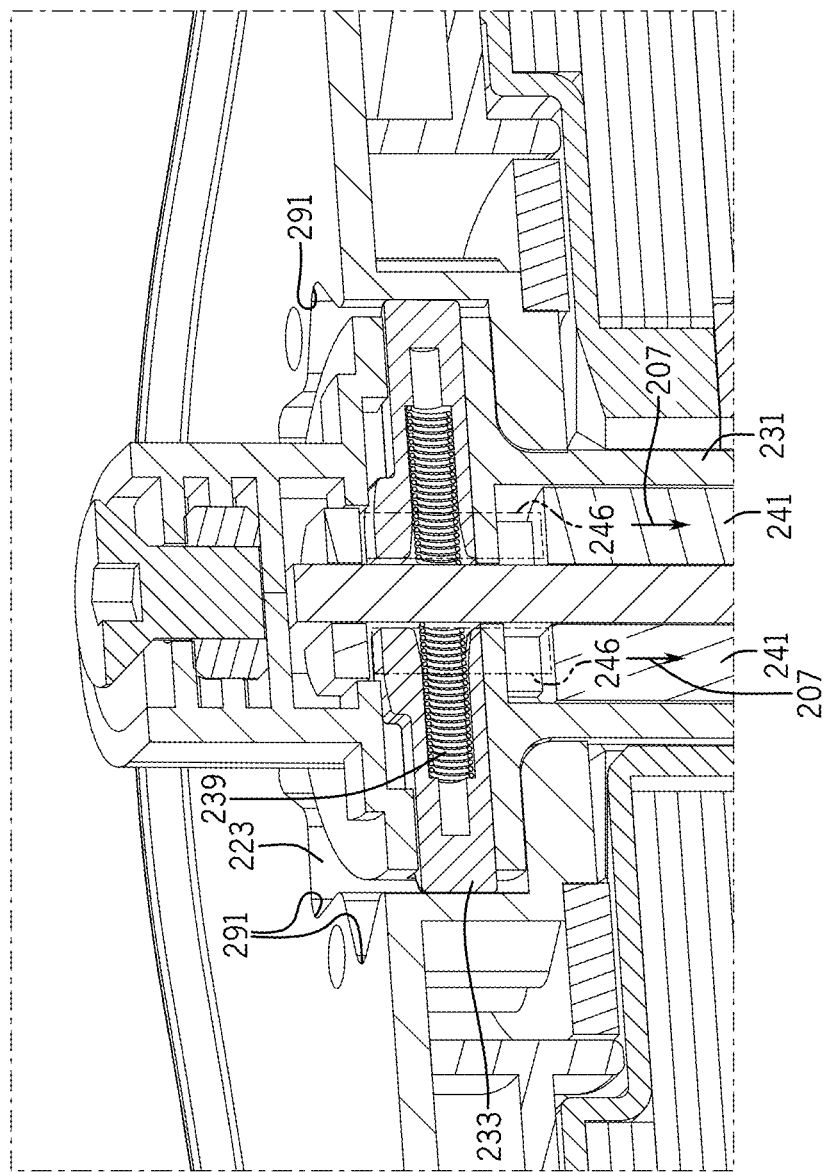

The locking mechanism may include at least one lock member (e.g., cam follower 233) configured to engage the kettlebell body 210 (e.g., cam 223) to restrict or substantially prevent rotation of the selector rod 228 when the kettlebell 202 is in the locked configuration. Referring now also to FIGS. 23A-23B, the lock member may be implemented using an elongate structure, such as a rod or a bar, or other suitable type of structure disposed transversely to the selector rod 228. The lock member (e.g., cam follower 233) may be non-rotatably coupled to the rod 228, such that it rotates with the rotation of the rod 228. The lock member (e.g., cam follower 233) may be movable with respect to the rod 228 (e.g., in the transverse direction 280) depending on whether the selector assembly 226 is in the locked or unlocked configuration. In some embodiments, unlocking the kettlebell 202 for adjustment involves displacing at least a portion of the rod 228 to open a window 246 and thereby permit transverse movement (e.g., toward centerline 289) of the lock member with respect to the rod 228. Conversely, locking the kettlebell 202 for adjustment may involve displacing at least a portion of the rod 228 to close the window 246 and thereby substantially preventing transverse movement of the lock member with respect to the rod 228.

The kettlebell body 210 may include an engagement surface (e.g., cam 223), which includes a plurality of detents 291. The engagement surface may be provided by the sidewall of a recess in an upper portion of the kettlebell body 210, the recess being configured to receive the upper portion of the selector assembly 226 that includes the lock member. In some embodiments, the engagement surface may be provided by both the sidewall and the base of the recess, or portions thereof. In example illustrated in FIGS. 23A and 23B, the engagement surface is provided by a generally circular undulating or gear-shaped surface 223, also referred to as cam surface or simply cam 223. The undulating cam surface 223 has an outer radius defined by the detents 291 and an inner radius defined by the points of intersection of the ramps 288 that separate the detents 291.

The lock member (e.g., cam follower 223) is coupled to the rod 228 such that when the rod 228 rotates (e.g., in the direction indicated by arrow 236), the lock member follows the cam surface 223 by shifting toward and away from the rod 228 (as indicated by arrow 280) as the cam follower 233 traverses the ramps 288 between adjacent detents 291. The lock member (e.g., cam follower 233) may be biased (e.g., using one or more springs 239) away from the rod 228 toward the detents 291. In the unlocked configuration, the lock member (e.g., cam follower 233) is capable of moving against the biasing force (e.g., toward the rod 228 and away from the detents), while in the locked configuration, the lock member (e.g., cam follower 233) is blocked or otherwise prevented from moving out of a detent 291 and thus prevented from shifting into another detent 291. The lock member may be spring-loaded sufficiently biased toward the detents 291 such that upon the user releasing the actuator 208, the lock member (e.g., cam follower 233) automatically shifts into the closest detent 291, thus automatically positioning the rod 228 into one of the predetermined rotational positions associated with the kettlebell's weight settings. This may ensure that upon release of the actuator (e.g., knob 209), the rod 228 is in a position in which none of the weights are attached or one or more of the weights are securely attached to the kettlebell body before the user removes the kettlebell from the base.

In some embodiments, the automatic unlocking of the kettlebell may be achieved by the transmission of an actuation force from the support surface (e.g., base 204) to the kettlebell 202. In one example, the transmission of force is achieved by a movable member in the kettlebell 202, which is biased toward the base and actuated upon placement of the kettlebell 202 on the support surface (e.g., base 204). The movable member may be implemented as a plunger (or a series of plungers), incorporated within the selector rod 228, one or more of the weights, or a combination thereof. The selector assembly 226 and/or support surface may be configured to enable the support surface to operatively engage the locking mechanism of the kettlebell 202, such as to provide the actuation force to the plunger of the selector rod 228.

Figure 24:
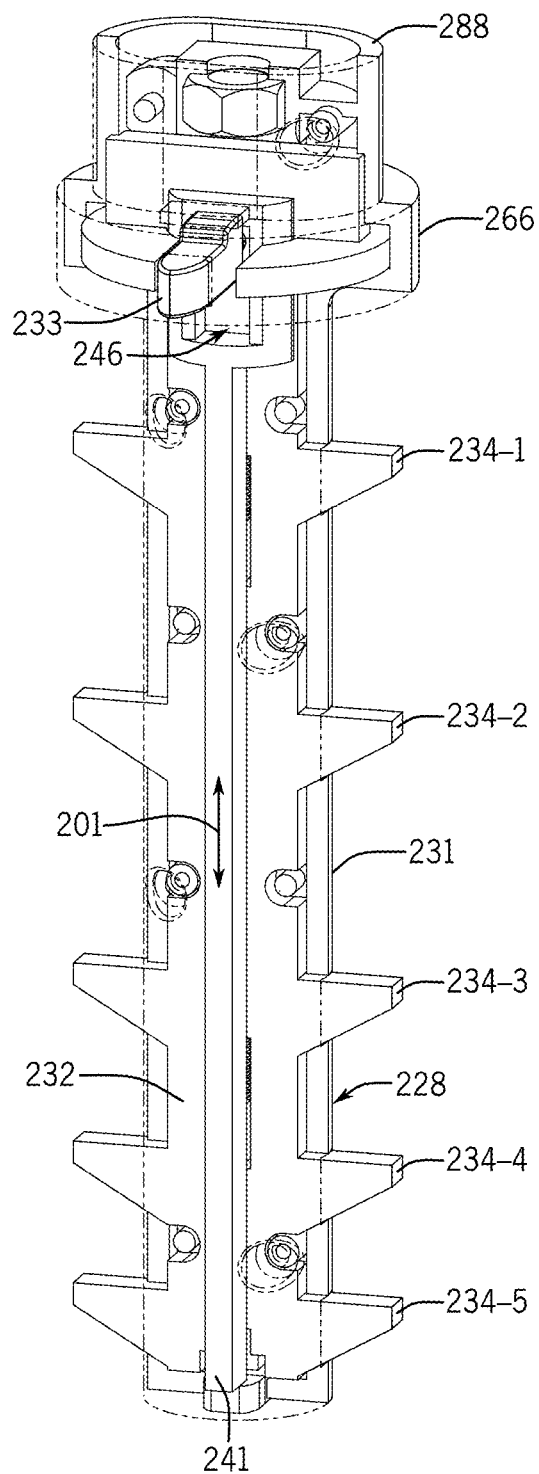
FIG. 24 is a view of a selector rod in accordance with some examples herein.
Figure 25:
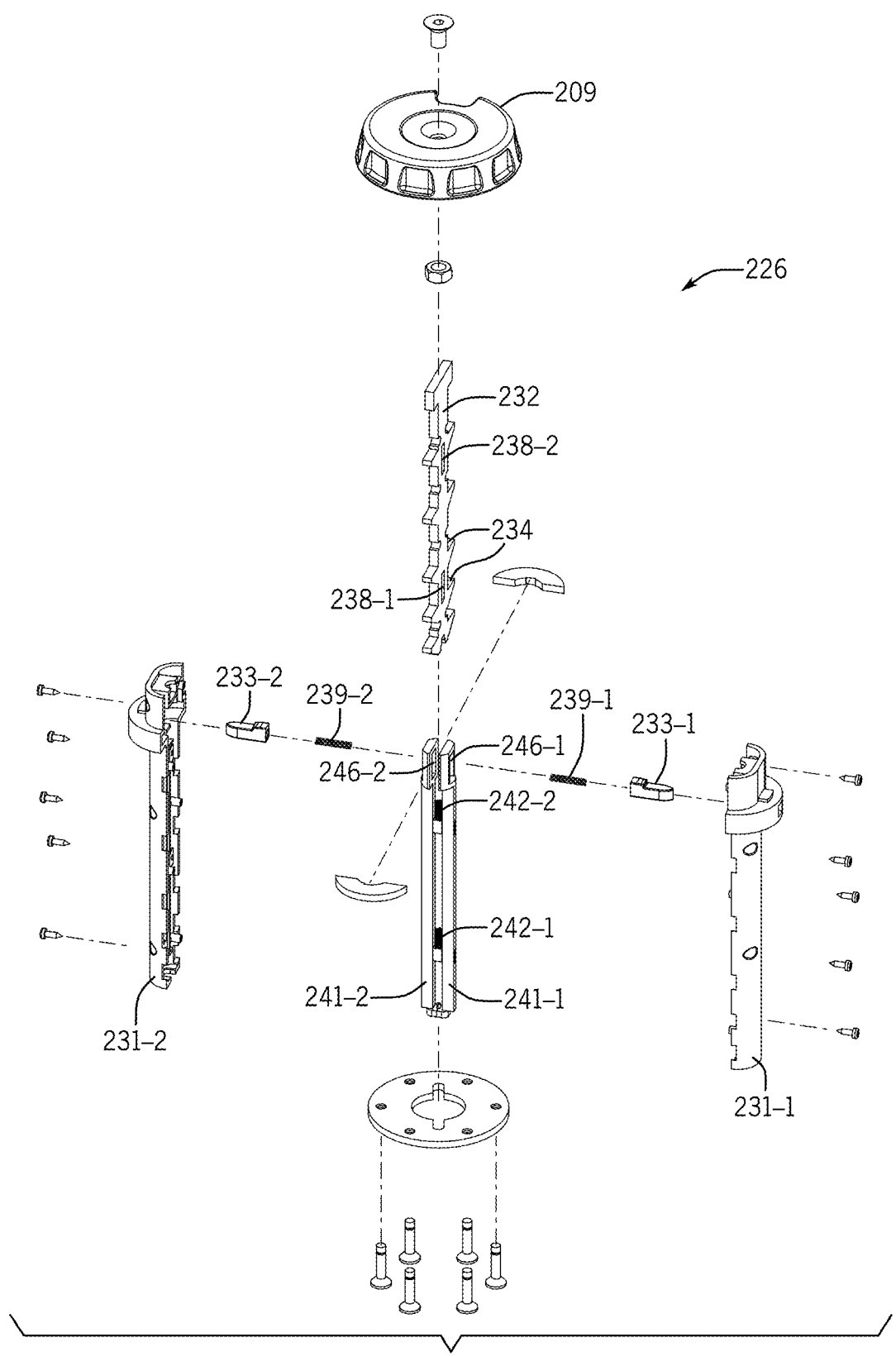
FIG. 25 is an exploded view of components of the weight selector assembly in accordance with some examples herein.
Figure 26C:
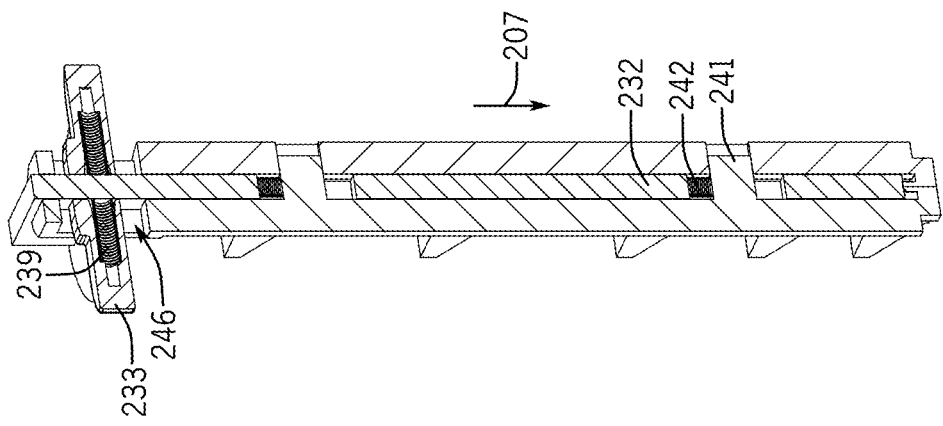
FIG. 26C is an alternative view of the cross-section in FIG. 26B, here showing the inner shaft of the selector rod shifted upward to unlock the selector assembly for adjustment.
Figure 26B:
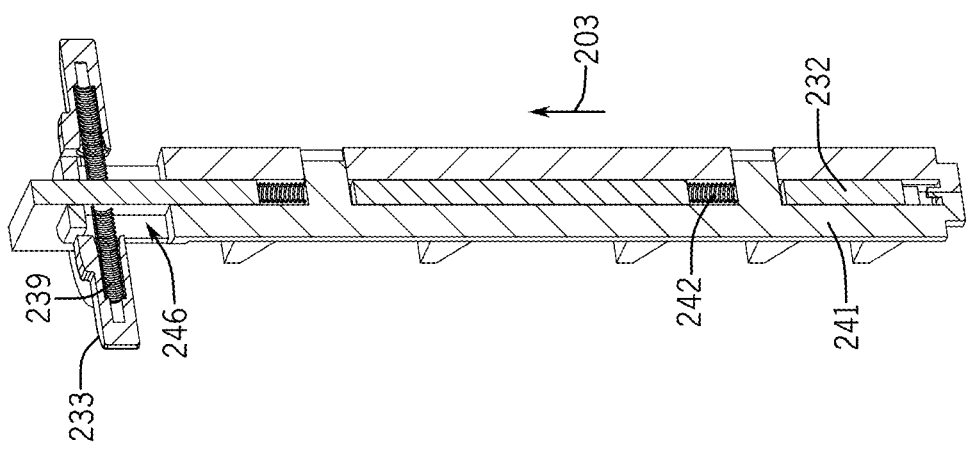
FIG. 26B is a cross-sectional views of the portion of the selector rod of FIG. 26A, taken at line 26B-26B
Figure 26A:
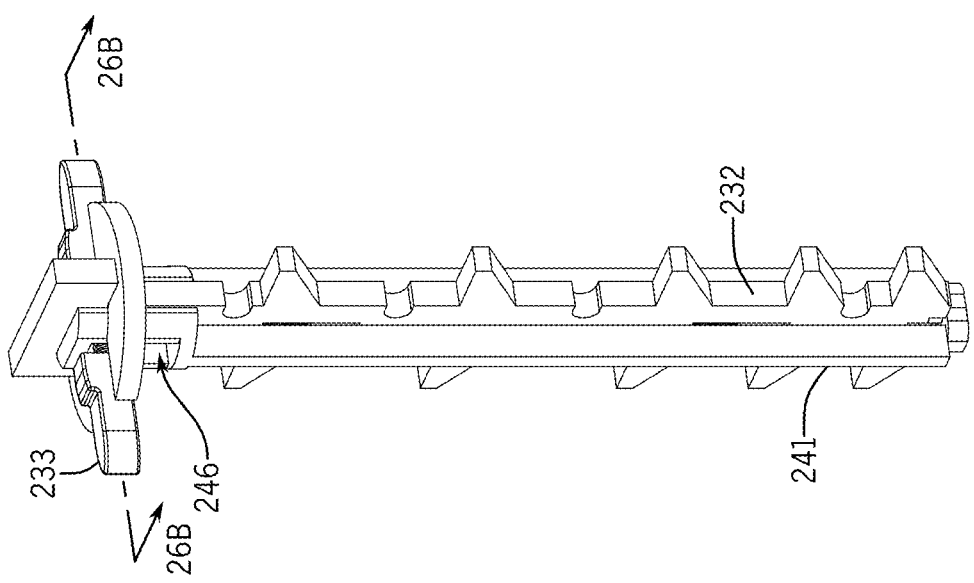
FIG. 26A is a view of a portion of the selector rod of FIG. 24.
Figure 27A:
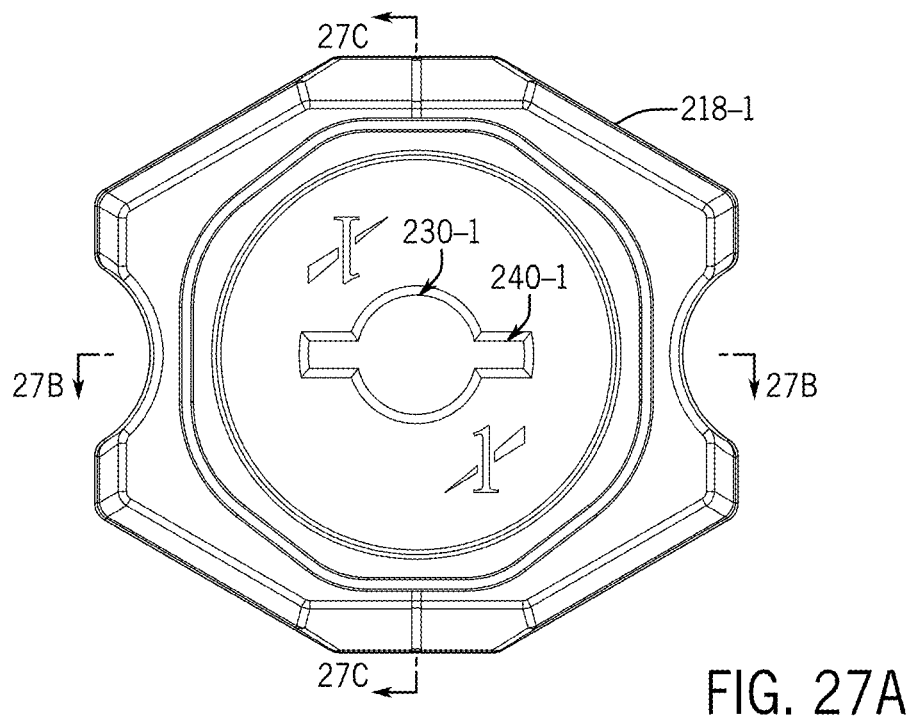
FIGS. 27A-27C are top, first cross-sectional, and second cross-sectional views of a first one of the plurality of weights of the kettlebell system of FIG. 16.
Figure 27B:
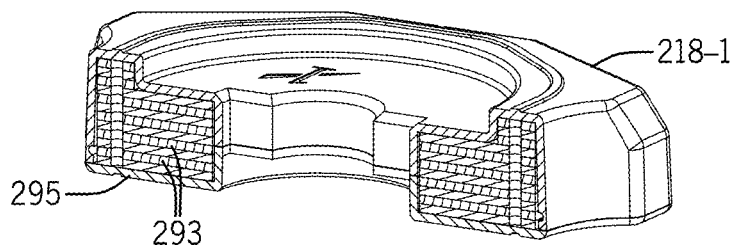
Figure 27C:
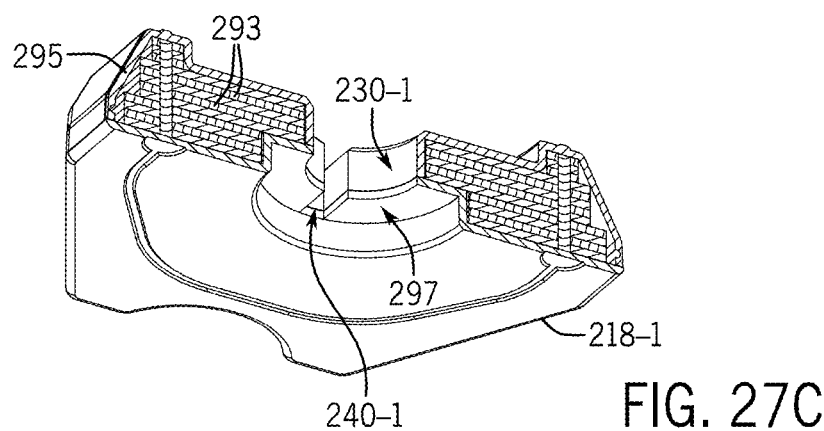
Figure 28A:
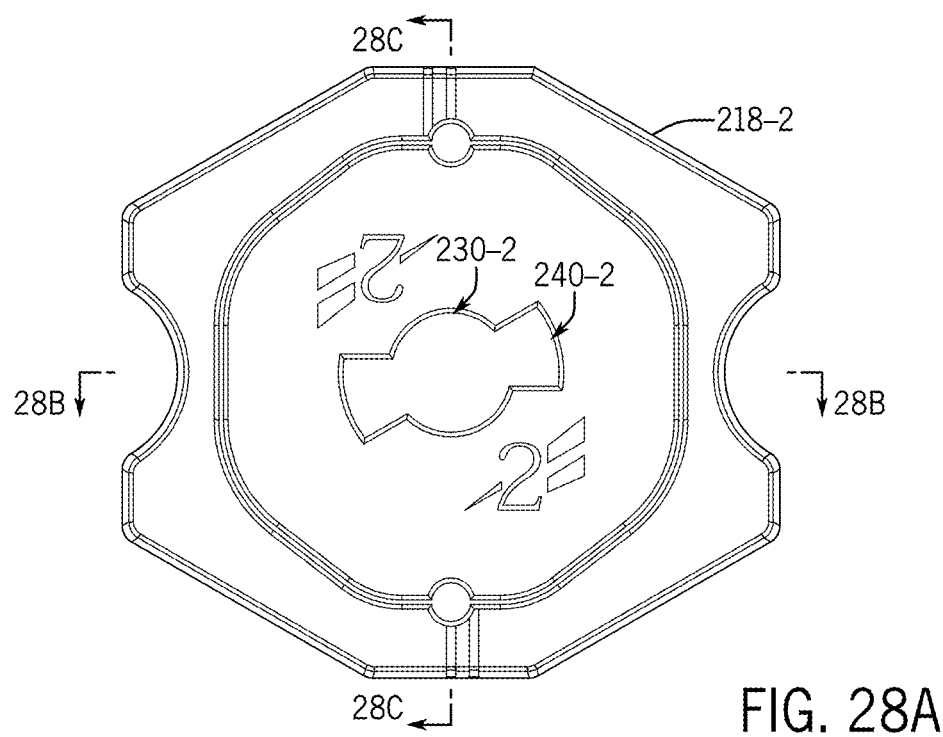
FIGS. 28A-28C are top, first cross-sectional, and second cross-sectional views of a second one of the plurality of weights of the kettlebell system of FIG. 16.
Figure 28B:
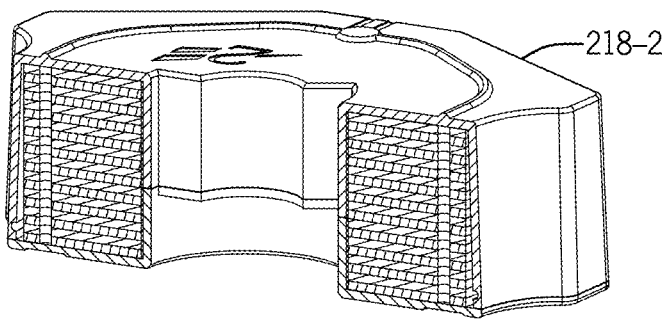
Figure 28C:
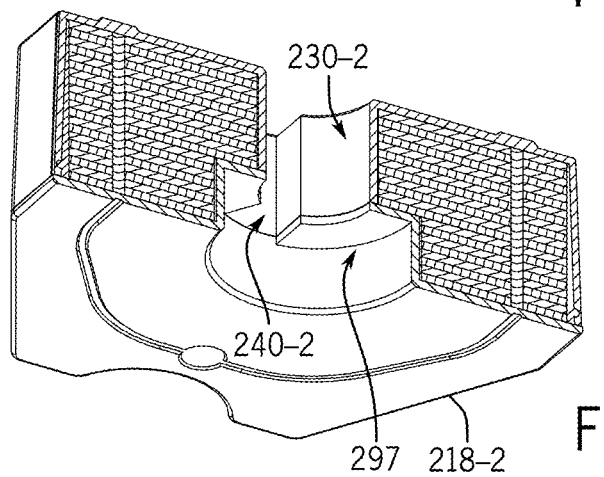
Figure 29A:
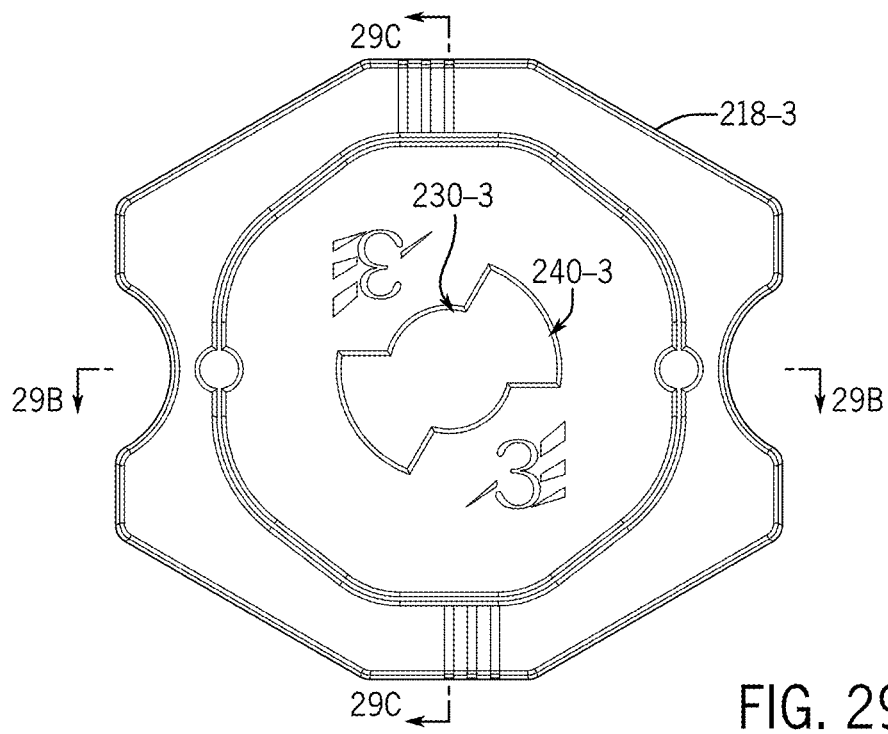
FIGS. 29A-29C are top, first cross-sectional, and second cross-sectional views of a third one of the plurality of weights of the kettlebell system of FIG. 16.
Figure 29B:
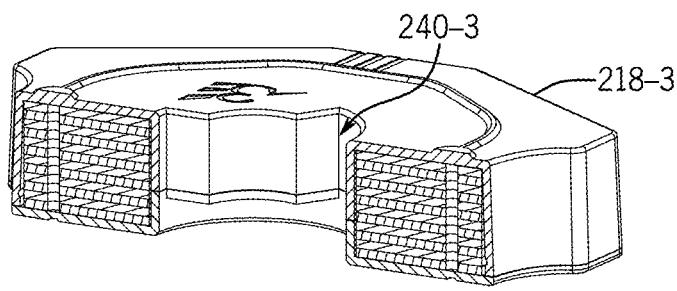
Figure 29C:
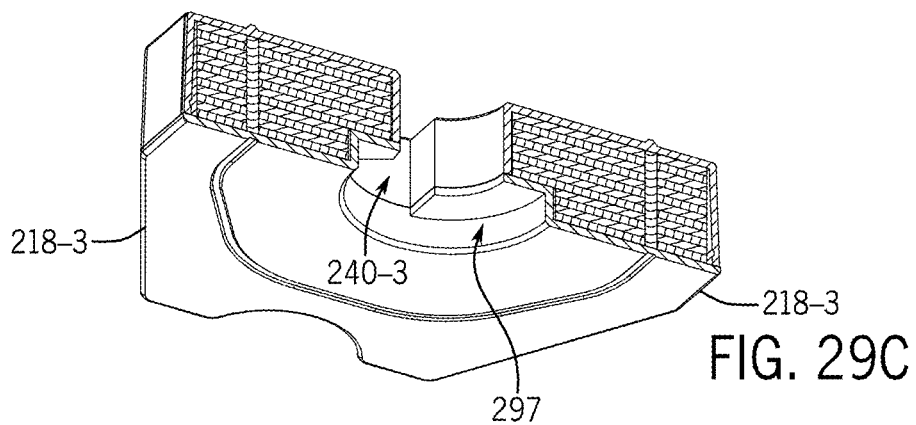
Figure 30A:
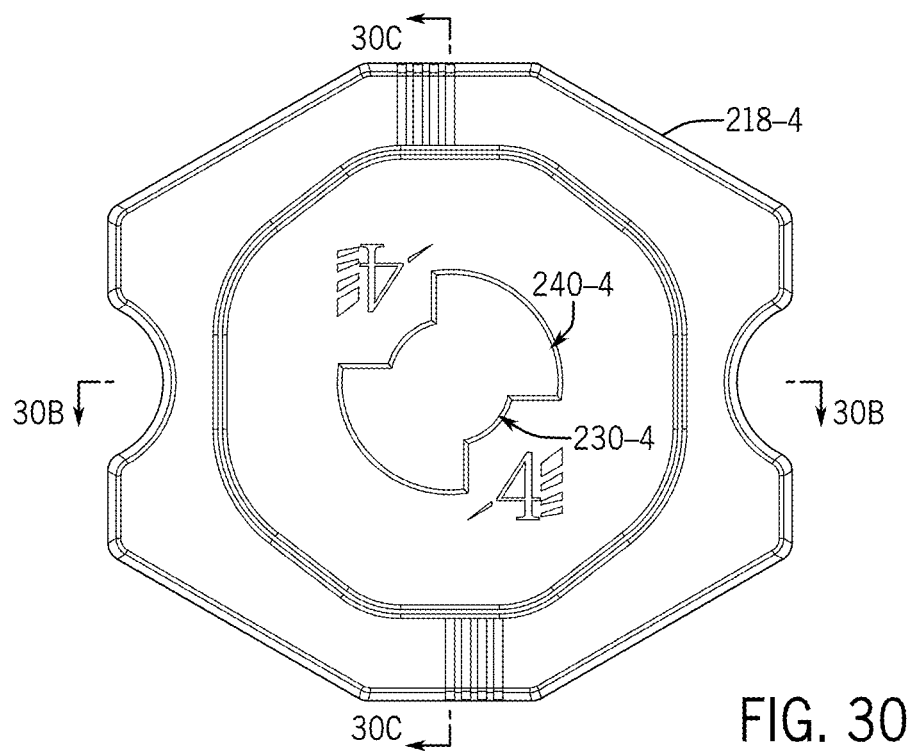
FIGS. 30A-30C are top, first cross-sectional, and second cross-sectional views of a fourth one of the plurality of weights of the kettlebell system of FIG. 16.
Figure 30B:
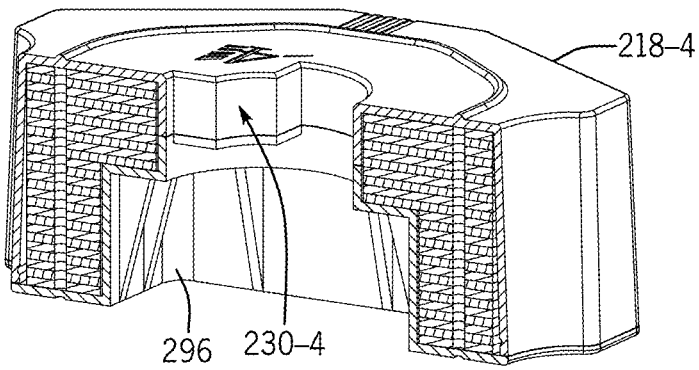
Figure 30C:
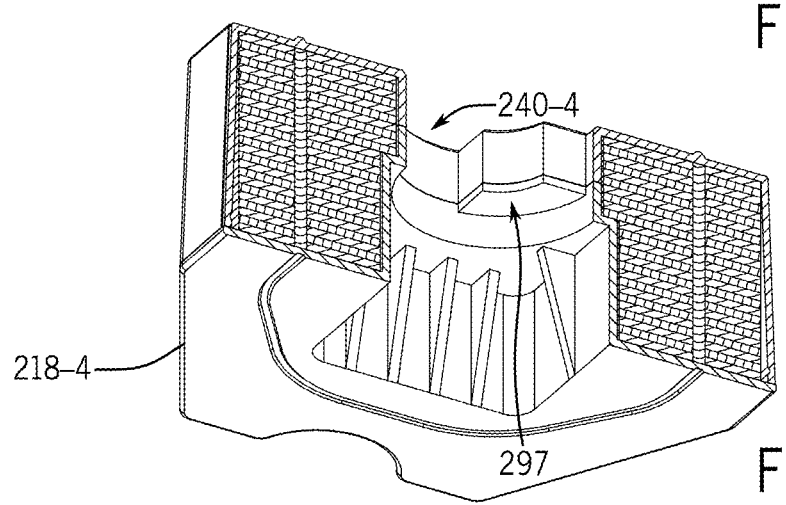
Figure 31A:
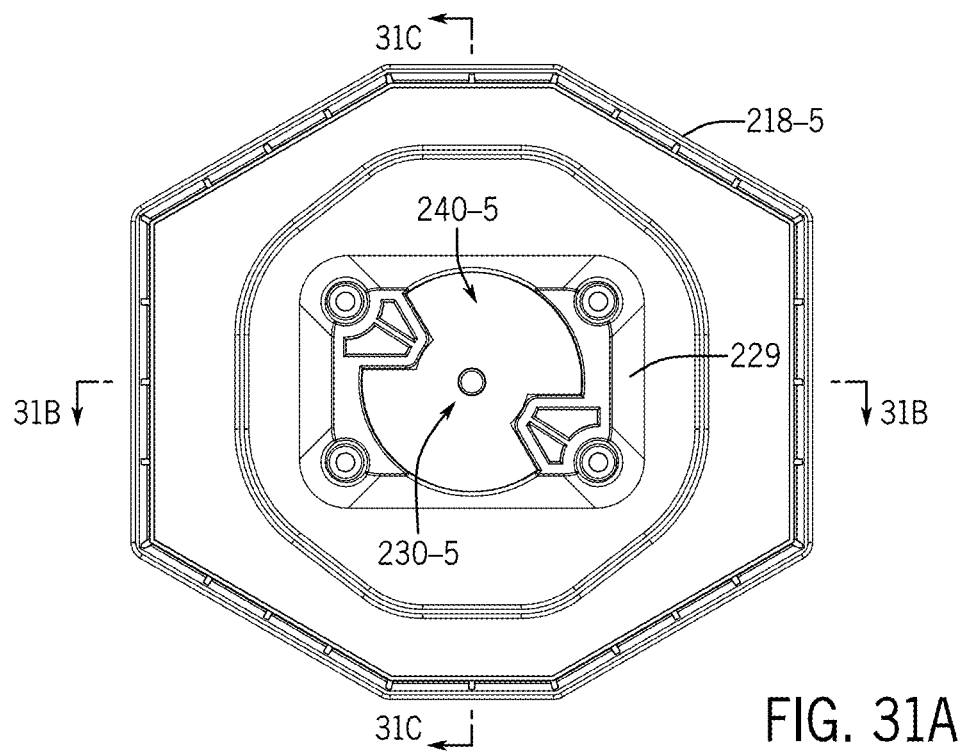
FIGS. 31A-31C are top, first cross-sectional, and second cross-sectional views of a fifth one of the plurality of weights of the kettlebell system of FIG. 16.
Figure 31B:
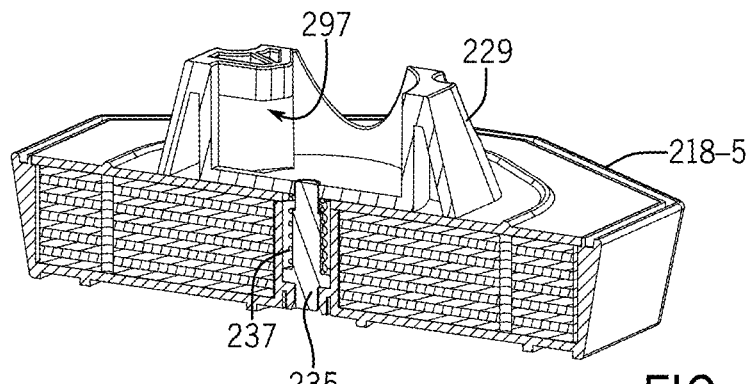
Figure 31C:
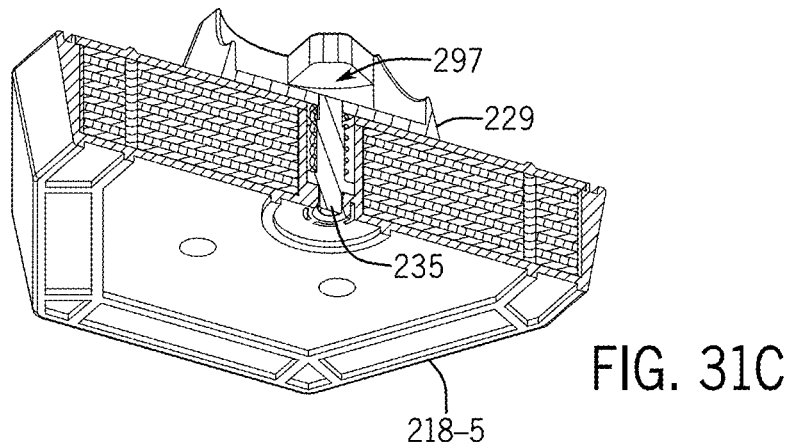

Referring to FIGS. 24-26, the selector rod 228 may include an outer rod or shaft 231, an inner rod or shaft 241 movably coupled to the outer rod or shaft 231, and a plurality of radially-extending pins 234 arranged along a length of the rod 228. The outer shaft 231 may be constructed from a plurality of outer shaft portions (e.g., first and second outer shaft halves 231-1 and 231-2, respectively). In other examples, the outer shaft 231 may be an integrally formed (or monolithic) component. The pins 234 may be rigidly coupled or fixed to the outer shaft 234. For example, the pins 234 may be provided as projections extending from a selector plate 232. In one example, the selector plate 232 may be a generally elongate flattened structure having inverted triangular portions spaced along the length of the plate, the tips of which function as the pins 234. Continuing with the present example, the selector plate 232 may be provided between the two outer shaft halves 231-1 and 231-2 and rigidly coupled thereto. In other examples, the pins 234 may be integrally formed with the outer shaft 231 or individual pins may be provided and each fixed to the outer shaft in any suitable manner (e.g., by passing the pins into apertures of the outer shaft and/or welding them to the shaft). Any other suitable geometry or configuration that can provide the functionality of the pins 234 may be used. For example, one or more, or in some cases each, of the plurality of pins 234 may be implemented as rectangular projections.

The outer shaft 231 and pins 234 are coupled to the kettlebell body 210 such that they are rotatable relative to the body 210 (to effect a weight selection) but are otherwise fixed in the longitudinal direction. The inner shaft 241 is moveably coupled to the outer shaft 231. For example, the inner shaft 241 is coupled to the outer shaft 231 such that the inner shaft 241 is movable in the longitudinal direction (indicated by arrow 201). The inner shaft 241 may thus act a plunger (or one of a series of plungers) configured to transmit an actuation force from the base 204 to the lock mechanism in the kettlebell body. In some embodiments, the actuation force may be applied by any suitable structure on the base 204, such as an upwardly extending protrusion 224. In the illustrated example, the protrusion 224 is centrally located such that it aligns with the intermediate plunger 235 in the bottom weight 218-5. In other examples, any other suitable position or arrangement of actuating components may be used. As shown in FIGS. 21 and 22, the inner shaft 241 may be biased toward the base 204 (e.g., using one or more springs 241) such that the inner shaft 241 automatically shifts downward toward the base when the kettlebell 202 is lifted from the base. In some embodiments, the actuation force applied from the base (e.g., via the protrusion 224) may be transmitted to the kettlebell body 210 via a series of movable components or plungers. The base 204 may actuate one or more intermediate plungers before the force is transmitted to the movable inner rod 241. In FIGS. 21-22, the base 204 is configured to actuate an intermediate plunger 235 provided in the bottom weight 218-5, which when actuated upward away from the base, provides an actuation force to the inner shaft 241. Utilizing a series of plungers, e.g., with at least one of the series of plungers incorporated into the bottom most weight, may enable a configuration in which the selector rod 228 need not extend beyond the bottom most surface of the kettlebell body, which can avoid damage to the selector rod 228 and may provide other advantages. In other embodiments, the actuation force may be provided by any other support surface. For example, the bottom weight may be configured to Like the outer shaft, the inner shaft 241 may be constructed from a plurality of inner shaft portions (e.g., first and second inner shaft halves 241-1 and 241-2, respectively), as shown in FIG. 25. When assembled, the inner shaft halves 241-1 and 241-2 may be spaced apart by a distance configured to accommodate the selector plate 232. The selector plate 232 may define one or more slots 238 (in this case, first and second slots 238-1 and 238-2) which receive a portion of the assembled inner shaft 241. The portions of the inner shaft 241 received in the slots 238 are movably supported using one or more springs (in this case, first and second springs 242-1 and 242-2), which bias the inner shaft 241 away from the upper portion 288 of the rod 228. In some embodiments (e.g., as in the example in FIG. 36) only a single spring may be used. Using two or more springs may provide redundancy and thus additional safety in the event one of the springs fails. The selector assembly 226 is operatively associated with one or more lock members (in this case, first and second cam followers 233-1 and 233-2) arranged in the upper portion 288 of the rod 228. Each of the first and second inner shaft halves 241-1 and 241-2 defines a respective opening or window 246-1 and 246-2 configured to either block or permit the respective cam follower to move towards the centerline of the rod 228 depending on longitudinal position of the inner shaft 241 relative to the outer shaft 231. In the illustrated example, the first and second cam followers 233-1 and 233-2 are arranged generally orthogonally to the pins 234. In other examples, such as when the pins 234 are integrally formed with the outer shaft, the angular relationship between the cam follower(s) and pins may be different, for example the pins and cam followers may be radially aligned.

In use, when the user places the kettlebell body 202 on the base 204 over the stack 221 of weights 218, the base 204 (e.g., via the protrusion 224) forces the intermediate plunger 235 upward compressing the spring 237, which forces the inner shaft 241 upward (in the direction indicated by 203) compressing the one or more springs 242. The upward movement of the inner shaft 241 relative to the outer shaft 231 lifts the window 264 freeing the cam follower 233 to move transversely to the rod 228 and thereby unlocking the rod 228 for rotation. The user may select a desired weight by rotating the knob 209 to the desired weight setting, which effects a rotation of the rod 228 to one of the predetermined plurality of rotational positions 299-1 through 299-6. As previously described, by virtue of the cam followers being sufficiently strongly spring loaded towards the detents 291 in some examples, if the user releases the knob 209 before the knob is fully or perfectly aligned with a given weight setting position, the knob 209 may be driven to the nearest weight setting, ensuring that the rod 228 is in a position in which all of the selected weights, if any, are securely attached to the kettlebell body. To begin exercise, the user simply lifts the kettlebell 202 from the base 204, which causes the inner shaft 241 of the rod 228 to shift downward (in the direction 207) thereby also shifting the window 246 downward and thus locking the rod 228 from rotation. The kettlebell 202 may thus be configured to automatically lock and unlock the kettlebell 202 and the weight selector assembly 226 for adjustments responsive to the removal and placement, respectively, of the kettlebell 202 on the base 204, which may enhance the user experience. Preventing adjustability of the selector assembly when the kettlebell is off the base may increase the safety of the kettlebell by preventing unintentional or accidental release of weights from the kettlebell body. In contrast, allowing adjustment of the kettlebell only while on the base may ensure that any weights not coupled to the kettlebell body remain supported on the base.

The individual weights 218 may have a solid interior. For example, an individual weight may be constructed from a solid block of a rigid material such as steel, formed or shaped to have the desired shape (e.g., for non-rotatably coupling to the cavity 220) and to include the appropriate aperture 230 and passageway 240 for selectively coupling the weight to the kettlebell 202. In some embodiments, one or more of the weights 218 may have a multi-layered construction. As shown, for example, in FIGS. 27-31, each of the weights 218-1 through 218-5 may be implemented using a plurality of stacked plates or layers 293 enclosed within a weight housing 295. The one or more layers 293 may be formed of any suitable material, such as steel, aluminum, or other rigid material. The layers 293 may be constructed of materials having different properties (e.g., density, rigidity, etc.) may be arranged within the weight housing 295 to produce a weight of any desired configuration. In some examples, layers 293 of different properties may be interleaved (e.g., rigid and compliant layers may be stacked in alternating manner). In some examples, layers 293 of a relatively rigid and dense material, such as steel, may be spaced apart from other layers 293 of the same or different material by voids, for adjusting the overall physical characteristic (e.g., mass and correspondingly weight) of a given individual weight 218. Using a stacked-plate construction may thus allow for more flexibility of adjusting the weight increments of the kettlebell system without having to reconfigure the overall shape and size of the kettlebell 202. Different materials may be used for the different layers of the stacked plate construction in order to achieve weights that have the same dimensions but different weight characteristics.

As shown, for example, in FIGS. 27-31, a portion of the underside of each weight 218 may be recessed to provide a seat 297 for retention of the pins 234 when the pins 234 are in orientations misaligned with the passageways. The depth of a recessed portion or seat 297 may be equal to or greater than a vertical dimension of the respective pin 234, such that the pins 234 can be accommodated between two adjacent weights even when the weights are in the stacked configuration. The recessed portion or seat 297 thus defines an underside surface via which the respective pins 234 engage the individual weights to couple a given weight to the kettlebell body 210 when the pins are provided in orientations misaligned with the passageways 240.

In some embodiments, the kettlebell 202 may be configured such that such that at least a portion of the bottom weight(s) extends below the bottom-most surface of the housing when coupled to the kettlebell body. In some such embodiments, and referring to FIGS. 30 and 31, a bottom weight 218-5 may include an upper portion 229, which includes the aperture and passageway for coupling the weight 218-5 to the kettlebell. The preceding weight, here the fourth weight 218-4, includes a cavity 296 configured for a cooperating fit with the portion 229. The cavity 296 may be configure to receive the upper portion 229 of the fifth weight substantially fully therein, allowing the two weights to nest together when the fourth weight 218-4 is stacked onto the fifth weight 218-5 on the base 204 and when the two weights are coupled to the kettlebell 202. The cavity 296 and upper portion 229 may be shaped such that the two weights are non-rotatably nested with one another, which can be achieved by using any of the examples described previously with respect to the cavity 222.

FIGS. 33-36 show an adjustable weight kettlebell 302 according to further examples of the present disclosure. The kettlebell 302 may include some or all of the components of the kettlebell 202. For example, the kettlebell 302 may include a kettlebell body 310, which defines a cavity 320 for receiving one, two or a larger number of weights 318, and a selector assembly 316 operatively associated with the kettlebell body for selectively removably couple to one or more of a plurality of weights 318 to the body 310. The individual weights may be implemented similarly to the weights 218, and thus, for conciseness, their construction and operation will not be repeated. The weights 318 may be implemented according to any of the examples herein The kettlebell 202 may be configured to automatically lock and unlock by lifting the kettlebell from the support surface (e.g., from the base) and by placing the kettlebell on the support surface (e.g., the base), respectively. When the kettlebell is in use, the kettlebell is removed from the support surface and thus locked. When not being used to perform an exercise, the kettlebell 202 may be positioned on a support surface, such as the base 204, which may be configured to automatically unlock the kettlebell (e.g., without requiring the user to manipulate any component of the kettlebell to effect the unlocking).

The kettlebell 302 includes a housing 311 and a handle 306 coupled to the housing. The housing 311 may be implemented using a plurality of housing portions, in this example a first or top housing portion 311-1, a second or bottom housing portion 311-2, and a third or middle housing portion 311-3. The housing portions may have similar characteristics as the housing portions of housing 211. For example, the bottom housing portion 311-2 may include an upper portion that extends into the top housing portion. The middle housing portion 311-3 may be positioned between the top and bottom housing portions 311-1 and 311-2 and part of the middle housing portion may extend radially outward from the top and bottom hosing portions thus providing the functionality of a bumper.

Similar to kettlebell 202, the kettlebell 302 may include a weight selector assembly 326 configured to selectively couple one or more of the weights 318 to the body 310. The weight selector assembly 326 includes a selector rod 328 operatively coupled to the body 310 for selectively coupling one or more of the weights 318 thereto. The selector assembly 326 and rod 328 may be configured and may operate similar to the selector assembly 226 and rod 228 of kettlebell 202, and thus their operation will not be repeated. For example, the rod 328 may be rotatably coupled to the body 310, such that the rod 328 is positionable into any one of a plurality of rotational positions associated with respective ones of the weight selections or settings of the kettlebell 302. Thus, rotation of the rod 328, which can be effected by manipulation of an actuator 308 (e.g., a knob 309) causes one or more of the weights 318 to be selectively coupled to the kettlebell body 310. The actuator 308 may be associated with an weight selection indicator 354. The weight selection indicator 354 may be implemented as an annular plate or ring coaxially arranged with the knob 309 and including a plurality of markings corresponding to the weight settings on an upward facing surface of the ring. The weight selection indicator 354 may be implemented using any other suitable means, including any of the other examples herein. For example, the markings may instead be directly provided on the upper surface (e.g., on the cover plate 316) of the kettlebell 302. The handle 306 may extend into the housing 311 and thus the top housing portion 311-1 may include a pair of apertures 359-1 and 359-2 configured to receive the handle 306. The apertures 359-1 and 359-2 may be shaped for a cooperating fit with the ends of the handle 306 received therein, such as for a tubular handle 306, the apertures 359-1 and 359-2 may be substantially circular, while for a rectangular, ovular, or otherwise shaped handle ends, the apertures 359-1 and 359-2 may be correspondingly rectangular, ovular or having a shape corresponding to that of the handle ends.

Figure 34:
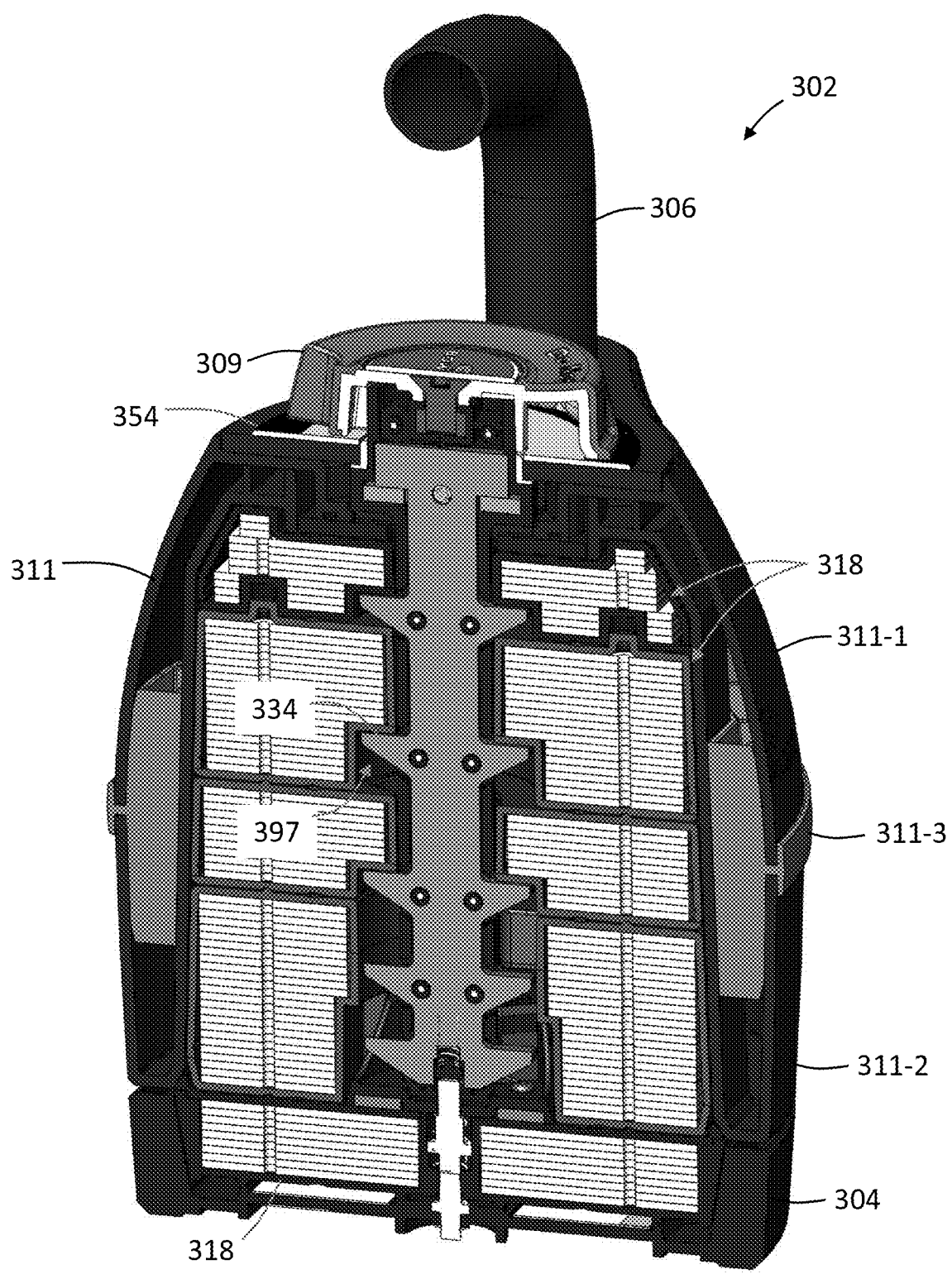
FIG. 34 is a cross-sectional view of an adjustable weight kettlebell according to further examples herein.
Figure 35:
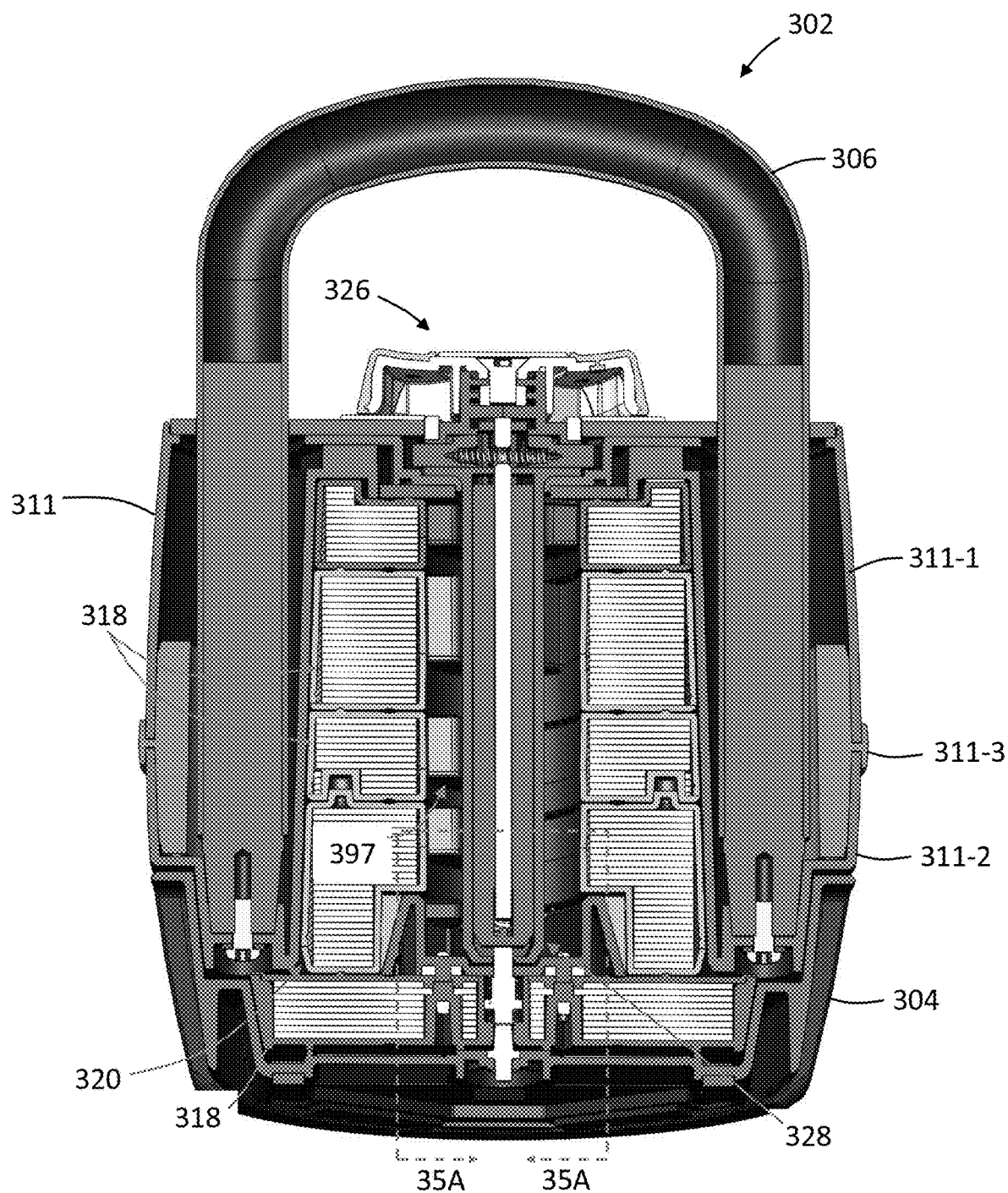
FIG. 35 is another cross-sectional view of an adjustable weight kettlebell according to further examples herein.
Figure 36:
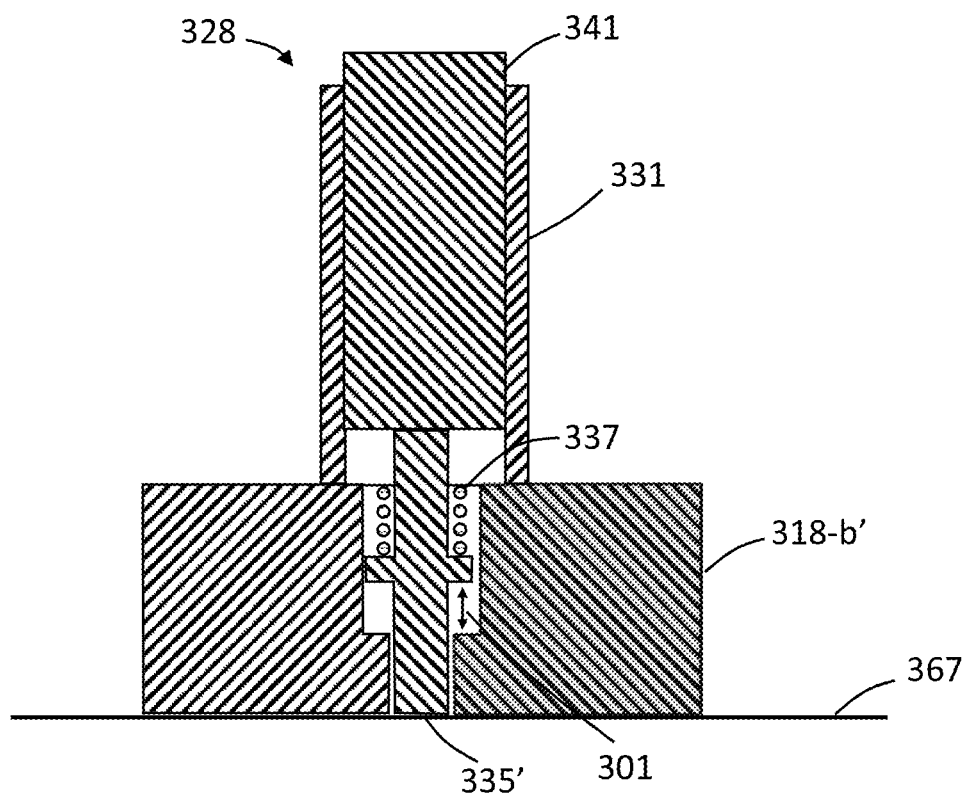
FIG. 36 is an illustration of a portion of a selector rod and bottom weight in accordance with further examples herein.
Figure 37:
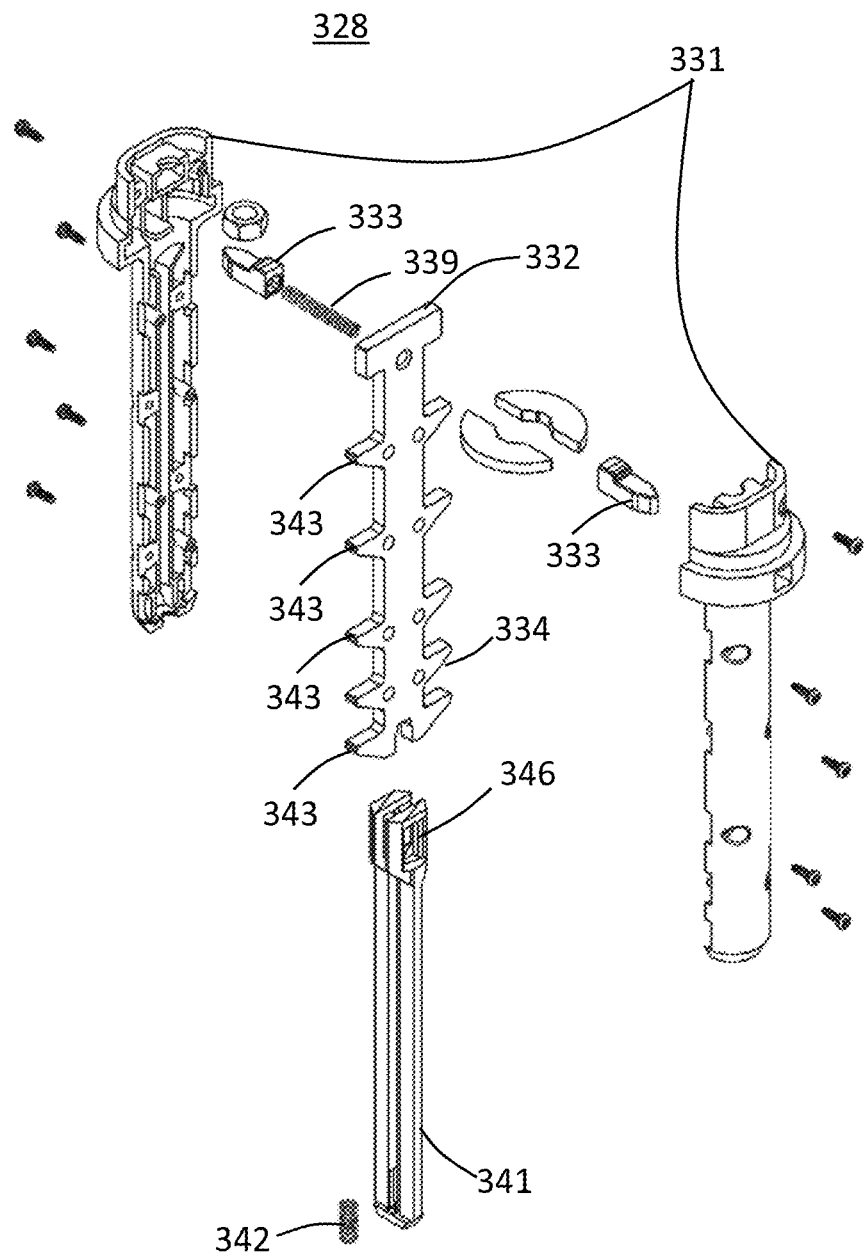
FIG. 37 is an exploded view of the selector rod of the adjustable weight kettlebell of FIG. 33.

Referring now also to FIGS. 34-36, the rod 328, which extends into the cavity 320 of the kettlebell body 310, includes engagement members (e.g., pins 334), for coupling the weights 318 to the rod 328 and thus to the kettlebell body 310. The rod 328 and pins 334 may operate in a similar manner as those described with reference to FIGS. 15-33.

For example, the pins 334 may extend radially outward from the rod 328. The pins may be implemented as pairs of projections (e.g., triangular, rectangular, or any other suitable geometry) extending in diametrically opposite directions from the rod 328. In some examples, the pins may be continuous transverse rods or any suitable shape (e.g., circular, rectangular, etc.) passing through the rod 328. The pins 334 may be configured to engage the underside of a respective weight 318 to retain the respective weight in the cavity 320. As with other examples herein, the pins 334 may be operatively arranged (e.g., operatively spaced and appropriately oriented) along the length of the rod 328 and configured to be accommodated in the seats of the weights 318 such that the pins 334 can be rotated within the cavities defined by the seats to enable a selection of a desired weight. The pins 334 may be implemented in any suitable manner, for example, they may be generally triangular projection as in FIG. 36, or projections or rods of any suitable geometry. Like the selector rod 228, rod 328 has an inner shaft 341 movably coupled to an outer shaft 331 of the rod 328. The inner shaft 341 is configured to displace along the longitudinal direction of the rod 328 (e.g., vertically when the kettlebell 202 is positioned upright on a support surface). The inner shaft 341 may be downwardly biased, e.g., by one or more springs 342 such that the inner shaft 341 may function as one in a series of plungers configured to lock and unlock the selector assembly 326. The inner shaft may be implemented using a plurality of shaft portions or as an integrally formed component. The inner shaft 341 may define a longitudinal slot configured to receive the selector plate 332. The pins 334 may be integrally formed with the inner core of the rod 328 (e.g., in this example, implemented as the selector plate 332, which is centrally positioned within the rod 328 and which is rigidly coupled to the outer shaft 331). In operation, the outer shaft 331 and pins 334 remain in a fixed vertical position relative to the body 310 when the inner shaft 341 moves up and down to unlock and lock, respectively, the selector assembly 326.

The kettlebell 302 may be configured to automatically lock and unlock by removal and placement of the kettlebell 302 on a support surface (e.g., surface 367). The support surface that supports the kettlebell for automatically unlocking the kettlebell may be provided by a surface of the base 304 (e.g., when all of the weights are attached to the kettlebell), by the bottom weight 318-b (e.g., when the bottom weight is not attached to the kettlebell), or in some configurations by another surface (e.g., as in the example in FIG. 36). The locking mechanism may be implemented in a similar manner to that described with reference to FIG. 20-26. For example, the locking mechanism of kettlebell 302 may include one or more lock members (e.g., cam followers 333) operatively associated with the selector rod and configured to engage the kettlebell body (e.g., such as by engaging a detent provided by the cam 323) to restrict rotation of the rod 328 whenever the selector assembly 326 is in the locked configuration. Similar to the locking mechanism of kettlebell 202, in this example, the lock members (e.g., cam followers 333) may be non-rotatably coupled to the rod 328 and movable (e.g., biased by one or more springs 339) such that the lock member may move into and out of the window 346 for respectively unlocking and locking the rod 228.

Figure 35A:
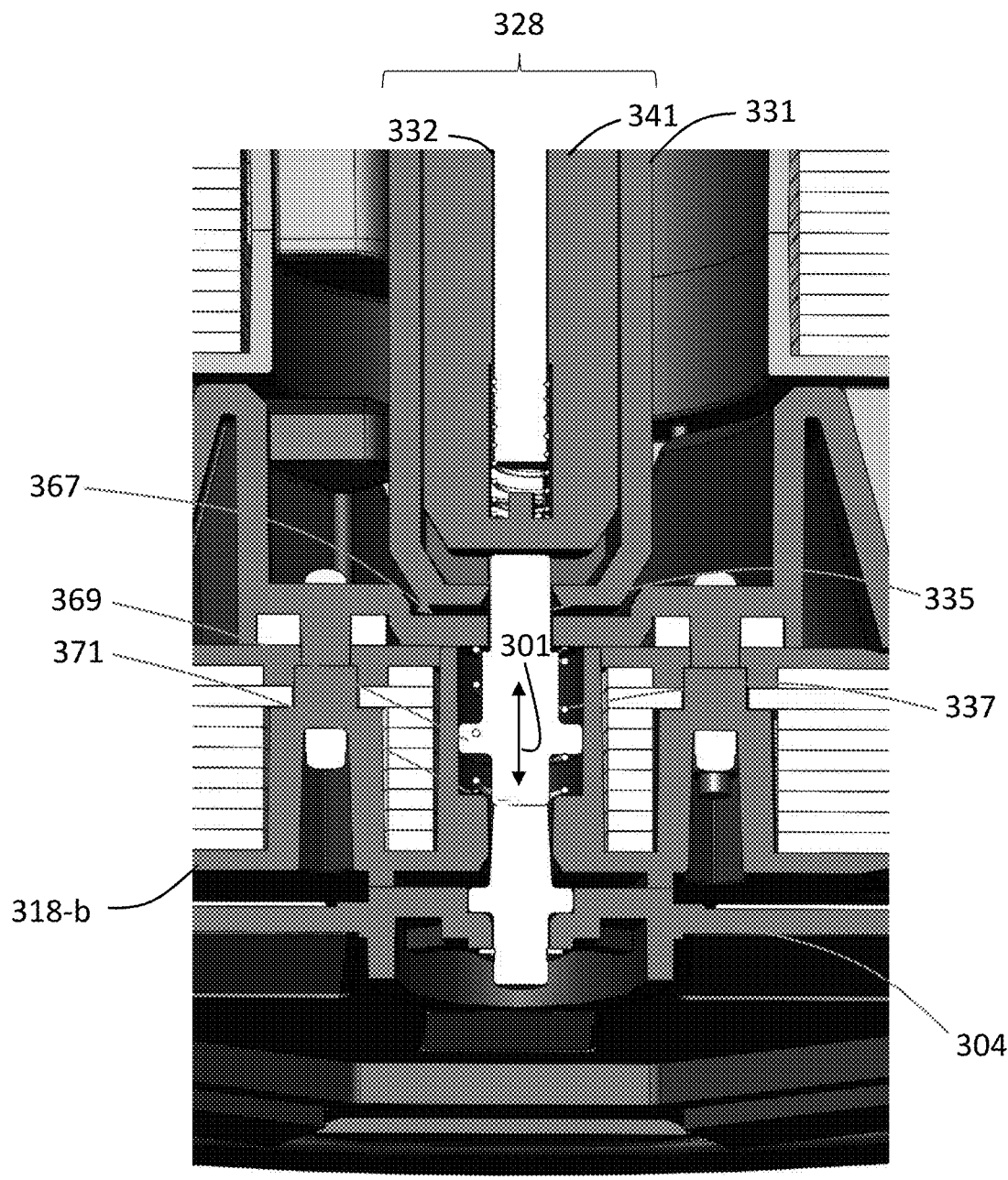
FIG. 35A is a partial cross-sectional view of the portion of the adjustable weight kettlebell of FIG. 35 indicated by line 35A-35A.

As shown in the enlarged partial view in FIG. 35A, the plunger 335 in the bottom weight 318-b is actuated upward responsive to the placement of the kettlebell 302 on the support surface, in this case on the base 304. The plunger 335 is downwardly biased by a spring 337. When the kettlebell 302 is removed from the base 304 with the bottom weight 318-*b* attached thereto, the plunger 335 shifts down until the shoulder 369 of the plunger 335 abuts the ledge 371 of the plunger cavity, in which position the plunger 335 may not extend below the bottom most surface of the bottom weight 318-*b*. If the kettlebell 302 is removed from the base 304 without the bottom weight 318-*b* attached thereto, the bottom weight 318-*b* may remain in the base 304 with the plunger 335 deflected upward (against the spring force) such that the top of the plunger protrudes beyond the upward facing surface of the weight 318-*b* to provide the actuation force for unlocking the kettlebell when the kettlebell 302 is next placed on the support surface 367, in this case on the bottom weight. In this case, the bottom weight 318-*b* provides the support surface 367 on which the kettlebell is placed to effect the automatic unlocking of the selector assembly. In yet another example, as shown in FIG. 36, the kettlebell may be configured to be automatically unlocked by placement of the kettlebell on the support surface 367, which may be the floor. In this example, the bottom weight 318-*b*' includes a plunger 335' which is downwardly biased by at least one spring 337. However, in this example, the plunger 335' extends beyond the bottom most surface of the weight 318-*b* such that whenever the kettlebell is rested on the support surface 367 (e.g., the floor), the selector assembly may be automatically unlocked for adjustment due to the plunger 335' shifting upward against the force of the spring 337. When the kettlebell is lifted from the support surface 367, the selector assembly is again automatically locked due to the release of the actuation force on the plunger and the shifting of the plunger 335' downward. To avoid accidental unlocking of the kettlebell during use, the plunger 335' may be downwardly biased by a spring force which is compressible only when the weight greater than that of the bottom weight 318-*b*.

Further inventive combinations of a weight adjustable kettlebell and system are disclosed in the enumerated paragraphs below:

A1. An adjustable weight kettlebell, comprising:
a body defining an internal cavity;
a plurality of weights configured to be non-rotatably positioned in the internal cavity, each weight defining an aperture; and
a weight selector assembly configured to selectively couple one or more weights of the plurality of weights to the body, the weight selector assembly comprising:
a rod coupled to the body and at least partially positioned in the internal cavity and the apertures of the plurality of weights, the rod rotatable relative to the plurality of weights to couple the one or more weights to the body; and
a lock member non-rotatably coupled to the rod and configured to engage the body to restrict rotation of the rod during exercise.

A2. The kettlebell according to A1, wherein the lock member is positioned in the internal cavity.

A3. The kettlebell according to A1 or A2, wherein the lock member includes one or more projections that engage the body to restrict rotation of the rod.

A4. The kettlebell according to A1 through A3, wherein the body includes a castellated wall; and the lock member is configured to engage the castellated wall to restrict rotation of the rod.

A5. The kettlebell according to A4, wherein the castellated wall protrudes into the internal cavity.

A6. The kettlebell according to 4, wherein the lock member comprises a plate with protruding teeth configured to intermesh with the castellated wall at rotational positions of the rod corresponding to different weight selections.

A7. The kettlebell according to A1-A6, wherein the rod is movable in an axial direction relative to the body to selectively engage the lock member with the body.

A8. The kettlebell according to A7, wherein the weight selector assembly further comprises an actuator coupled to the rod and operable to move the rod in the axial direction.

A9. The kettlebell according to A8, wherein the actuator is movable by a user between a first position in which the actuator causes the lock member to be engaged with the body and a second position in which the actuator causes the lock member to be disengaged from the body.

A10. The kettlebell according to A8 or A9, wherein the actuator comprises a lever rotatably coupled to an upper end portion of the rod.

A11. The kettlebell according to A8-A10, wherein the actuator comprises a depressible button coupled to an upper end portion of the rod.

A12. The kettlebell according to A8-A11, wherein the body includes a wall oriented transverse to the rod; and the actuator and the lock member are positioned on opposite sides of the wall.

A13. The kettlebell according to A1-A12, further comprising a cap non-rotatably coupled to the rod for manipulation by a user and operable to rotate the rod to couple the one or more weights to the body.

A14. The kettlebell according to A1-A13, further comprising a handle coupled to the body for grasping by a user during exercise.

B15. A kettlebell system, comprising:
an adjustable weight kettlebell comprising:
a body defining an internal cavity;
a plurality of weights configured to be positioned in the internal cavity, each weight defining an aperture; and
a weight selector assembly configured to selectively couple one or more weights of the plurality of weights to the body, the weight selector assembly comprising a rod coupled to the body and at least partially positioned in the internal cavity and the apertures of the plurality of weights, the rod rotatable relative to the plurality of weights to couple the one or more weights to the body; and
a base configured to support weights of the plurality of weights that are not coupled to the body, wherein the rod is configured to selectively engage the base to restrict removal of the kettlebell from the base.

B16. The kettlebell system according to B15, wherein the rod is configured to engage the base in rotational positions of the rod in which the one or more weights are not properly coupled to the body.

B17. The kettlebell system according to A15 or B16, wherein the base defines slots corresponding to rotational positions of the rod in which the one or more weights are coupled to the body; and the rod includes a transverse pin configured to be aligned with the slots at the corresponding rotational positions of the rod.

B18. The kettlebell system according to B17, wherein the base defines seats between adjacent slots corresponding to rotational positions of the rod in which the one or more weights are improperly coupled to the body; and the transverse pin of the rod is configured to be aligned with the seats at the corresponding improper rotational positions of the rod to restrict removal of the kettlebell from the base.

C19. A method of adjusting the weight of a kettlebell, the method comprising:
rotating a rod;
coupling one or more weights to a body of the kettlebell via rotation of the rod; and
engaging a lock member, non-rotatably coupled to the rod, with the body to restrict rotation of the rod relative to the one or more weights.

C20. The method according to C19, wherein engaging the lock member with the body comprises intermeshing a toothed plate, non-rotatably coupled to the rod, with a castellated wall of the body.

D21. A kettlebell including any component or combination of components described and/or illustrated herein.

E22. A method of adjusting the weight of a kettlebell, the method including any step or combination of steps described and/or illustrated herein.

The foregoing description has broad application. The discussion of any embodiment is meant only to be explanatory and is not intended to suggest that the scope of the disclosure, including the claims, is limited to these examples. In other words, while illustrative embodiments of the disclosure have been described in detail herein, the inventive concepts may be otherwise variously embodied and employed, and the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. An adjustable weight kettlebell, comprising:
a kettlebell body defining a cavity that accommodates a plurality of weights in a stacked configuration;
a rod having a first end coupled to the kettlebell body and a second end located within the cavity, the rod configured to pass through any of the plurality of weights located in the cavity;
a follower non-rotatably coupled to the rod proximate the first end of the rod; and
a plunger extending through at least part of a length of the rod and movable relative to the rod and the follower to selectively inhibit or permit movement of the follower relative to the rod.

2. The adjustable weight kettlebell as recited in claim 1, wherein the plunger is biased toward a base of the kettlebell.

3. The adjustable weight kettlebell as recited in claim 2, wherein the plunger is configured to transmit an actuation force from the base to the follower to permit the movement of the follower relative to the rod.

4. The adjustable weight kettlebell as recited in claim 1, wherein the kettlebell body includes an engagement surface with a plurality of detents.

5. The adjustable weight kettlebell as recited in claim 4, wherein the follower is coupled to the rod such that when the rod rotates, the follower follows the engagement surface as the follower traverses ramps between adjacent detents of the plurality of detents.

6. The adjustable weight kettlebell as recited in claim 1, wherein the follower is configured to selectively engage the kettlebell body to restrict rotation of the rod.

7. The adjustable weight kettlebell as recited in claim 1, wherein the rod defines a longitudinal axis, and wherein the follower is movable transverse to the longitudinal axis of the rod.

8. The adjustable weight kettlebell as recited in claim 1, wherein the follower is movable relative to the rod in a first direction, and wherein the plunger is movable relative to the rod in a different, second direction.

9. An adjustable weight kettlebell system, comprising:
a kettlebell body defining a cavity;
a plurality of weights configured to be accommodated in a stacked configuration in the cavity;
a rod passing through the plurality of weights and rotatable relative to the kettlebell body for selectively coupling one or more of the plurality of weights;
a lock member operatively arranged between the rod and the kettlebell body to prevent rotation of the rod, wherein the lock member is non-rotatably coupled to the rod; and
a plunger axially movable along a length of the rod and configured to cooperate with the lock member to selectively prevent rotation of the rod, wherein one of the plurality of weights includes a portion of the plunger, and wherein the plunger is movable relative to the lock member to selectively prevent rotation of the rod.

10. The adjustable weight kettlebell as recited in claim 9, wherein the lock member is configured to selectively engage a plurality of detents formed on the kettlebell body to restrict rotation of the rod.

11. The adjustable weight kettlebell as recited in claim 10, further comprising an engagement surface comprising the plurality of detents, wherein the lock member is coupled to the rod such that when the rod rotates, the lock member follows the engagement surface as the lock member traverses ramps between adjacent detents of the plurality of detents.

12. The adjustable weight kettlebell as recited in claim 11, wherein the lock member shifts laterally towards and away from the rod to follow the engagement surface.

13. The adjustable weight kettlebell as recited in claim 9, further comprising a base, wherein the plunger is configured to transmit an actuation force from the base to the lock member to permit the movement of the lock member relative to the rod.

* * * * *